US006774917B1

(12) United States Patent
Foote et al.

(10) Patent No.: US 6,774,917 B1
(45) Date of Patent: Aug. 10, 2004

(54) METHODS AND APPARATUSES FOR INTERACTIVE SIMILARITY SEARCHING, RETRIEVAL, AND BROWSING OF VIDEO

(75) Inventors: Jonathan T. Foote, Menlo Park, CA (US); Andreas Girgensohn, Menlo Park, CA (US); Lynn Wilcox, Portola Valley, CA (US)

(73) Assignees: Fuji Xerox Co., Ltd., Tokyo (JP); Xerox Corporation, Stamford, CT (US)

( * ) Notice: Subject to any disclaimer, the term of this patent is extended or adjusted under 35 U.S.C. 154(b) by 0 days.

(21) Appl. No.: 09/266,558

(22) Filed: Mar. 11, 1999

(51) Int. Cl.[7] ............................................... G06F 15/00
(52) U.S. Cl. ........................................ 345/700; 345/716
(58) Field of Search .............................. 345/700, 716, 345/723, 762, 765, 744, 835, 848, 853

(56) References Cited

U.S. PATENT DOCUMENTS 5,606,655 A * 2/1997 Arman et al. ............... 345/173
5,821,945 A * 10/1998 Yeo et al. ................... 345/440
5,966,121 A * 10/1999 Hubbell et al. ............. 345/723

OTHER PUBLICATIONS

R. Ronfard, "Shot–level Description and Matching of Video Content," in *Multimedia Storage and Archiving Systems II, Proc. SPIE*, vol. 3229, Dallas, TX, Nov. 1997, pp. 70–78.
S.F. Chang, W. Chen, H.J. Meng, H. Sundaram, and D. Zhong, "VideoQ: An Automatic Content–Based Video Search System Using Visual Cues," in *Proc. ACM Multimedia*, Seattle, WA, Nov. 1997, pp. 313–324.
W. Niblack, R. Barber, W. Equitz, M. Flickner, E. Glasman, D. Petkovic, P. Yanker, C. Faloutsos, and P. Yanker, "The QBIC Project: Querying Images by Content Using Color, Texture, and Shape", In *Storage and Retrieval for Image and Video Databases*, Proc. SPIE, vol. 1908, Feb. 1993, pp. 173–181.

(List continued on next page.)

*Primary Examiner*—Cao (Kevin) Nguyen
(74) *Attorney, Agent, or Firm*—Fliesler Meyer LLP

(57) ABSTRACT

Method for interactive selecting video consisting of training images from a video for a video similarity search and for displaying the results of the similarity search are disclosed. The user selects a time interval in the video as a query definition of training images for training an image class statistical model. Time intervals can be as short as one frame or consist of disjoint segments or shots. A statistical model of the image class defined by the training images is calculated on-the-fly from feature vectors extracted from transforms of the training images. For each frame in the video, a feature vector is extracted from the transform of the frame, and a similarity measure is calculated using the feature vector and the image class statistical model. The similarity measure is derived from the likelihood of a Gaussian model producing the frame. The similarity is then presented graphically, which allows the time structure of the video to be visualized and browsed. Similarity can be rapidly calculated for other video files as well, which enables content-based retrieval by example. A content-aware video browser featuring interactive similarity measurement is presented. A method for selecting training segments involves mouse click-and-drag operations over a time bar representing the duration of the video; similarity results are displayed as shades in the time bar. Another method involves selecting periodic frames of the video as endpoints for the training segment.

23 Claims, 44 Drawing Sheets

OTHER PUBLICATIONS

B. Guensel, Y. Fu, and A. M. Tekalp, "Hierarchical Temporal Video Segmentation and Content Characterization," in *Multimedia Storage and Archiving Systems II*, Proc. SPIE, vol. 3229, Dallas, TX, Nov. 1997, pp. 46–55.

R. Mohan, "Video Sequence Matching," in *Proc. ICASSP '98*, IEEE, May 1998, Seattle, WA, pp. 3697–3700.

A. Wilson, A. Bobick, and J. Cassell, "Recovering the Temporal Structure of Natural Gesture," in *Proc. Second Int. Conf on Automatic Face and Gesture Recognition*, Oct. 1996, pp. 66–71.

Wayne Wolf, "Hidden Markov Model Parsing of Video Programs," in *Proc. ICASSP '97*, vol. 4 pp. 2609–2611, IEEE, Apr. 1997.

M. Swain, "Interactive Indexing into Image Databases," in *Proc. SPIE vol. 1908, Storage and Retrieval for Image and Video Databases*, pp. 95–103, Feb. 1993.

D. Swanberg, C.–F. Shu, and R. Jain, "Knowledge Guided Parsing in Video Databases," in Proc. *SPIE vol. 1908, Storage and Retrieval for Image and Video Databases*, pp. 13–24, Feb. 1993.

* cited by examiner

Example Training Frames

Mean of DCT Gaussian Models

Mean of HT Gaussian Models

|   | 610 | 601 | 611 |   |   |   | 614 |   |   |
|---|---|---|---|---|---|---|---|---|---|
|   | 1 | 2 | 3 | 4 | 5 | 6 | 7 | 8 |   |
| 1 | $C_{11}$ | $C_{12}$ | $C_{13}$ | $C_{14}$ | $C_{15}$ | $C_{16}$ | $C_{17}$ | $C_{18}$ | 0 |
| 2 | $C_{21}$ | $C_{22}$ | $C_{23}$ | $C_{24}$ | $C_{25}$ | $C_{26}$ | $C_{27}$ | $C_{28}$ | $f_v$ |
| 3 | $C_{31}$ | $C_{32}$ | $C_{33}$ | $C_{34}$ | $C_{35}$ | $C_{36}$ | $C_{37}$ | $C_{38}$ | $3f_v$ |
| 4 | $C_{41}$ | $C_{42}$ | $C_{43}$ | $C_{44}$ | $C_{45}$ | $C_{46}$ | $C_{47}$ | $C_{48}$ | $5f_v$ |
| 5 | $C_{51}$ | $C_{52}$ | $C_{53}$ | $C_{54}$ | $C_{55}$ | $C_{56}$ | $C_{57}$ | $C_{58}$ | $7f_v$ |
| 6 | $C_{61}$ | $C_{62}$ | $C_{63}$ | $C_{64}$ | $C_{65}$ | $C_{66}$ | $C_{67}$ | $C_{68}$ | $9f_v$ |
| 7 | $C_{71}$ | $C_{72}$ | $C_{73}$ | $C_{74}$ | $C_{75}$ | $C_{76}$ | $C_{77}$ | $C_{78}$ | $11f_v$ |
| 8 | $C_{81}$ | $C_{82}$ | $C_{83}$ | $C_{84}$ | $C_{85}$ | $C_{86}$ | $C_{87}$ | $C_{88}$ | $13f_v$ |
|   | 0 | $f_h$ | $3f_h$ | $5f_h$ | $7f_h$ | $9f_h$ | $11f_h$ | $13f_h$ |   |

|   | 1 | 2 | 3 | 4 | 5 | 6 | 7 | 8 |
|---|---|---|---|---|---|---|---|---|
| 1 | $V_{11}$ | $V_{12}$ | $V_{13}$ | $V_{14}$ | $V_{15}$ | $V_{16}$ | $V_{17}$ | $V_{18}$ |
| 2 | $V_{21}$ | $V_{22}$ | $V_{23}$ | $V_{24}$ | $V_{25}$ | $V_{26}$ | $V_{27}$ | $V_{28}$ |
| 3 | $V_{31}$ | $V_{32}$ | $V_{33}$ | $V_{34}$ | $V_{35}$ | $V_{36}$ | $V_{37}$ | $V_{38}$ |
| 4 | $V_{41}$ | $V_{42}$ | $V_{43}$ | $V_{44}$ | $V_{45}$ | $V_{46}$ | $V_{47}$ | $V_{48}$ |
| 5 | $V_{51}$ | $V_{52}$ | $V_{53}$ | $V_{54}$ | $V_{55}$ | $V_{56}$ | $V_{57}$ | $V_{58}$ |
| 6 | $V_{61}$ | $V_{62}$ | $V_{63}$ | $V_{64}$ | $V_{65}$ | $V_{66}$ | $V_{67}$ | $V_{68}$ |
| 7 | $V_{71}$ | $V_{72}$ | $V_{73}$ | $V_{74}$ | $V_{75}$ | $V_{76}$ | $V_{77}$ | $V_{78}$ |
| 8 | $V_{81}$ | $V_{82}$ | $V_{83}$ | $V_{84}$ | $V_{85}$ | $V_{86}$ | $V_{87}$ | $V_{88}$ |

| | |
|---|---|
| 1 | $\mu_{11}$ |
| 2 | $\mu_{12}$ |
| 3 | $\mu_{13}$ |
| 4 | $\mu_{21}$ |
| 5 | $\mu_{22}$ |
| 6 | $\mu_{23}$ |
| 7 | $\mu_{31}$ |
| 8 | $\mu_{32}$ |
| 9 | $\mu_{33}$ |

| $V_{11}$ | 0 | 0 | 0 | 0 | 0 | 0 | 0 | 0 |
|---|---|---|---|---|---|---|---|---|
| 0 | $V_{12}$ | 0 | 0 | 0 | 0 | 0 | 0 | 0 |
| 0 | 0 | $V_{13}$ | 0 | 0 | 0 | 0 | 0 | 0 |
| 0 | 0 | 0 | $V_{21}$ | 0 | 0 | 0 | 0 | 0 |
| 0 | 0 | 0 | 0 | $V_{22}$ | 0 | 0 | 0 | 0 |
| 0 | 0 | 0 | 0 | 0 | $V_{23}$ | 0 | 0 | 0 |
| 0 | 0 | 0 | 0 | 0 | 0 | $V_{31}$ | 0 | 0 |
| 0 | 0 | 0 | 0 | 0 | 0 | 0 | $V_{32}$ | 0 |
| 0 | 0 | 0 | 0 | 0 | 0 | 0 | 0 | $V_{33}$ |

|   | 1 | 2 | 3 | 4 | 5 | 6 |
|---|---|---|---|---|---|---|
| 1 | $V_{11}$ | 0 | 0 | 0 | 0 | 0 |
| 2 | 0 | $V_{12}$ | 0 | 0 | 0 | 0 |
| 3 | 0 | 0 | $V_{21}$ | 0 | 0 | 0 |
| 4 | 0 | 0 | 0 | $V_{23}$ | 0 | 0 |
| 5 | 0 | 0 | 0 | 0 | $V_{26}$ | 0 |
| 6 | 0 | 0 | 0 | 0 | 0 | $V_{32}$ |

|  | G(t) | A(t) | B(t) |
|---|---|---|---|
| G(t-1) | $P_{GG}$ | $P_{GA}$ | 0 |
| A(t-1) | $P_{AG}$ | $P_{AA}$ | $P_{AB}$ |
| B(t-1) | $P_{BG}$ | 0 | $P_{BB}$ |

METHODS AND APPARATUSES FOR INTERACTIVE SIMILARITY SEARCHING, RETRIEVAL, AND BROWSING OF VIDEO

CROSS-REFERENCE TO RELATED APPLICATIONS

This Application is related to the following Applications, which were filed of even date herewith:

(1) "Methods and Apparatuses for Video Segmentation, Classification, and Retrieval Using Image Class Statistical Models," by Jonathan T. Foote, et al., Ser. No. 09/266,637; and
(2) "Methods and Apparatuses for Segmenting an Audio-Visual Recording Using Image Similarity Searching and Audio Speaker Recognition," by Jonathan T. Foote, et al., Ser. No. 09/266,561.

BACKGROUND OF THE INVENTION

1. Field of the Invention

The present invention relates to the field of interactively processing video for the purpose of automatically locating specific content. Specifically, the present invention pertains to the field of interactively defining training images and displaying similarity search results.

2. Discussion of the Related Art

Most state-of-the-art systems for video retrieval first segment video into shots, and then create a single keyframe or multiple keyframes for each shot. Video segment retrieval then reduces to image retrieval based on keyframes. More complex conventional systems average color and temporal variation across the query segment, but then perform retrieval based on keyframes in the segmented video. Conventional systems have been designed to find video sequences that exactly match the query, for example instant replays.

There has been much work on still image retrieval by similarity. Retrieval based upon color histogram similarity has been described. Several image similarity measures have been based on wavelet decompositions. Quantizing and truncating higher-order coefficients reduces the dimensionality, while the similarity distance measure is just a count of bitwise similarity. However, this approach has apparently not been used with the discrete cosine transform or the Hadamard transform. All known image retrieval-by-similarity systems require a single image as a query and do not naturally generalize to image groups or classes. Although there has been much work on video queries, much of the literature focuses on query formalisms while presupposing an existing analysis or annotation.

Due to the high cost of video processing, little work has been done on rapid similarity measures. Analysis of individual image frames with a combination of color histogram and pixel-domain template matching has been attempted, though templates must be hand-tailored to the application and so do not generalize. Another distance metric technique is based on statistical properties such as a distance based on the mean and standard deviation of gray levels in regions of the frames.

Other conventional approaches include queries by sketch, perhaps enhanced with motion attributes. As far as using actual video clips as queries, the few reports in the literature include a system in which video "shots" are represented by still images for both query and retrieval, and a system in which video segments are characterized by average color and temporal variation of color histograms. A similar approach involves, after automatically finding shots, they are compared using a color histogram similarity measure. Matching video sequences using the temporal correlation of extremely reduced frame image representations has been attempted. While this can find repeated instances of video shots, for example "instant replays" of sporting events, it is not clear how well it generalizes to video that is not substantially similar. Video similarity has been computed as the euclidean distance between short windows of frame distances determined by distance of image eigen projections. This appears to find similar regions in the test video, but may not generalize well as it depends on the video used to calculate the eigen projection. Video indexing using color histogram matching and image correlation has been attempted, though it is not clear the correlation could be done rapidly enough for most interactive applications. Hidden Markov model video segmentation using motion features has been studied, but does not use image features directly or use for image features for image similarity matching.

SUMMARY OF THE INVENTION

In addition to providing predefined classes for video retrieval and navigation, video classification techniques can be used for other purposes as well. When during video play-back users see an interesting scene such as the close-up on a speaker in a presentation, they may be interested in finding similar scenes even if no predefined image class exists for that particular situation. The present invention provides a method for interactively selecting a scene from a video and finding similar scenes in the video. The present invention includes a system that can rapidly find time intervals of video similar to that selected by a user. When displayed graphically, similarity results assist in determining the structure of a video or browsing to find a desired point. Because each video frame is represented as a small number of coefficients, similarity calculations are extremely rapid, on the order of thousands of times faster than real-time. This enables interactive applications according to the present invention.

Conventional systems lack the specificity, generality, or speed to interactively find similar video regions. Conventional color-based systems result in too many false positive similarity matches. Conventional systems based on pixel-domain approaches are either too computationally demanding, such as the image-domain correlation matching, or too specific in that video must be nearly identical to be judged similar. In contrast, according to the present invention, the reduced-transform features and statistical models are accurate, generalize well, and work rapidly.

The present invention is embodied in a system for interactively browsing, querying, and retrieving video by similarity. Interactively selected video regions are used to a train statistical model on-the-fly. Query training segments are either individual frames, segments of frames, non-contiguous segments, or collections of images. The system can also be used to retrieve similar images from one or more still images. Similarity measures are based on statistical likelihood of the reduced transform coefficients. The similarity is rapidly calculated, graphically displayed, and used as indexes for interactively locating similar video regions.

According to the present invention, search and segmentation are done simultaneously, so that prior segmentation of the video into shots is not required. Each frame of the video is transformed using a discrete cosine transform or Hadamard transform. The transformed data is reduced by discarding less important coefficients, thus yielding an efficient representation of the video. The query training segment or segments are used to train a Gaussian model. A simple search can then be performed by computing the probability of each video frame being produced by the trained Gaussian model. This provides a sequence of confidence scores indicating the degree of similarity to the query. Confidence scores are useful in a video browser, where similarity can be readily displayed.

According to an embodiment of the present invention, reduced transform coefficients corresponding to each frame in the video are stored in a precomputed feature vector database. This feature vector database is accessed both for training statistical models after selection of a query training segment, and for evaluating similarity of each frame once the statistical model is trained.

The present invention includes methods for retrieving video segments by similarity. The user forms a query by selecting a video segment or segments. A statistical model of the query video segment is formed and is used to search the video for similar segments. The similarity score for each frame is computed based on image transform coefficients. Similar video segments in the video database are identified and presented to the user. Rather than returning a discrete set of similar video clips, the system provides a similarity score that can be used in a video browser to view more or less similar segments.

According to an aspect of the present invention, a time bar below the video window displays the likelihood of each frame and thus the degree of similarity to the query training segment. The darker the bar, the more similar the video is to the query training segment. This browser is also used to randomly access the similar segments by clicking on the similar sections of the time bar. The user may interactively define one or more training video segment by mouse click-and-drag operations over a section of the time bar.

According to another aspect of the present invention, a web-based browser displays all frames at a periodic predetermined time interval, such as five seconds, in the video. The user selects the training video segment or segments by selecting adjacent periodic frames. All non-displayed intervening frames are then used as the training segment. For example, all frames in the five second interval between two selected adjacent periodic frames are used to as a training segment. Once calculated, similarity is displayed as a shade around the displayed periodic frames.

According to another aspect of the present invention, an adjustable threshold slider bar is provided in the browser. Frames having similarly scores above the threshold are marked as similar. Video segmentation is performed from a frame-by-frame measure of similarity. A Gaussian model can be used for segmentation by finding when the model likelihood crosses a threshold. Contiguous similar frames define a similar segment. Similar segments are displayed in the browser, and skip forward and backward buttons may be used for browsing to the beginning of the next subsequent or previous similar segment. If the time bar is activated in this segmentation, dark sections of the time bar indicate similar segments, and white sections of the time bar indicate non-similar segments.

These and other features and advantages of the present invention are more fully described in the Detailed Description of the Invention with reference to the Figures.

BRIEF DESCRIPTION OF THE DRAWINGS

FIG. 6 illustrates a transform matrix resulting from a discrete cosine transform of a video frame.

FIG. 7 illustrates a variance matrix computed from two or more transform matrices according to the present invention.

FIG. 9 illustrates a mean feature vector computed from two or more feature vectors of training frames having the feature set shown in FIG. 8 according to the present invention.

FIG. 10 illustrates a diagonal covariance matrix computed from two or more feature vectors of training frames having the features set shown in FIG. 8 according to the present invention.

FIG. 15 illustrates a diagonal covariance matrix computed from two or more feature vectors of training frames having the feature set shown in FIG. 13 according to the present invention.

FIG. 24 illustrates a class transition probability matrix according to the present invention corresponding to the class transition diagram illustrated in FIG. 23.

The Figures are more fully described in the Detailed Description of the Invention.

DETAILED DESCRIPTION OF THE INVENTION

For video summarization, browsing, and retrieval it is often useful to know what kind of images comprise a given video. For example, it is useful know which shots contain close-ups of human faces to facilitate their inclusion in a summary of the video. The present invention includes methods for segmenting and classifying video sequences into a pre-defined set of classes. Examples of video classes include close-ups of people, crowd scenes, and shots of presentation material such as power point slides. The features used for classification are general, so that users can define arbitrary class types.

Figure 1:
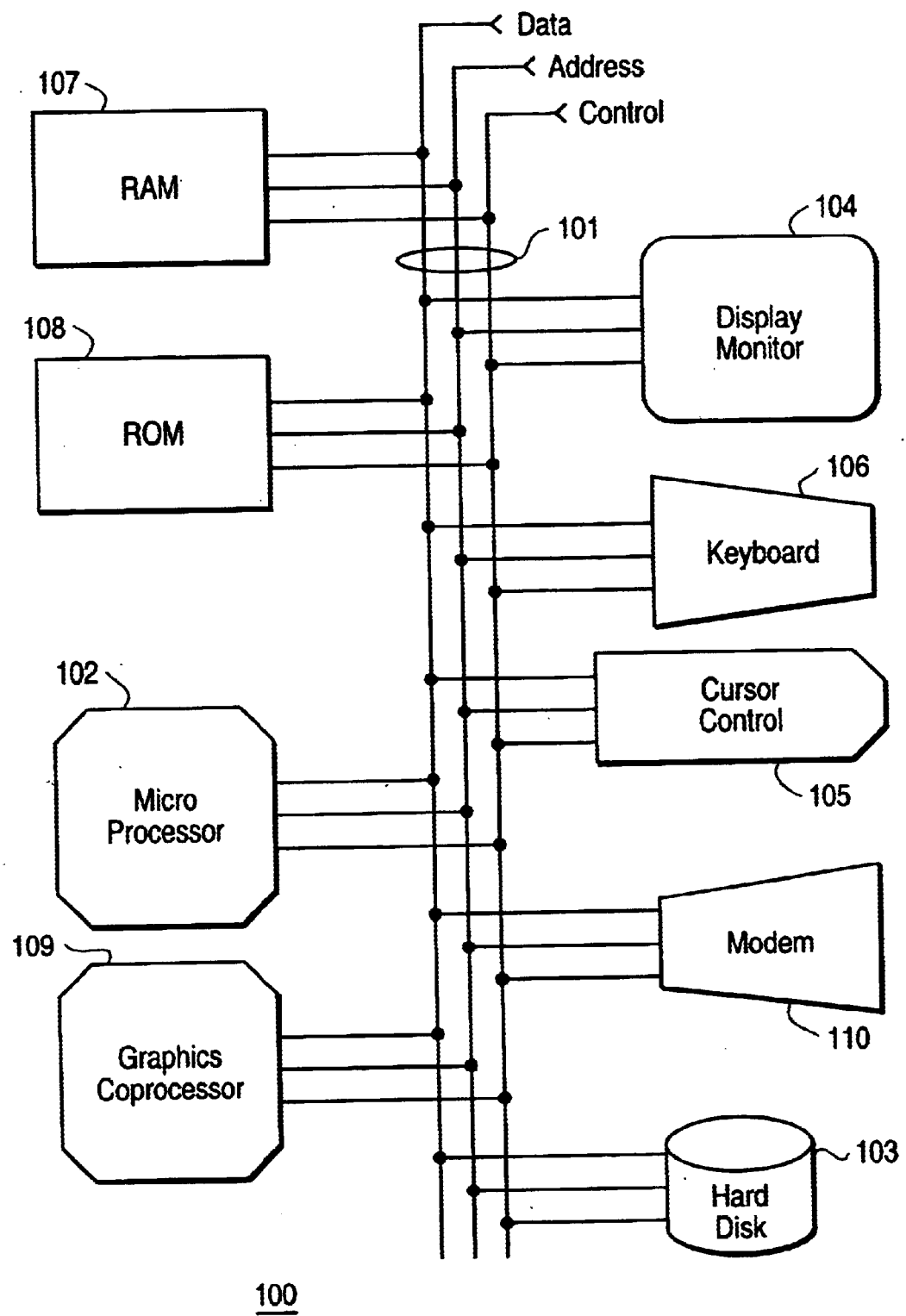
FIG. 1 illustrates a general purpose computer architecture suitable for performing the methods of the present invention.

FIG. 1 illustrates a general purpose computer system 100 suitable for implementing the methods according to the present invention. The general purpose computer system 100 includes at least a microprocessor 102. The cursor control device 105 is implemented as a mouse, a joy stick, a series of buttons, or any other input device which allows a user to control position of a cursor or pointer on the display monitor 104. The general purpose computer may also include random access memory 107, external storage 103, ROM memory 108, a keyboard 106, a modem 110 and a graphics co-processor 109. The cursor control device 105 and/or the keyboard 106 are exemplary user interfaces for receiving user input according to the present invention. All of the elements of the general purpose computer 100 are optionally tied together by a common bus 101 for transporting data between the various elements. The bus 101 typically includes data, address, and control signals. Although the general purpose computer 100 illustrated in FIG. 1 includes a single data bus 101 which ties together all of the elements of the general purpose computer 100, there is no requirement that there be a single communication bus 101 which connects the various elements of the general purpose computer 100. For example, the microprocessor 102, RAM 107, ROM 108, and graphics co-processor 109 are alternatively tied together with a data bus while the hard disk 103, modem 110, keyboard 106, display monitor 104, and cursor control device 105 are connected together with a second data bus (not shown). In this case, the first data bus 101 and the second data bus (not shown) are linked by a bidirectional bus interface (not shown). Alternatively, some of the elements, such as the microprocessor 102 and graphics co-processor 109 are connected to both the first data bus 101 and the second data bus (not shown) and communication between the first and second data bus occurs through the microprocessor 102 and graphics co-processor 109. The methods of the present invention are thus executable on any general purpose computer system such as the 100 illustrated in FIG. 1, but there is clearly no limitation that this computer system is the only one which can execute the methods of the present invention.

Figure 2:
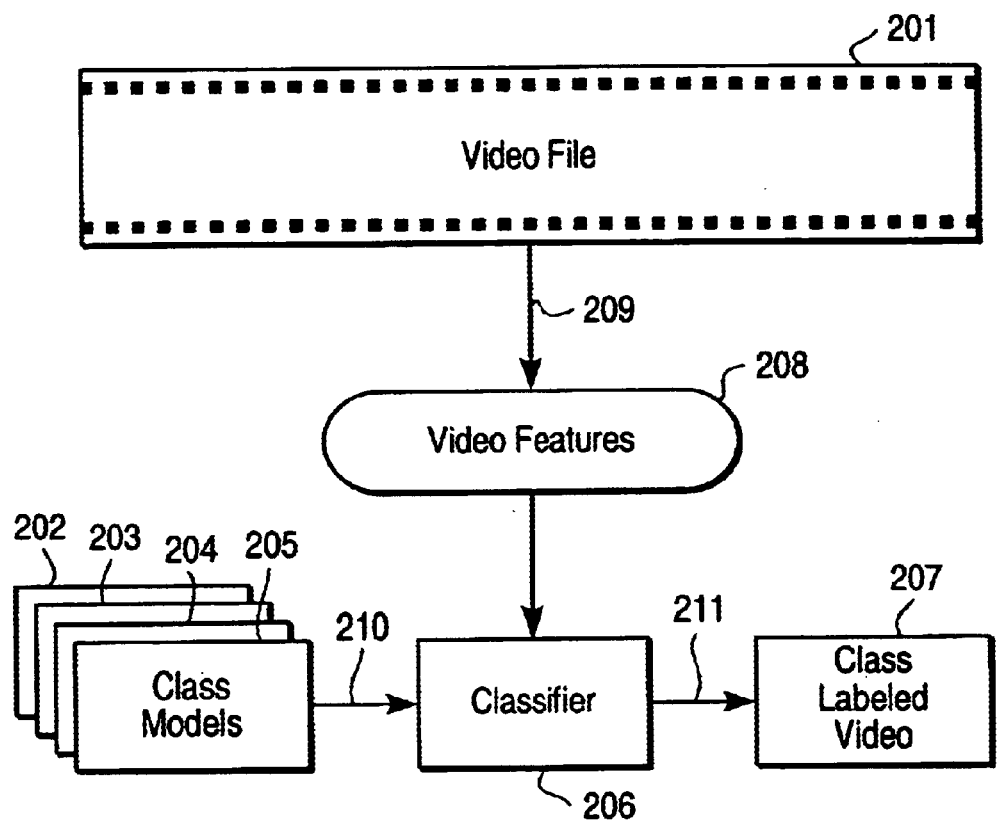
FIG. 2 illustrates the data flow in a method for performing classification of video according to the present invention.

FIG. 2 illustrates the data flow in a method for performing classification of video according to the present invention. Video file 201 is a digital representation of a video recording. Video file 201 is usually encoded in a standard digital format such as MPEG. Image class statistical models 202 through 205 represent predefined Gaussian distributions corresponding to four distinct image classes. Arrow 209 represents processing of the video file 201 to extract feature vector 208. Among the processing that occurs at arrow 209 are the following. If encoded in a standard format such as MPEG, the video file 201 is decoded and transformed into a rectangular matrix of pixels. The rectangular matrix of pixels is reduced to a smaller rectangular matrix of sub-images, where each sub-image represents a gray scale code derived from the pixels corresponding to the sub-image. A transform is applied to the rectangular matrix of sub-images resulting in a matrix of transform coefficients. From the matrix of transform coefficients, video features 208 are selected as the transform coefficients found at coefficient positions within the transform matrix designated as the video set for video classification. The classifier 206 takes each video feature 208, and inputs the video features 208 into each of the image class statistical models 202 through 205. This results in a classification of each frame of the video file 201 into one of the image classes represented by image class statistical models 202 through 205. The corresponding image class determined by the classifier 206 to correspond to a frame of the video file 201 is indexed onto a class labeled video 207. Thus, the class labeled video 207 includes information associated with each frame indicating the image class to which the frame belongs.

As shown in FIG. 2, the system first extracts features for classification from the video sequences, for example discrete cosine transform coefficients, although other features such as color histograms are optionally used. Training data is used to build models for each class of video to be recognized. This training data consists of a sequence or multiple sequences of video from the class. The class models can either be based on Gaussian distributions or on hidden Markov models. Given the class models and features from an unknown video, the system segments and classifies the video into segments from the classes.

The Gaussian classifier computes a likelihood for each frame using the class models. The class of the frame is the class with the highest likelihood. Adjacent frames with the same class label are merged to form segments. In addition, the likelihood is optionally used in a browser that displays a degree of confidence of membership in each class. With the hidden Markov model method, hidden Markov model states correspond to the different video classes. The Viterbi algorithm is used to find the maximum likelihood state sequence and hence the class label at each frame. A confidence score is derived from the probability of the state sequence. The hidden Markov model classifier, while more complex than the frame-by-frame classifier above, serves to smooth segments by enforcing segment continuity and sequence. This effectively disallows single-frame class decision changes.

Each image or video frame is transformed, using a transform such as the discrete cosine transform or Hadamard transform. For many applications, a full video frame rate is not necessary, and frames are optionally decimated in time such that only one of several frames is transformed. This decimation dramatically reduces storage costs and computation times. The transform is applied to the frame image as a whole, rather than to small sub-blocks as is common for image compression. The transformed data is then reduced by discarding less significant information. This is done using one of a number of techniques, for example, truncation, principal component analysis, or linear discriminant analysis. For this application and as shown experimentally, principal component analysis works well as it tends to decorrelate feature dimensions, thus the data better matches the diagonal-covariance assumption of the Gaussian and hidden Markov model models described below. However, simply selecting coefficients with the highest variance has proved quite effective. This results in a compact feature vector (the reduced coefficients) for each frame. This representation is appropriate for classification, because frames of similar images have similar features.

Figure 3:
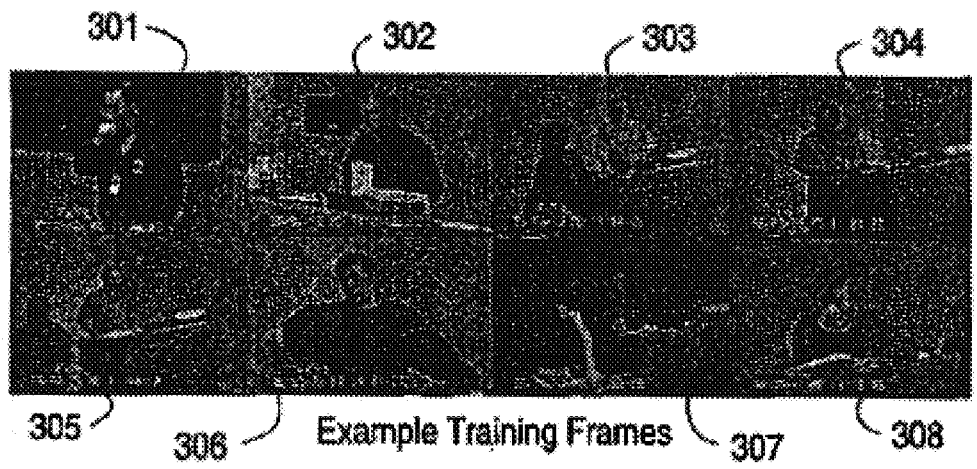
FIG. 3 illustrates training frames, inverse discrete cosine transforms of mean feature vectors derived from the training frames, and inverse Hadamard transforms of mean feature vectors derived from the training frames according to the present invention.
Figure 3:
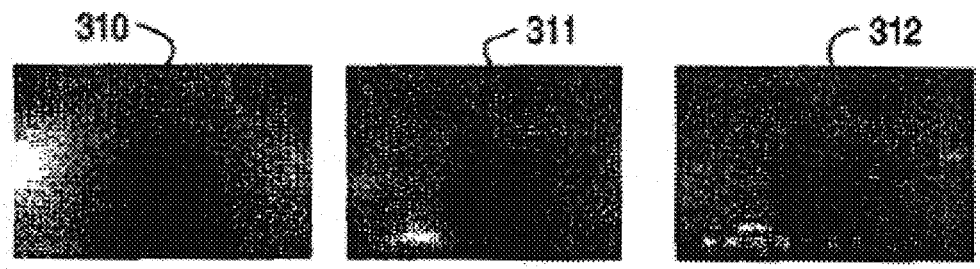
Figure 3:
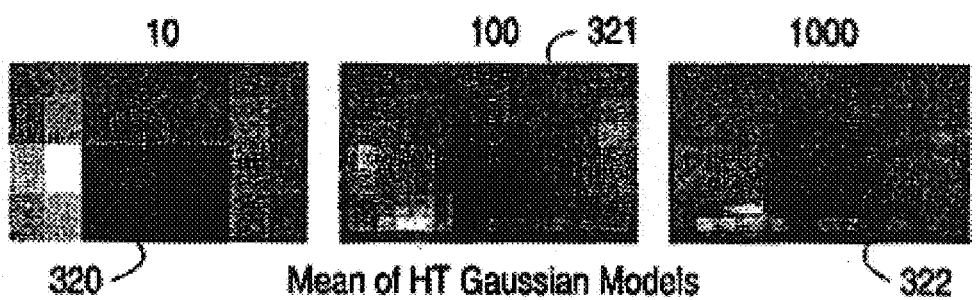

FIG. 3 illustrates training frames, inverse discrete cosine transforms of mean feature vectors derived from the training frames, and inverse Hadamard transforms of mean feature vectors derived from the training frames according to the present invention. Thus, training frames 301 through 308 represent a series of training images pertaining to a video image class. The image class represented by training images 301 through 308 are described in English terms as "speaker standing in front of podium." Frame 310 illustrates the inverse discrete cosine transform corresponding to the mean feature vector computed from the 8-entry feature vectors extracted from training frames 301 through 308. In frame 310, the feature set for video classification is a 10-entry feature set. Thus, only ten transform coefficients from each frame make up the feature vector associated with each training frame. Frame 311 represents the inverse discrete cosine transform of the mean feature vector computed from a 100-entry feature vector extracted from each of the training frames 301 through 308. Frame 312 is the inverse discrete cosine transform of a 1000-entry mean feature vector. Frame 312 shows more detail than frame 311, which itself shows more detail than frame 310, because of the increased number of coefficients used in the inverse discrete cosine transform.

Frame 320 represents the inverse Hadamard transform of the mean feature vector derived from the training images. Frame 321 represents the inverse Hadamard transform corresponding to a 1000-entry mean feature vector. Frame 322 represents the inverse Hadamard transform corresponding to a 1000-entry mean feature vector.

MPEG frames taken at ½-second intervals were decoded and reduced to 64×64 grayscale intensity sub-images. The resulting frame images were discrete cosine transform and Hadamard transform coded. Both the coefficients with the highest variance (rank) and the most important principal components were selected as features. Gaussian models were trained on the training set using a variable number of dimensions between 1 and 1000. FIG. 3 shows samples for one of the feature categories (figonw). That category consists of close-ups of people against a lighter (white) backrgound. Note how the images for this class are highly variable in camera angle, lighting, and position, perhaps more than images of a typical news anchor. The mean and covariance were trained using the highest-variance discrete cosine transform and Hadamard transform coefficients. Each model has been imaged by inverse-transforming the mean with the discarded coefficients set to zero. Though the covariance is not shown, it is clear the mean captures the major feature—the dark central figure—from the training data. FIG. 3 shows that even with a small number of coefficients, the major shapes in the training data are still recognizable when inversely transformed.

Figure 4:
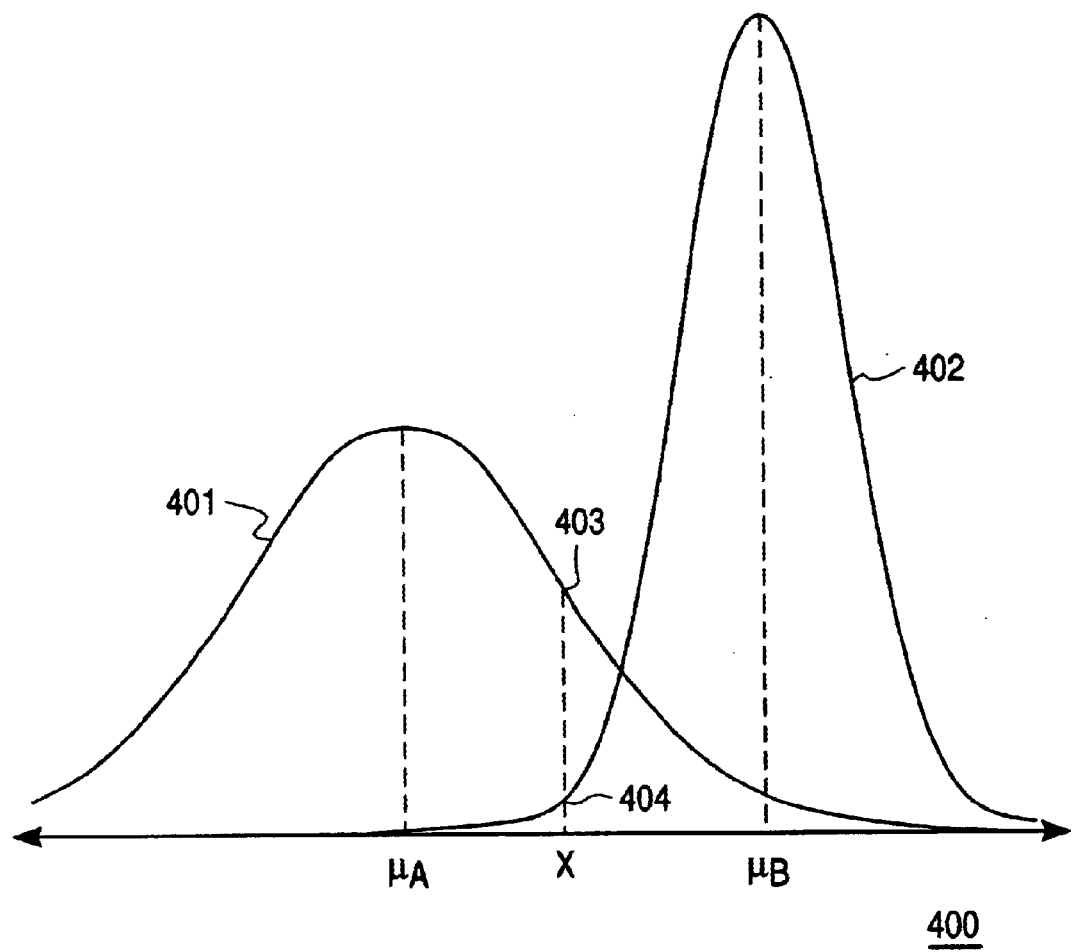
FIG. 4 illustrates single dimensional guassian distributions having different means and variances.

FIG. 4 illustrates two single-dimensional Gaussian distributions having different means and variances. Distribution A represented by probability curve 401 has mean $\mu_A$. Distribution B is represented by a probability curve 402 and has mean $\mu_B$. The probability of a particular value X being produced from distribution A is the vertical position relative to the axis of the point 403. Similarly, the probability of the value X being produced by the distribution B is the vertical height of point 404 relative to the axis. Because the probability at point 403 is higher than the probability at point 404, X most likely came from distribution A. FIG. 4 is a single dimensional plot, and given two image classes A and B and 1-entry feature set, FIG. 4 exactly illustrates the maximum likelihood approach taken according to the present invention of classifying video frames.

Given feature data, video segments are modeled statistically. A simple statistical model is a multi-dimensional Gaussian distribution. Letting vector x represent the features for one frame, the probability that the frame was generated by a Gaussian model c is $$P(x)=((2\pi)^{-d/2}|\Sigma_c|^{-1/2})\exp(-\tfrac{1}{2}(x-\mu_c)'\Sigma_c^{-1}(x-\mu_c)),$$

where $\mu_c$ is the mean feature vector and $\Sigma_c$ is the covariance matrix of the d-dimensional features associated with model c. The expression $(x-\mu_c)'$ is the transform of the difference vector. In practice, it is common to assume a diagonal covariance matrix, i.e. the off-diagonal elements of $\Sigma_c$ are zero. This has several advantages. Most importantly, it reduces the number of free parameters (matrix elements) from $d(d-1)/2$ to d, which is important given the high dimensionality d of the problem (d is on the order of 100). This also means that the inverse of the matrix is much simpler to compute and is more robust, because the covariance matrix is often ill-conditioned when computed from a small number of training samples. Thus to classify an image using Gaussian models, a set of example training images for each desired class is assembled, and the parameter vectors $\mu_c$ and $\Sigma_c$ are computed. Given an unknown image x, each image class probability is computed, and the image classified by the maximum-likelihood model. The log-likelihood alone is a useful measure of similarity to a particular class (the training set), and is used directly in applications such as the video browsers according to the present invention. More sophisticated models can use Gaussian mixtures, given the expectation-maximization algorithm to estimate the multiple parameters and mixture weights. As further alternatives, neural network or other types of classifiers are employed. For single Gaussians, computing $\mu_c$ and $\Sigma_c$, is computationally straightforward, and is done rapidly on the fly. In the case training of a model from a single image, the mean vector is set to the image features and the variance vector (diagonal covariance matrix) set to some ratio of the global variance across all images. Given an unknown frame and several models, the unknown frame is classified by which model produces it with the maximum probability.

Figure 5:
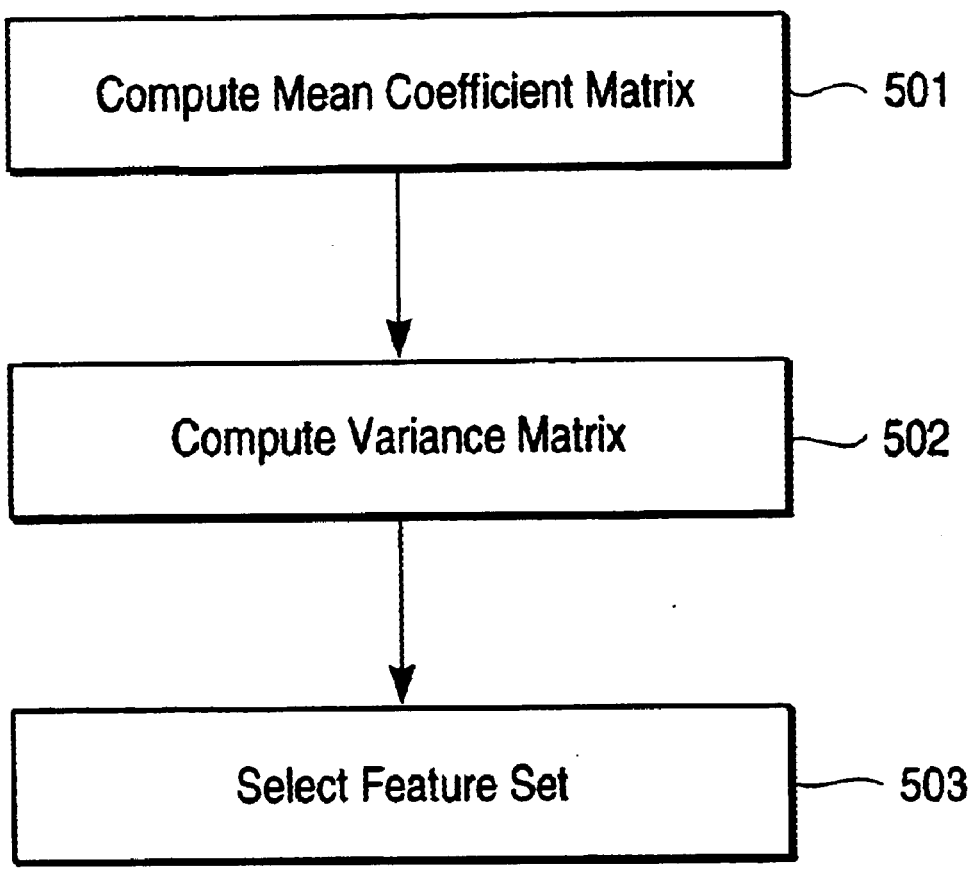
FIG. 5 illustrates in method for selecting a feature set for video classification according to the present invention.
Figure 8:
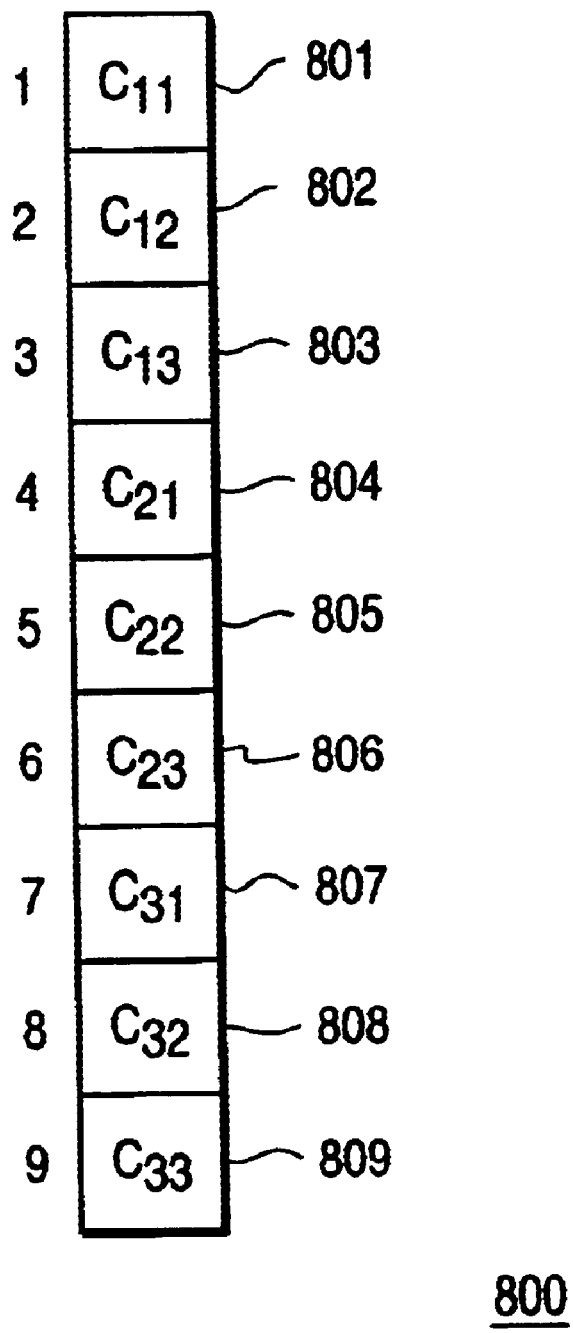
FIG. 8 illustrates a feature set determined by truncation according to present invention.

FIG. 5 represents an exemplary method for selecting a feature set for video classification according to the present invention. In other words, FIG. 5 represents the process of selecting which transform coefficient positions to extract and analyze both for purposes of training statistical models and for similarity measure and classification of video once the statistical models have been trained. The method described in FIG. 5 takes into consideration the observed characteristics of a number of training images. In the classification methods described below, the training images used to optimally select the feature set include images in all different classes. This helps the method shown in FIG. 5 to select the optimum set of features for distinguishing images of different classes. As an alternative to the method shown in FIG. 5, the coefficient positions for use in the feature set are selected by truncation, with no consideration of any observed video characteristics, by merely selecting the lowest frequency coefficients, such as shown in FIGS. 6 and 8.

There are V×H discrete cosine transform coefficient positions from which a smaller number d are selected as a feature set. In the example shown in FIG. 6, V=H=8. In a more typical, practical scenario, V=H=64, thus there are 4096 (64×64) coefficient positions from which to select. One alternative method for picking the highest variance coefficients is to compute a 4096×4096 covariance matrix, and then to pick the features appropriately, but not necessarily in order. The actual ordering of the reduced vector does not matter but must be consistent.

At step 501, a mean coefficient matrix is computed. A mean coefficient matrix has the same number V of rows and the same number H of columns as the matrix of sub-images for which the transform was applied, and also the same number of rows and columns as the resulting transform coefficient matrix. Each position in the mean matrix is the arithmetic average of the corresponding coefficients found in the training images. In an embodiment, the mean coefficient matrix is computed as a preliminary step in the process of computing the variance matrix. In another embodiment, the values of the mean coefficient matrix are themselves analyzed to select the feature set. For example, the coefficient positions having the highest magnitude mean values are selected as the feature set in an embodiment. At step 502, a variance matrix is computed. The variance matrix has the same number V of rows and the same number H of columns as the mean matrix and the transform matrices. Each value in the variance matrix 502 represents the statistical variance of the corresponding positions in the transform matrices of the training images. Alternatively, each value in the variance matrix 502 represents a "variance" measure which is other than the standard statistical variance, but that nonetheless represents a measure of variation. For example, the arithmetic average absolute value of the difference of each observed coefficient from the mean coefficient can be used as a "variance" measure, rather than the sum of the squared differences as is used for the standard statistical variance.

At step 503, the feature set is selected. The feature set is selected at 503 by one of a variety of methods according to the present invention. For example, the feature set is optionally selected as the d coefficient positions having the highest mean magnitudes. Alternatively, the feature set is selected as the d coefficient positions having the highest variance value in the variance matrix. As another alternative, the feature set is selected by principal component analysis or linear discriminate analysis.

In a most simple feature set selection method, the d coefficient positions in the feature set are selected by truncation, so that only the lowest frequency coefficients in the transform matrices are selected to comprise the feature set regardless of the values of the actual coefficients at those positions in any of the training frames. Indeed, by truncation, no training frames need to be analyzed at all because it is merely assumed that the lowest frequency components are the most important.

It should be noted that the selection of the feature set need not occur for each group of training images. More typically, the feature set is selected based upon one of the above methods using all of the training images from all of the class models which are used in the classification method. For example, all of the training images used to define each of class models 202 through 205 in FIG. 2 are analyzed by computing mean matrix and variance matrix across all of those training images to determine the optimal feature set for classification across each of those class models. Thus, preferably the same feature set is used for all class models so that the same feature vector is retrieved for each video image class in the classification method according to the present invention. However, there is no requirement that the same feature set be used for each of the image classes according to the present invention. In this regard, each image class may have its feature set optimally selected for detection of that image class, with the increased computational expense being that different feature vectors must be extracted from each video frame to enable the computation of the corresponding probability for that image class.

FIG. 6 illustrates a transform matrix resulting from a discrete cosine transform of a video frame. Column 1 represents horizontal frequency 0 (thus direct current), column 2 represents horizontal frequencies $f_h$, and column 8 represents coefficients of horizontal frequency 13 $f_h$. Similarly, row 1 represents coefficients of vertical frequency 0 (in other words DC), column 2 represents vertical frequency $f_v$. Row 8 of the transform matrix 600 represents coefficients of frequency 13 $f_v$. The nine coefficients in the upper left-hand corner of the transform matrix 600 represent the lowest frequency coefficients in the transform matrix. Those nine coefficients enclosed by brackets 601 and 602 are the nine coefficient positions which are selected by a nine coefficient truncation method of selecting the feature set according to the present invention. Since higher frequency coefficients represent details of images, they are frequently less important in determining the video image class of a particular frame.

FIG. 7 illustrates a variance matrix computed from two or more transform matrices according to the present invention. FIG. 8 illustrates a feature set 800 determined by truncation according to the present invention. The nine coefficients of the transform matrices corresponding to the lowest frequency components were chosen as the feature set 800 shown in FIG. 8. For example, entries 801, 802, and 803 represent the first three coefficient positions in the transform matrix 600 shown in FIG. 6 at row 1, entries 804, 805, and 806 represent the lowest frequency components in the second column of the transform matrix 600, and entries 807, 808, and 809 represent the lowest frequency coefficient positions in the third row of the transform matrix 600. The first three rows of the transform matrix 600 represent the lowest vertical frequencies in the transform and thus the nine elements designated in feature set 800 are the appropriate choices for a truncation method.

FIG. 9 illustrates a mean feature vector 900 computed from two feature vectors of training frames having the feature set shown in FIG. 8 according to the present invention. Thus, the values of the mean matrix (not shown) corresponding to the coefficient 801 through 809 are stored as mean feature vector 900.

FIG. 10 illustrates a diagonal covariance matrix computed from two or more feature vectors of training frames having the feature sets shown in FIG. 8 according to the present invention. Covariance matrices are always square and symmetric. The covariance is a matrix of dimension d×d. The covariance represents the correlation across all different dimensions. By using a diagonal covariance, there are only d non-zero values, but for purposes of mathematic operations, it must be treated as a matrix, although it can be thought of as a d-entry vector. All off-diagonal entries of the diagonal covariance matrix 1000 are set to zero under the assumption that all features in the feature set are statistically uncorrelated with other features in the feature set. If the features are in fact correlated, principal component analysis is optionally employed to transform coordinates of the feature space so that the diagonal covariance assumption better satisfied. The diagonal covariance matrix 1000 corresponds to the feature vector 900 shown in FIG. 9 and the feature set 800 determined by truncation of the transform matrix 600 shown in FIG. 6.

Figure 11:
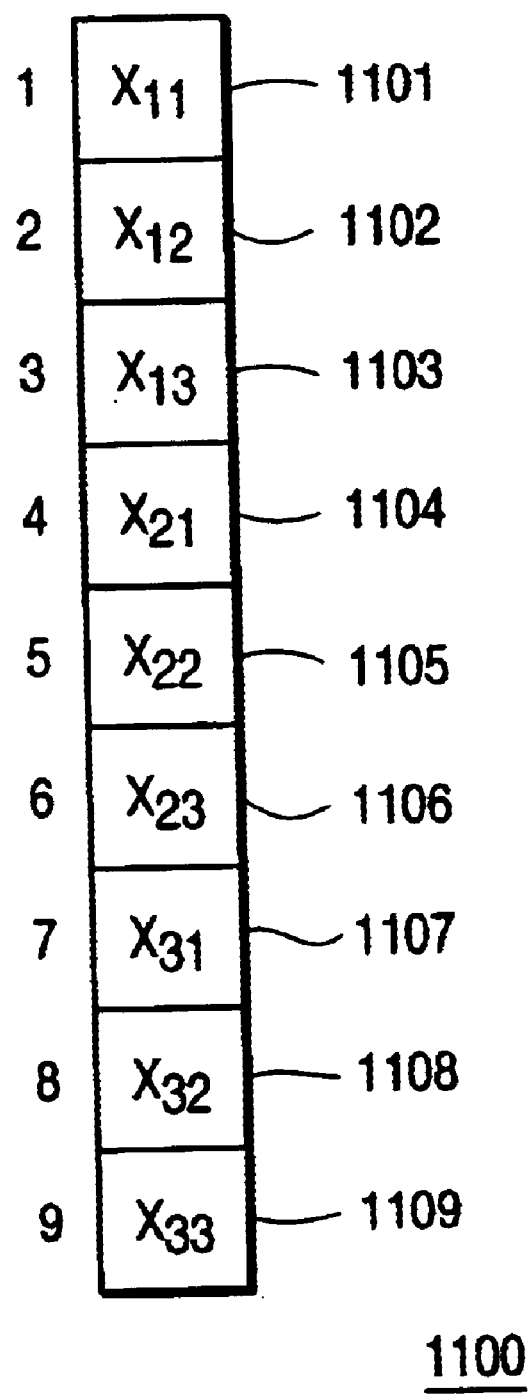
FIG. 11 illustrates a feature vector retrieved for a frame having the feature set shown in FIG. 8 for classification according to the methods of the present invention.

FIG. 11 illustrates a feature vector 1100 retrieved for frame having a feature set shown in FIG. 8 according to the methods of the present invention. Thus, each entry 1101 through 1109 of the feature vector 1100 contain actual transform coefficients obtained from an image frame which has been transformed. Feature vector 1100 is an example of the video features 208 illustrated in FIG. 2 which are extracted from the video file 201 in the classification method according to the present invention.

Figure 12:
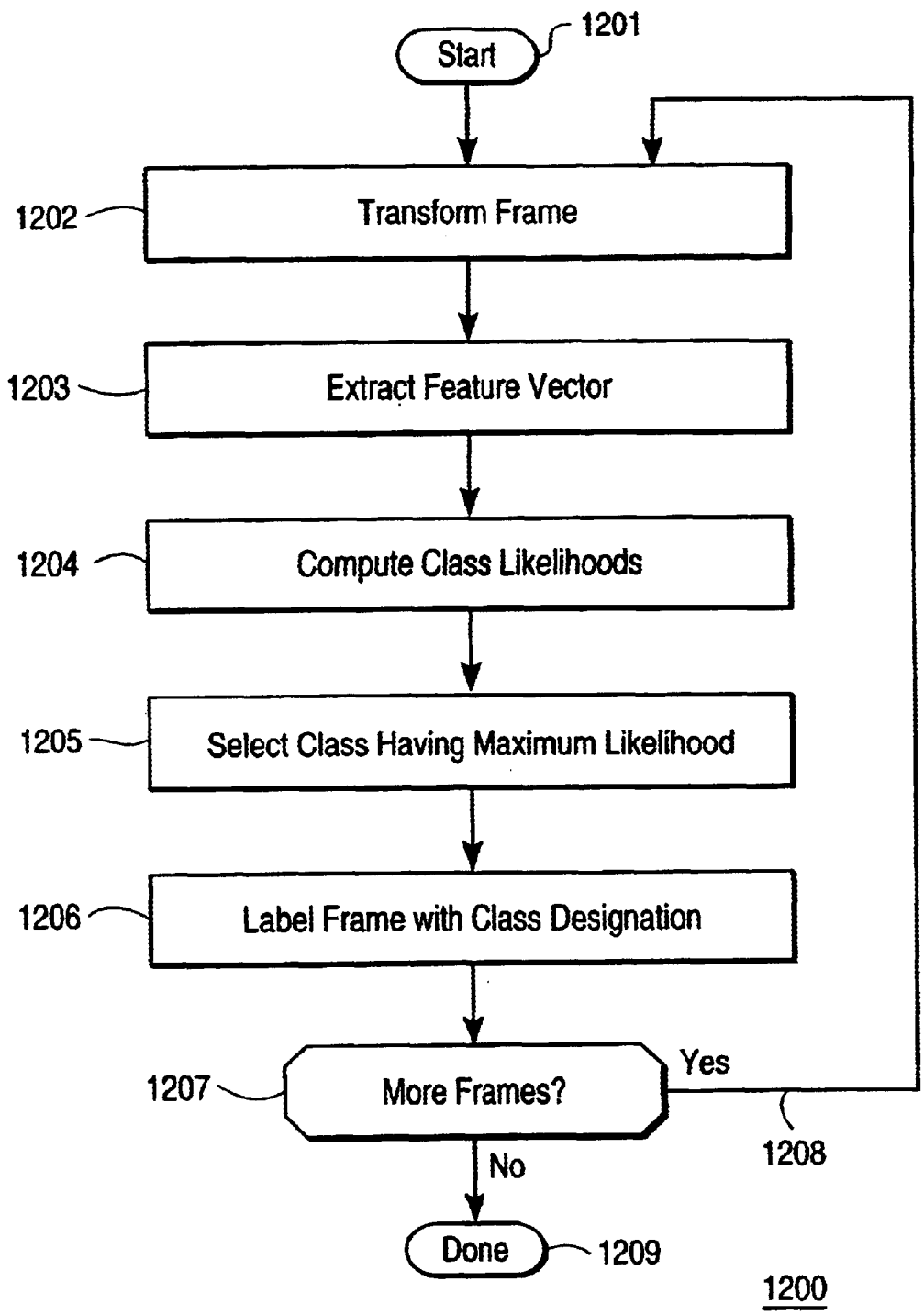
FIG. 12 illustrates a method of the classifying the frames of a video into one of two or more video image classes according to the present invention.

FIG. 12 illustrates a method of classifying the frames of video into one of two or more video images classes according to the present invention. The method starts at step 201, and at step 202 the first frame of the video is transformed using either a discrete cosine transform or Hadamard transform. At step 1203, the feature vector corresponding to the coefficients found in the positions indicated by the feature step are extracted. At step 1204, the likelihood, or probability of each image class statistical model producing the feature vector are computed. At step 1205, the image class having the image class statistical model which produced the maximum probability of producing the feature vector corresponding to the frame is selected. At step 1206, the frame is labeled with its class designation, which was determined in step 1205. At this step, the frame is thus indexed according to its class so that it is browsed or retrieved with ease in the future. Test 1207 determines if more frames exist in the video, or in other words, if this is the last frame of the video being classified. If there are more frames than branch 1208 returns the method to the step 1202 of transforming the next frame and if this is the last frame of the video then step 1209 indicates that the class labeled video 207 shown in FIG. 2 is completed.

Figure 13:
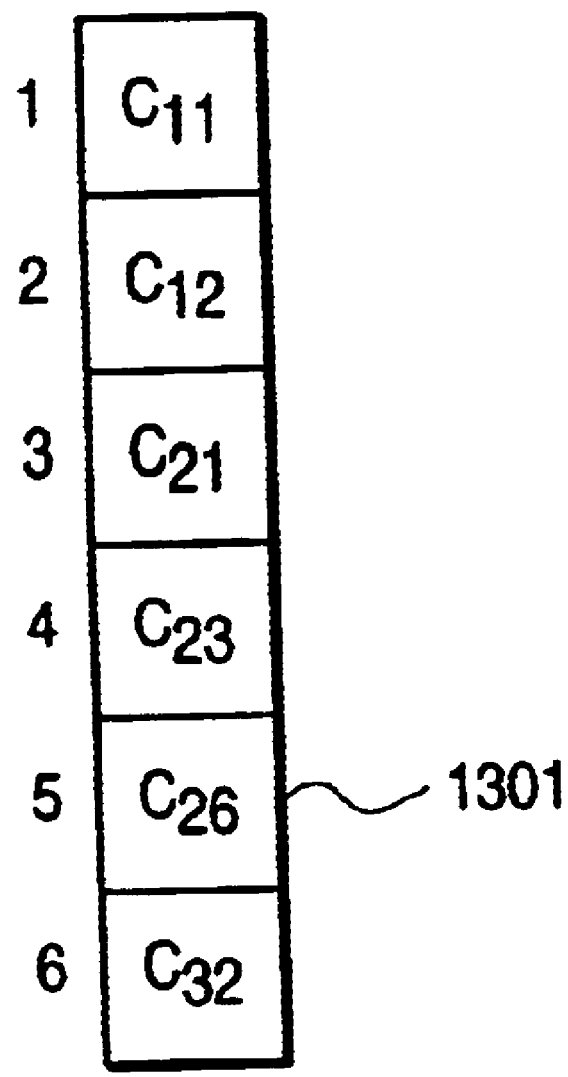
FIG. 13 illustrates a feature set determined by the principal component analysis, selection of coefficients having the highest variances, or selection of coefficients having the highest means according to the present invention.

FIG. 13 illustrates a feature set determined by a method other than truncation according to the present invention. For example, one possible result of principal component analysis, selection of coefficients having the highest variances, or selection of coefficients having the highest means is demonstrated by the feature set 1300 illustrated in FIG. 13. The six-entry feature set 1300 shown in FIG. 13 includes the coefficient positions 610 through 615 shown in FIG. 6. The inclusion of coefficient position 614 at column 6, row 2 of the transform matrix 600 shown in FIG. 6 and included as coefficient position 1301 of the six-entry feature vector 1300 shown in FIG. 13 indicates that a relatively high horizontal frequency component corresponding to $11f_h$ is useful in distinguishing image classes. The inclusion of higher frequency components frequently results when recognition of frames requires detecting small, sharp features, such as text which typically has sharp edges of relatively small size.

Figure 14:
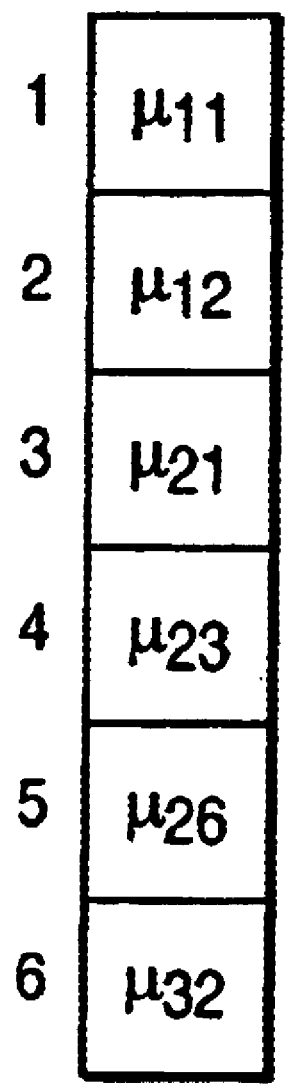
FIG. 14 illustrates a mean feature vector computed from two or more feature vectors of training frames having the feature set shown in FIG. 13 according to present invention.

FIG. 14 illustrates a mean feature vector 1400 computed from two or more feature vectors of training frames having the 6-entry feature set shown in FIG. 13 according to the present invention.

FIG. 15 illustrates a diagonal covariance matrix 1500 computed from two or more feature vectors of training frames having the feature set shown in FIG. 13 according to the present invention. Once again, the off-diagonal elements of the diagonal covariance matrix 1500 are set to zero under the assumption that there is no correlation between the values at coefficient positions indicated in the feature set.

Figure 16:
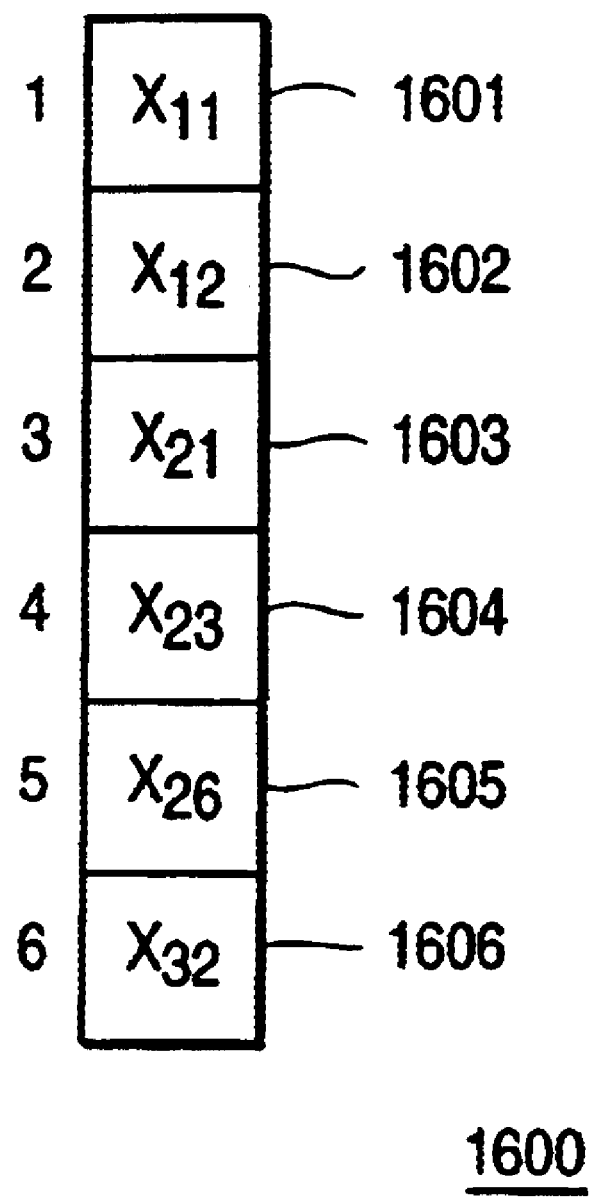
FIG. 16 illustrates a feature vector retrieved for a frame having the feature set shown in FIG. 13 for classification according to the methods of the present invention.

FIG. 16 illustrates a feature vector 1600 retrieved from a frame having the feature set 1300 shown in FIG. 13 for classification according to the present invention. Thus, element 1601 through 1606 represent actual individual transform coefficients obtained from a transform matrix resulting from the transform of a frame to be classified according to the methods of the present invention.

Given sufficient data reduction, a classifier is easily trained according to the present invention to discriminate between typical meeting video scenes such as presentation slides, presenter, or audience. Besides the domain of meeting videos, this approach should work well whenever images in a particular class have a similar composition, for example shots of a news anchor. To assess the methods according to the present invention, a number of experiments on a corpus of videotaped staff meetings were performed. The video shots were categorized into six categories and divided the corpus into a training set and a test set.

Video classification experiments were performed on a corpus of video-recorded staff meetings held over a six-month period. Each video was produced by a camera operator, who switches between video from three cameras with controllable pan/tilt/zoom, and the video signals from a personal computer and rostrum camera. The latter device allows presentation graphics such as transparencies and opaque materials to be displayed on a rear-projection screen. Thus video shots typically consist of presenters, audience shots, and presentation graphics such as power point slides or transparencies. The resultant video is MPEG-1 encoded and stored on a server.

There were 21 meeting videos in the corpus, for a total of more than 13 hours of video. The corpus was arbitrarily segmented into testing and training segments by taking alternate meeting videos. The testing and training data were labeled into six classes shown in Table 1 below, which also shows the number of frames in each training and test set. A significant amount of data did not fit into any category and was left unlabeled. Six classes were chosen to represent presentation graphics, (slides), long shots of the projection screen both lit (longsw) and unlit (longsb), long shots of the audience (crowd) and medium close-ups of human figures on light (figonw) and dark (figonb) backgrounds. When a single category (such as screen shots) and significantly different modes (such as lit and unlit screen shots), a separate model for each mode was used. This ensured a superior match with the single-Gaussian models, though another approach alternatively uses a Gaussian mixture to model the combined classes. Different models are optionally combined when they are intended to model the same logical class; for example, the combination of the figonw and figonb classes when presenting classification results, as the background color does not matter when the intent is to find human figures.

TABLE 1

| Shot Category | Training Data | Test Data |
| --- | --- | --- |
| slides | 16,113 | 12,969 |
| longsw | 9,102 | 5,273 |
| longsb | 6,183 | 5,208 |
| crowd | 3,488 | 1,806 |
| figonw | 3,894 | 1,806 |
| figonb | 5,754 | 1,003 |
| not categorized | 13,287 | 10,947 |
| Total | 57,821 | 39,047 |

The experiments demonstrate that a Gaussian classifier detects video frames from a particular class in the context of a longer video. This is used to segment shots, defined as a region of similar frames, from a longer video. This provides useful index points, for example the beginning of a shot containing slides. In the other direction, if shots have been already located, for example using frame or color differences, a shot model can easily be trained on all the frames from that shot. This allows shots to be retrieved by similarity, because the covariance captures differences caused by motion or other changes. Keyframes to represent a given shot are easily found by finding the frame closest to the shot mean, using a likelihood distance metric. Because the number of coefficients that represent an image is extremely modest (as small as 10 per frame for the principal component analysis features), one alternative is the storing of the features alongside the video with virtually no overhead, in comparison to the video data itself. Gaussian models are straightforward to compute so models are optionally trained on-the-fly. This enables applications like interactive video retrieval, where the user indicates the desired class, for example, by selecting a video region by dragging across the time bar. A model is rapidly trained on the features for this region, and the similarities corresponding to frames of a large video corpus are rapidly computed. Regions of high likelihood in the corpus are regions that match the selected video well, and serve as indexes into the corpus.

To show the different model results without thresholding, a maximum-likelihood approach was used to classify labeled test frames. Table 2 below shows the results from using the 30 highest-variance discrete cosine transform coefficients. The class fig is a superset of the combined figonw and figonb classes. Each column is the ground-truth label of the test frames; the rows indicate the fraction of the samples in the test set that are recognized as the row class. Non-zero off-diagonal elements represent classification errors. Columns sum to 1 as every labeled frame has a maximum-likelihood class even if different from the label.

TABLE 2

|  | slides | longsw | longsb | crowd | fig |
| --- | --- | --- | --- | --- | --- |
| slides | 0.872 | 0.017 | 0.000 | 0.000 | 0.000 |
| longsw | 0.009 | 0.900 | 0.000 | 0.000 | 0.000 |
| longsb | 0.000 | 0.002 | 0.749 | 0.000 | 0.000 |
| crowd | 0.001 | 0.042 | 0.014 | 0.848 | 0.010 |
| fig | 0.118 | 0.039 | 0.237 | 0.152 | 0.990 |

Figure 17:
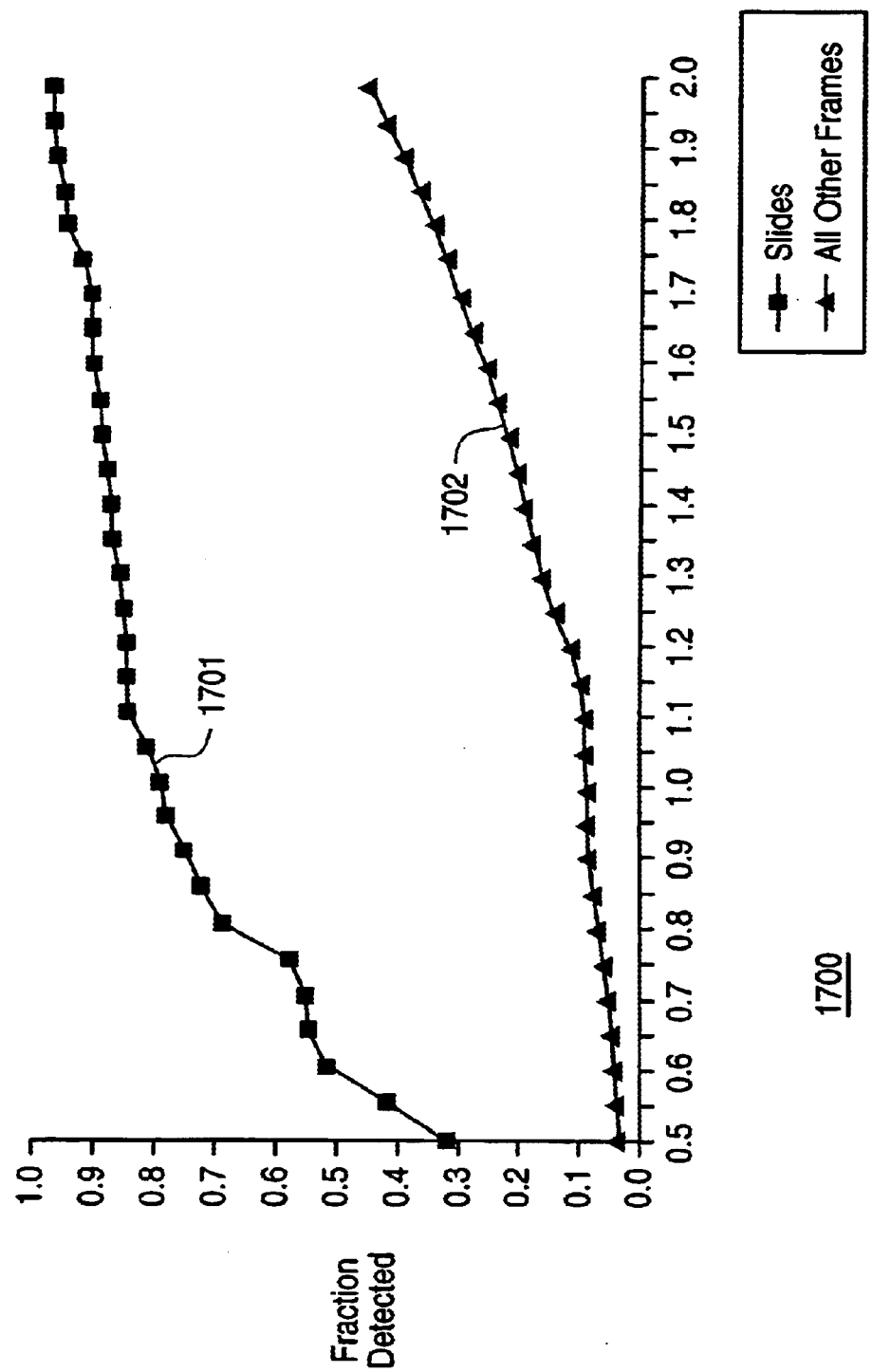
FIG. 17 illustrates the fraction of slide frames correctly identified as slides and the fraction of non-slide frames incorrectly identified as slides as a function of the multiple of the standard deviation of the slide image class statistical model used as a threshold for determining similarity in a method for determining similarity according to the present invention.

FIG. 17 illustrates the fraction of slide frames correctly identified as slides and the fraction of non-slide frames incorrectly identified as slides as a function of the multiple of the standard deviation of the slide image class statistical model used as a threshold for determining similarity in a method for determining similarity according to the present invention. As an alternative embodiment, the threshold for determining similarity is general, for example, determined by the maximum likelihood of other class models. The x axis represents the predetermined multiple of the standard deviation and the y axis represents the fraction of frames identified as similar based upon that particular choice of the threshold. Plot 1701 shows the fraction of frames which were actually slides that were correctly identified as slides by the similarity method of the present invention. Plot 1702 represents the fraction of frames which were not actually slides that were incorrectly classified as slides according to the similarity method of the present invention.

FIG. 17 demonstrates how a Gaussian model is used for classifying and segmenting video. Experiments on a corpus of staff meeting videos has shown that classes such as slides, speaker, and crowd are accurately recognized. MPEG-1 frames taken at ½-second intervals were decoded and reduced to 64×64 grayscale intensity sub-images. The resulting frame images were discrete cosine transform and Hadamard transform coded and the 100 coefficients with the highest average magnitude were selected as features. A diagonal-covariance Gaussian model was trained on 80 example slide frames and used to compute the probability of slide frames and titles in the unrelated test video.

Thresholding the likelihood at a multiple of the standard deviation (from the covariance $|\Sigma|^{1/2}$) has been shown to be quite effective in detecting class membership. Such a threshold is also fairly independent of the number of coefficients used. FIG. 17 shows how the slide detection rate varies across different thresholds. The graph indicates that a threshold around 1.1 standard deviation results in an 84% correct slide recognition rate with few (9%) false positives. The likelihood, when normalized by the standard deviation, is useful by itself as an indication of a given frame's similarity to a class model. All classes have similar detection rates, however, the number of false positives varies among the different classes.

Simple Gaussian models as above compute the average of the training images, and so lose any time-varying information associated with the image sequence. To capture dynamic information such as motion or sequence, models are optionally enhanced in a number of ways. By training models on the frame-to-frame difference or trend of the reduced features, time-varying effects such as motion or fades are modeled.

Figure 18:
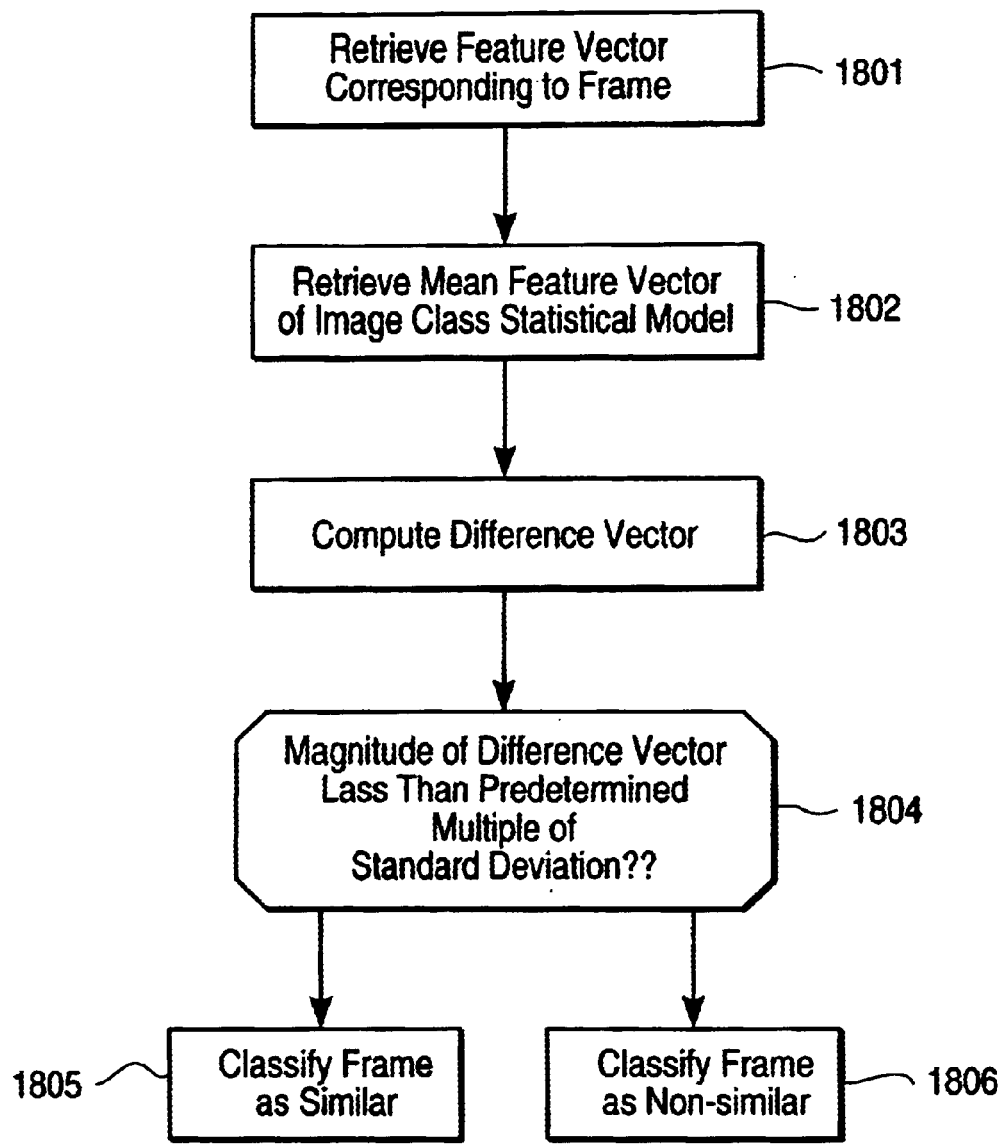
FIG. 18 illustrates a method for determining similarity of a video frame using an image class statistical model according to the present invention.

FIG. 18 illustrates a method for determining similarity of a video frame using an image class statistical model according to the present invention. At step 1801, a feature vector is retrieved corresponding to the frame currently under analysis. At step 1802, the mean feature vector corresponding to the image class statistical model is retrieved. At step 1803, a difference vector representing the subtraction of the mean feature vector from the feature vector is computed. At step 1804, the magnitude of the difference vector is compared to the predetermined multiple of the standard deviation of the image class statistical model. If the magnitude of the difference is less than the predetermined multiple of the standard deviation, then step 1805 classifies the frame as similar. If the magnitude is not less than the multiple of the standard deviation, then step 1806 classifies the frame as nonsimilar. It should be noted that the method of determining similarity illustrated in FIG. 18 does not require the actual probability computation using the Gaussian formula. Instead, the magnitudes of the difference vector and the standard deviation are computed as euclidean distances. The magnitude of the difference vector is computed by the square root of the sum of the squares of its d entries. The standard deviation of the image class is computed as the square root of the sum of the diagonal elements of the diagonal covariance matrix.

Figure 19:
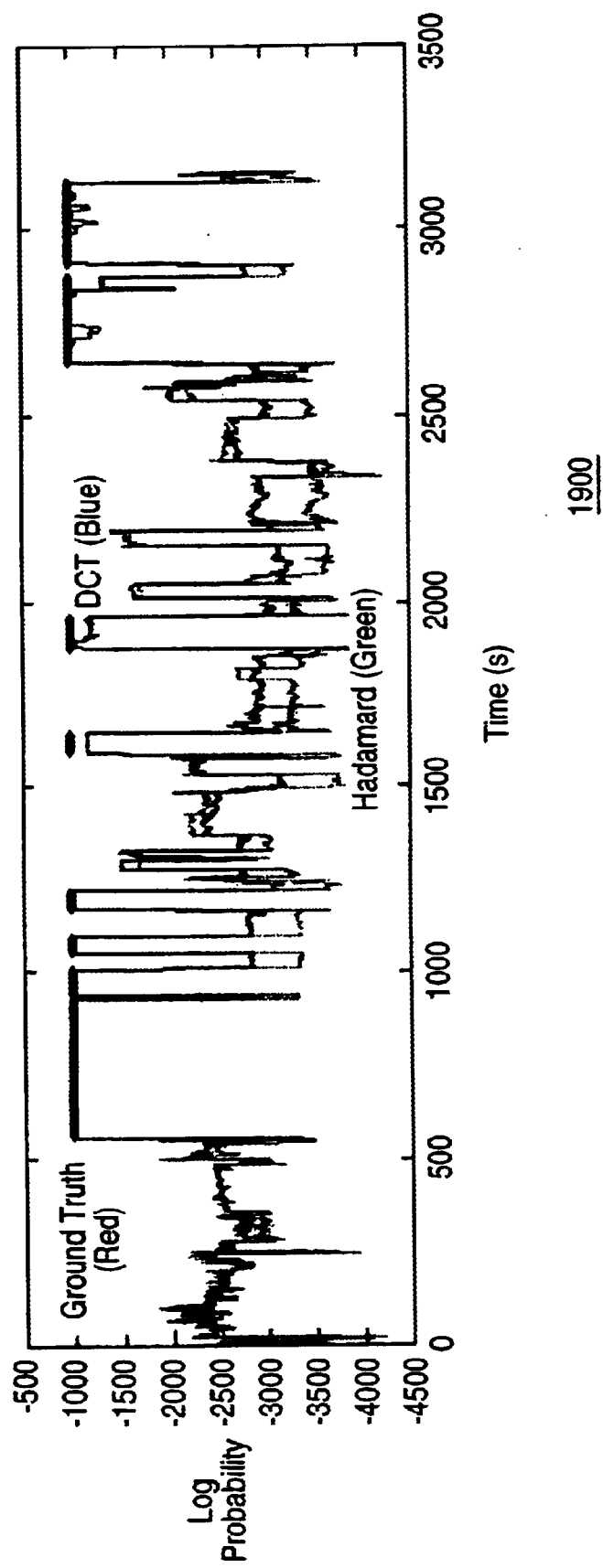
FIG. 19 illustrates a display of the logarithm of the probability of the video image class statistical model producing the various frames of a video according to the present invention.

FIG. 19 illustrates a display of the logarithm of the probability of the video image class statistical model producing the various frames of the video according to the present invention. Because logarithm is a monotonic function, logarithm of probabilities are compared in the same way that the probabilities are compared to determine more or less similarity.

FIG. 19 shows the log-likelihood of a Gaussian model trained on slide images across the test video lasting nearly an hour. The "ground truth" indicating when a slide was actually shown in the video is shown as a wide bar near the top. Clearly, the log-likelihood is a good indication of when a slide is being shown on the video. Thresholding the log-likelihood at one standard deviation (computed from the covariance matrix $\Sigma_c$) has shown to be quite effective in classifying individual frames. Thresholding the likelihood at a multiple of the standard deviation (computed from the covariance) has shown to be quite effective in detecting class membership. Such a threshold is also fairly independent of the number of coefficients used.

The similarity between any particular frame or video segment of frames and the image class is calculated according to the present invention. For a Gaussian model, the similarity measure of a given frame is the likelihood, alternatively in the log domain. A Gaussian model can also be used to segment video by finding those frames when the similarity measure crosses a given threshold, which serve as segment boundaries. In the absence of a duration model, ad-hoc rules can improve segmentation like requiring a minimum segment length.

Figure 20:
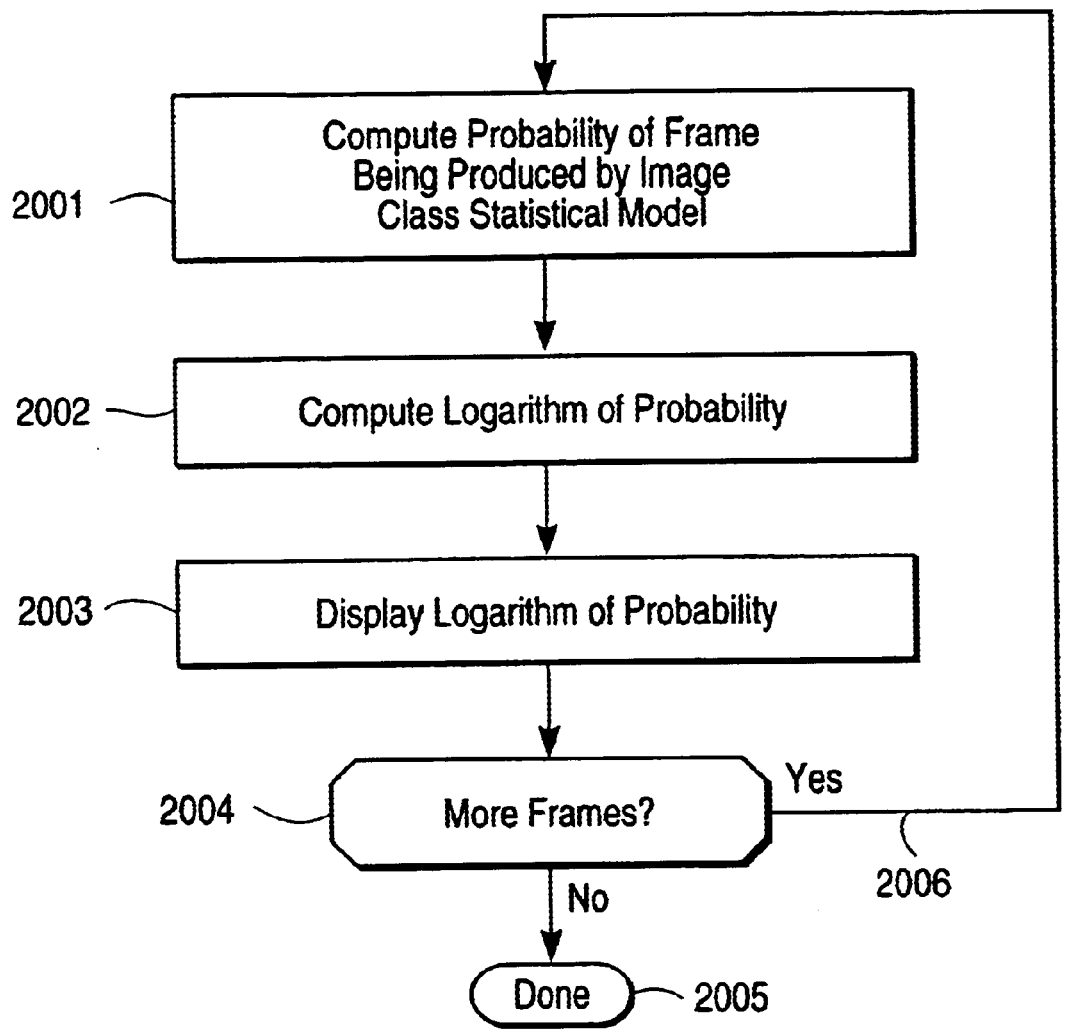
FIG. 20 illustrates a method for displaying the logarithm of the probability of the video image class statistical model producing the various frames of a video according to the present invention.

FIG. 20 illustrates a method for displaying a logarithm of the probability of the video image class statistical model producing the various frames of video according to the present invention. At step 2001, the probability of a frame being produced by an image class statistical model is computed using the Gaussian formula. At step 2002, the logarithm of the probability is computed. At step 2003, the logarithm of the probability is displayed in a manner such as shown in FIG. 19. At test 2004, if there are more frames then branch 2006 takes the method back to step 2001, and if there are no more frames, then the method is done at step 2005.

Figure 21:
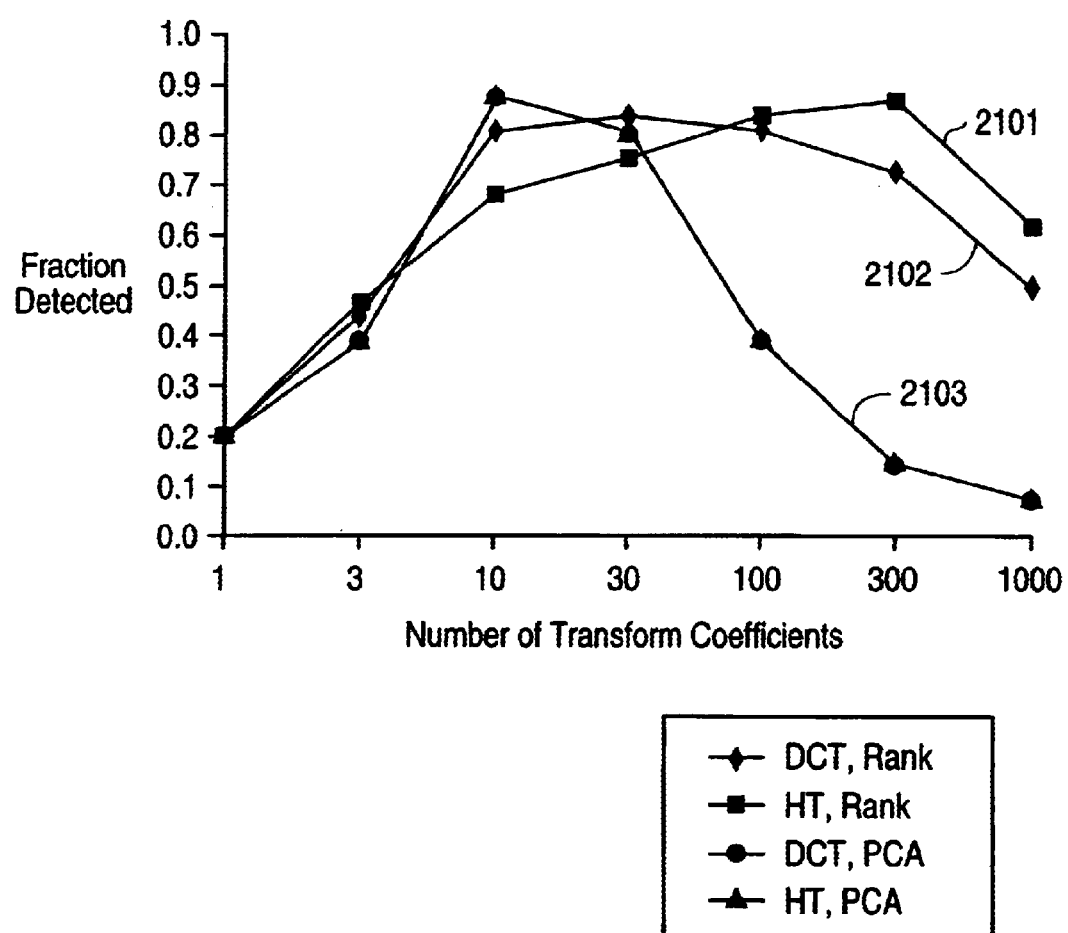
FIG. 21 illustrates the fraction of frames correctly classified as a function of the number d of entries in the feature set, the type of transform applied to the frames, and the method for selection of the d-entry feature set.

FIG. 21 illustrates the fraction of frames correctly classified as a function of the number d of entries in the feature set, the type of transform applied to the frames, and the method for selection of the d entry feature set. FIG. 21 shows that for both the discrete cosine transform and the Hadamard transform, that the accuracy of the correct classification generally increases as the number of transform coefficients as the feature set increases. The downward sloping portions of the traces 2101, 2102, and 2103 are a result of the fact that there were not enough training frames in the training set for each class to justify a feature set having such high numbers of coefficient positions. In other words, the downward sloping portions of traces 2101, 2102, and 2103 indicate learning of the actual data points in the feature vectors of the training frames rather than learning of the Gaussian distribution from which the feature vectors are reasonably modeled as coming from. In order to learn the distribution, the number of training frames must be significantly larger than the number of transform coefficients in the feature set. This demonstrates that having a feature set of 100 or less transform coefficient positions is not only computationally less expensive, but also more effective than larger feature sets given the number of training frames which were available.

To determine the influence of the number of transform coefficients for the different transform methods, the overall correctness, i.e., the fraction of samples that were recognized in the correct category is computed. FIG. 21 shows the results. It is interesting to note that the recognition distribution for the principal components of the discrete cosine transform and Hadamard transform is virtually identical. The best performance (87% correct) was achieved using 10 principal components. Without principal component analysis, variance-ranked discrete cosine transform coefficients peak at 30 whereas Hadamard transform coefficients achieve a slightly higher accuracy at 300. Though the Hadamard transform is often criticized for not preserving perceptual features as well as the discrete cosine transform, it appears to be somewhat superior here, because the rectilinear Hadamard transform basis functions match image features (such as slides or walls) better than the sinusoidal discrete cosine transform bases.

Figure 22:
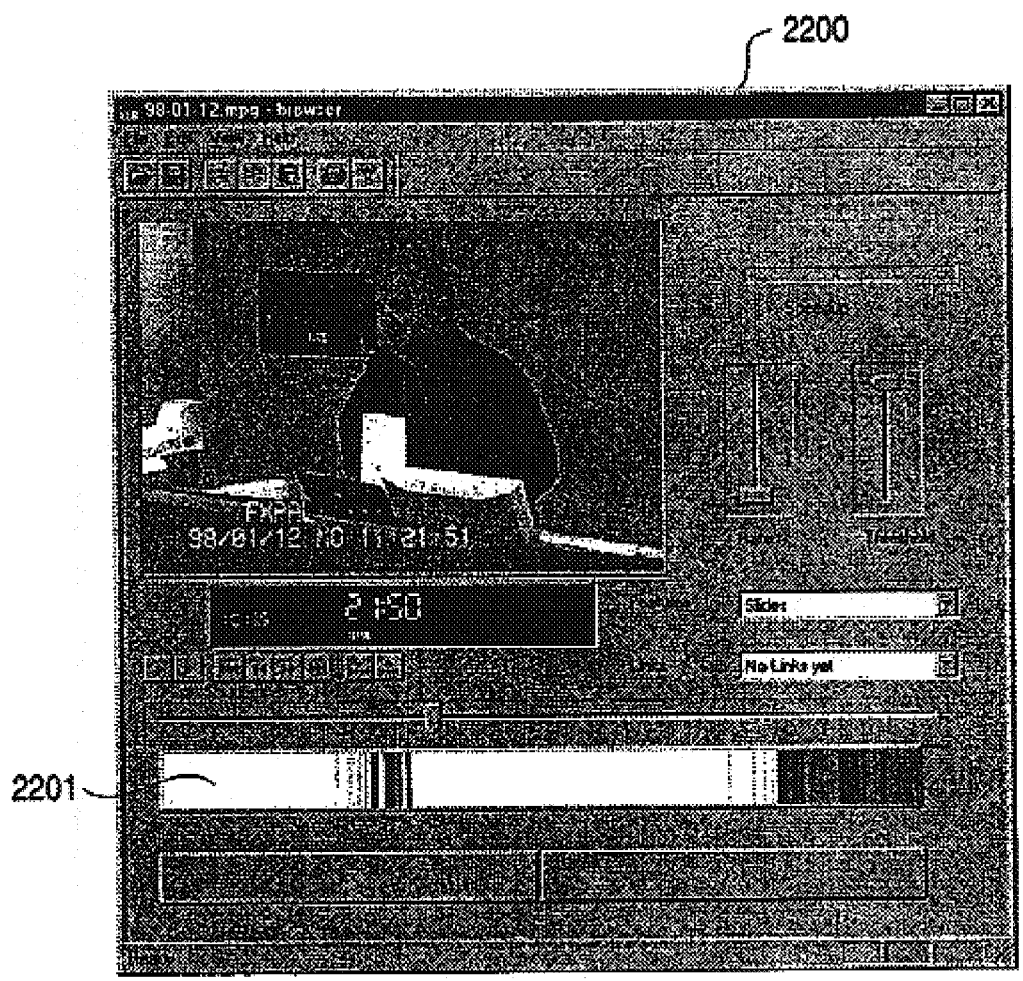
FIG. 22 illustrates a browser displaying regions of a video found to be similar to slides according to the methods of the present invention.

FIG. 22 illustrates a browser displaying regions of a video found to be similar to slides according to the methods of the present invention. The browser 2200 includes a time bar 2201 which illustrates in black vertical bars time intervals within the video which consists of frames determined to be similar to the slide video image class.

An application that uses video classification to help users find interesting passages in video has been developed according to the present invention. It is not simple to determine whether a long video contains desired information without watching it in its entirety. An intelligent media browser allows fine-grained access to video by taking advantage of the metadata extracted from the video, such as shown in FIG. 22. A confidence score for a particular video is displayed graphically on a time bar. The confidence score gives valuable cues to interesting regions in the source stream by using the time axis for random-access into the source media stream. For example, the normalized log-likelihood of the slide model is displayed on the time bar of FIG. 22. Two areas of high likelihood (confidence) are visible as the grey or black regions; these correspond to slide images in the video. Selecting a point or region on the time axis starts media playback from the corresponding time. Thus time intervals of high potential interest are visually identified from the confidence display and easily reviewed without a linear search.

Figure 23:
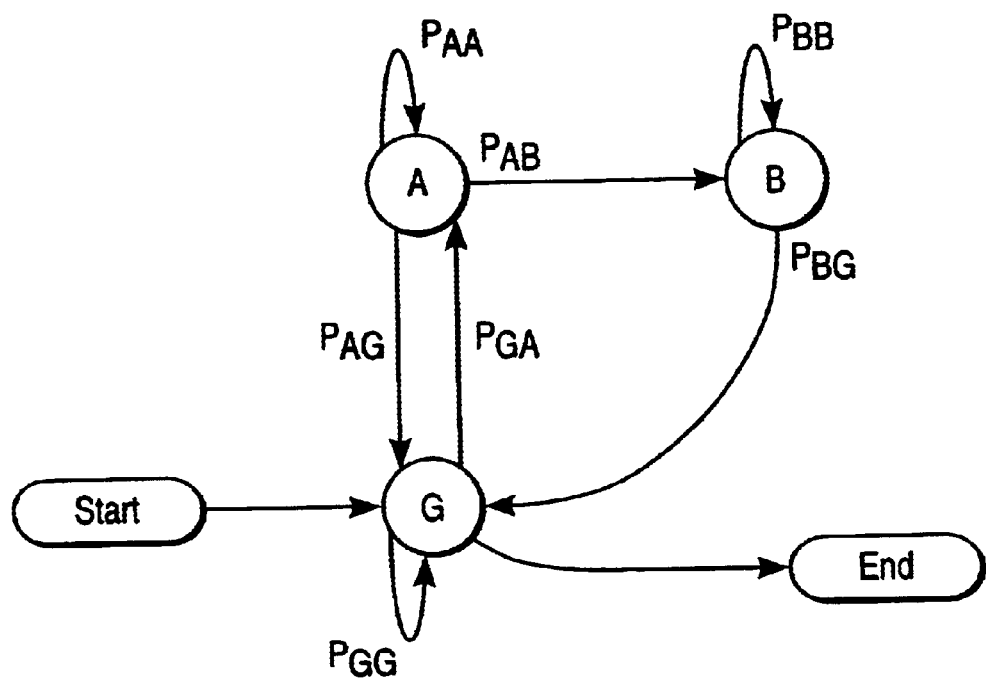
FIG. 23 illustrates a class transition diagram corresponding to a hidden Markov model to be used in the method for classifying a video according to the present invention.

FIG. 23 illustrates a class transition diagram corresponding to a hidden Markov model to be used in the method for classifying a video according to the present invention. Each of the image classes G, A, and B, are modeled using Gaussian distributions. The transition probabilities for staying in the same class or transitioning to another class are illustrated beside the transition arrows.

Hidden Markov models are capable of explicitly modeling duration and sequence of video segments according to the present invention. In a simple implementation, one state of a two-state hidden Markov model models the desired class and the other state models everything else (the "garbage" model). A multiple-state hidden Markov model is created using these Gaussian models, by connecting them in parallel and adding transition penalties along the arcs. FIG. 23 shows such a model where the state G is the garbage model and states A and B model the desired video class. (The diagrammed sequence implies that the video class has two distinct components, A and B, and that A occurs before B. Many other model sequences are possible.) The maximum-likelihood hidden Markov model alignment to the video is determined using the Viterbi algorithm. This results in a segmentation of the video into segments that are similar to the example and those that are not similar. In addition, the likelihood of any particular state generating the observed video is optionally determined for any particular frame, giving a useful similarity measure for exploitation in searching, ranking, or browsing.

FIG. 23 shows how a single Gaussian model with a likelihood threshold can segment similar shots from a longer video. Using different shot models can segment different shots, using a likelihood ratio or maximum-likelihood, optionally with a threshold to reject shots that fit no model well. Different shots are compared by comparing their Gaussian models, using a variety of alternative metrics.

The hidden Markov model output distribution for the query state is alternatively modeled as single or multiple Gaussian on the coefficient features, exactly as described for the Gaussian models above. Multiple states, optionally connected ergodically (fully), are used to model a segment as well as multiple mixture Gaussians. The output distribution for the garbage state or states is also Gaussian. Its parameters are estimated from the video database and are stored in the system. The transition probabilities of remaining in the query and garbage states are estimated from example data or are optionally adjusted by the user, since the length of the query and length between occurrences of the query in the video are variable. An advantage of this approach is that the transition probabilities constrain most adjacent frames to the same state, thus reducing spurious segmentations or variations in similarity score.

The hidden Markov model formulation is powerfully extended to capture video trends or sequences by using multiple states and a transition graph (analogous to a language model in speech recognition). Thus a hidden Markov model is optionally used to model, for example, the station-logo to anchor-shot transition that characterizes the start of a news broadcast. Referring to FIG. 23 in this example, state A models the station logo and state B the anchor shot. Because of the implicit sequence constraint in the hidden Markov model, this matches only A-to-B sequences and not B-to-A sequences or segments A or B in isolation, whereas a simple Gaussian model yields a high score for all.

FIG. 24 illustrates a class transition probability matrix according to the present invention corresponding to the class transition diagram illustrated in FIG. 23. Rows of the class transition probability matrix 2400 represent classes of previous frames while columns of the matrix 2400 represent classes of the current frame. Each column of the class transition probability matrix 2400 is class transition probability vector associated with a particular current image class. Because the class transition diagram shown in FIG. 23 does not allow a transition from class G to class B for a subsequent frame, the entry 2401 in the matrix 2400 is zero. Similarly, because the class transition diagram 2300 does not allow the transitions from class B to class A, the entry 2402 of matrix 2400 is zero.

Figure 25:
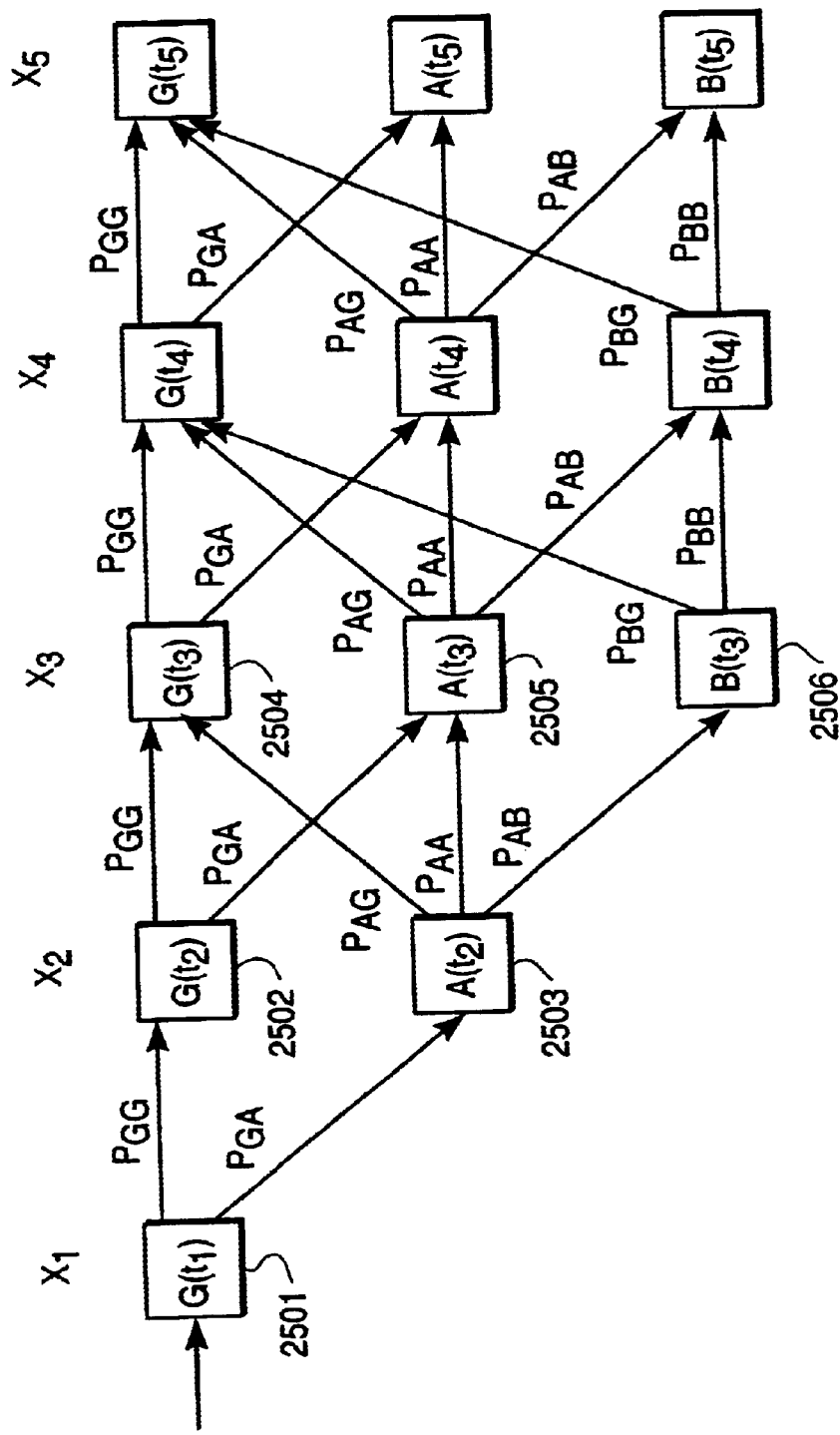
FIG. 25 illustrates all possible class sequences corresponding to five consecutive initial video frames according to the class transition diagram illustrated in FIG. 23.

FIG. 25 illustrates all possible class sequences corresponding to five consecutive initial video frames according to the class transition diagram illustrated in FIG. 23. Because the class transition diagram 2300 dictates that the sequence starts in class G, the class of the first frame is G indicated by box 2501 in FIG. 25. The second frame, however, is from either class G or from class A, indicated by boxes 2502 and 2503 respectively. If the second frame is in class A represented by box 2503, the third frame is from any of classes G, A, or B represented by boxes 2504, 2505, and 2506, respectively. The probability of a class is a function of the likelihood computed for that class, the previous class probabilities, and the class transition probabilities resulting in a transition to the class. The probabilities of each state are given by the following equations:

$$P_G(t) = P_G(X_t) \cdot \max \begin{Bmatrix} P_G(t-1) \cdot P_{GG} \\ P_A(t-1) \cdot P_{AG} \\ P_B(t-1) \cdot P_{BG} \end{Bmatrix} \quad \text{eq. 1}$$

$$\text{if } G(t) \text{ and max is} \begin{cases} P_G(t-1) \cdot P_{GG}, \text{ then } G(t-1) \\ P_A(t-1) \cdot P_{AG}, \text{ then } A(t-1) \\ P_B(t-1) \cdot P_{BG}, \text{ then } B(t-1) \end{cases} \quad \text{eq. 2}$$

$$P_A(t) = P_A(X_t) \cdot \max \begin{Bmatrix} P_G(t-1) \cdot P_{GA} \\ P_A(t-1) \cdot P_{AA} \end{Bmatrix} \quad \text{eq. 3}$$

$$\text{if } A(t) \text{ and max is } \begin{cases} P_G(t-1) \cdot P_{GA}, \text{ then } G(t-1) \\ P_A(t-1) \cdot P_{AA}, \text{ then } A(t-1) \end{cases} \quad \text{eq. 4}$$

$$P_B(t) = P_B(X_t) \cdot \max \begin{cases} P_A(t-1) \cdot P_{AB} \\ P_B(t-1) \cdot P_{BB} \end{cases} \quad \text{eq. 5}$$

$$\text{if } B(t) \text{ and max is } \begin{cases} P_A(t-1) \cdot P_{AB}, \text{ then } A(t-1) \\ P_B(t-1) \cdot P_{BB}, \text{ then } B(t-1) \end{cases} \quad \text{eq. 6}$$

Figure 26:
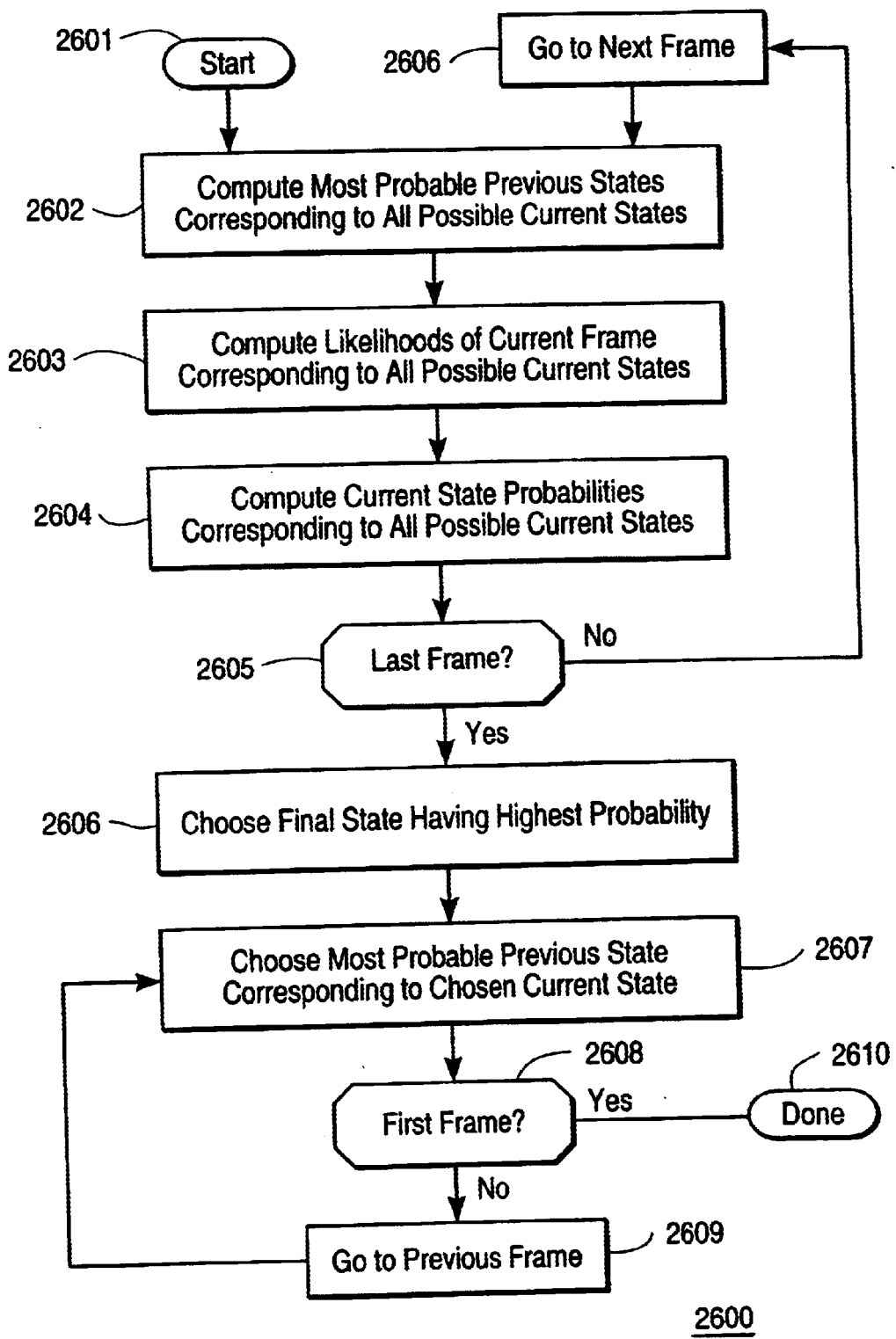
FIG. 26 illustrates a method of segmenting a video using a class transition probability matrix and image class statistical models according to the present invention.

FIG. 26 illustrates a method of segmenting a video using a class transition probability matrix and image class statistical models according to the present invention. The method starts at step 2601. At step 2602, the most probable previous state corresponding to each possible current state is computed. These computations are done using the above equations for the example shown in FIG. 25. At step 2603, the likelihood of the current frame is computed for each possible current state using the Gaussian function corresponding to each image class. The computation at step 2603 is identical to the probabilities computed for example, in step 1204 of the method 1200 shown in FIG. 12. At step 2604, the current state probabilities corresponding to all possible states are computed using the results from steps 2603 and 2602. The computation of step 2604 is performed using the above equations. The computation at step 2602 uses equations 2, 4 and 6 in which the current state is assumed. The computation at step 2604 uses equations 1, 3, and 5 above. Tests 2605 determines if the end of the video has been reached, and if not, step 2606 advances the process to the next frame. If this is the last frame, then step 2605 delivers the method to step 2606, where the final state is chosen as the state having the highest total probability. After the final state is chosen, the most probable previous state is chosen in accordance with the previous evaluation of equations 2, 4, and 6 above. In other words, once the final state is known, all of the previous states are trivially determined by the computations already performed in step 2602. At step 2608, it is determined if there are more frames and if so, step 2609 delivers the previous frame to step 2607 for determination of the linkage back to the next previous state in accordance with the outcome already computed at steps 2602. If the first frame has been classified, the method is done at step 2610.

For a hidden Markov model, the segmentation is achieved using the Viterbi algorithm to find the maximum likelihood state sequence. This gives the maximum-likelihood segmentation directly, as all frames aligned with a particular state or group of states are considered a segment. The structure of the hidden Markov model is particularly well suited to this task, as the alignment is computed over the entire video (rather than locally as is performed conventionally). The sequence and duration constraints implicit in the model effectively disallow errors such as single-frame segments which can result from classification errors of other approaches. The similarity between a given frame and the query is computed during the Viterbi algorithm as the posterior probability of the query state or states. Given the similarity measures, any collection of video is segmented and/or ranked by similarity to the query segment. This allows content-based retrieval by similarity from a large corpus of video.

Simple Gaussian models as above compute the mean or average of the training frames, and so lose any time-varying information associated with the video sequence. To capture dynamic sequential information, models are optionally enhanced in a number of ways. By training models on the frame-to-frame difference or trend of the reduced features, time-varying effects such as motion or faxes are modeled. To find the similarity between video sequences, a correlation score is computed by summing the frame-by-frame inner product of the two sequences. Similar sequences have a large correlation. Dynamic programming is optionally used to find the best match between two sequences of dissimilar length. A superior technique according to the present invention of capturing dynamic events is a hidden Markov model, using Gaussian mixtures to model feature output probabilities, especially given the efficient training and recognition algorithms developed for speech recognition.

The experiments presented here demonstrate that statistical models of transform coefficients rapidly classify video frames with low error rates. The computational simplicity and low storage requirements of this approach enable applications such as interactive video retrieval according to the present invention.

In searching a video database for specific video segments, it is often easier to specify a query by providing an example rather than supplying a description of the type of video segment that is desired. For example, if a segment of video showing a crowd of people listening to a talk is desired, it is easier to simply present the system with a crowd segment as a search query. This is particularly true in searching a single video for segments that are similar to a selected segment. In addition to being easier for the user, retrieval by similarity is often more accurate, since it is easier to create a good model of the query from an example.

Automatic video classification is useful for a wide variety of applications, for example, browsing, automatic segmentation, and content-based retrieval. Applications using automatic classification can support users in browsing and retrieving digitized video, for example, by retrieving videos showing a particular speaker or by highlighting areas with that speaker during video playback. Automatically-generated annotations can assist users in retrieving important information from videotaped meetings. Such tools can help users deal with large collections of videos in which they have to locate both a particular video and areas of interest within the particular video. For all those applications, a training collection of videos is labeled according to different video and audio classes and statistical models are trained on the labeled segments.

The present invention including a statistical measure of video similarity, as well as applications that use the similarity measure to help navigate a video during a playback. According to the present invention, two different user interfaces for selecting regions in a video to be used for similarity matching are disclosed.

The browser is designed to let a user explore the structure of a video, by selecting video regions and automatically finding similar regions. For example, when viewing a newscast, the user selects a region containing a shot of the anchor. The system then automatically detects similar regions, and both display them graphically and as automatic index points, so the user has the capability, for example, to jump directly to the next similar region without having to view the intervening matter. These indexes can then be saved and annotated for subsequent users. The similarity indexes can now be created interactively and on-the-fly.

Figure 27:
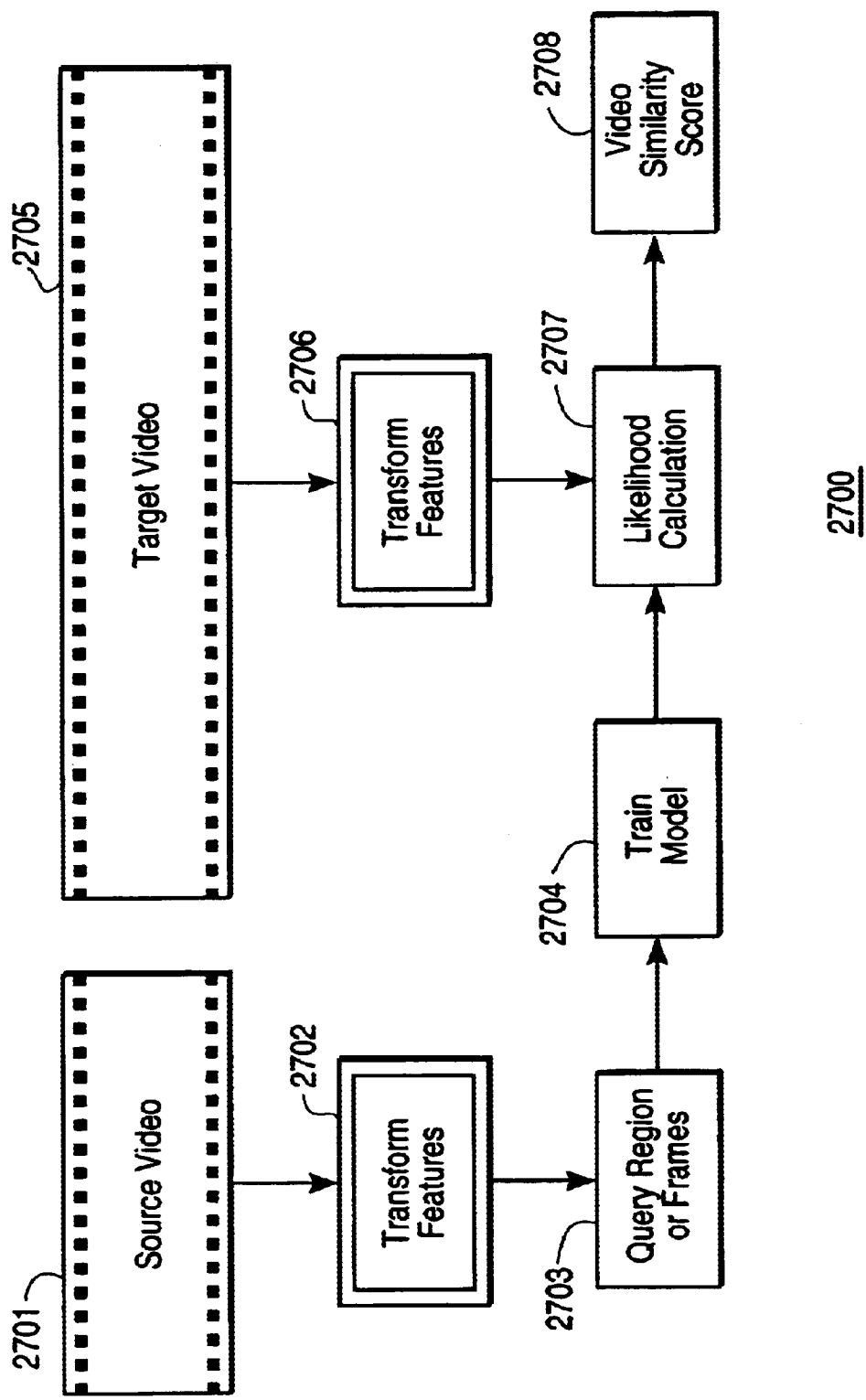
FIG. 27 illustrates the data flow in a method for performing a similarity search according to the present invention.

FIG. 27 illustrate the data flow in a method for performing a similarity search according to the present invention. Source video 2701 represents video from which a training segment is extracted. Transform features 2702 are extracted from a source video 2701 in the same way that transform features 208 in FIG. 2 were extracted from video file 201. Step 2703 represents the user selection of training regions for a collection of training frames. At step 2704, a Gaussian image class statistical model is trained by computing the mean feature vector and diagonal covariance matrix. Video 2705 represents a video targeted for searching for similarity. Again, transform features 2705 are extracted. Likelihood calculation is performed at step 2707 using the image class statistical model trained in step 2704 and the resulting probability is output on a frame by frame basis at step 2708.

FIG. 27 shows a block diagram of how the system is used in practice. The user first performs a query by selecting a video segment or segments. The reduced discrete cosine transform or Hadamard transform coefficients of the query are obtained, either by computation on the fly, or by look-up in the database. The model for the query is then trained using these coefficients. In the simple case, a single Gaussian model is used. Reduced discrete cosine transform or Hadamard transform coefficients of video in the database are then presented to the system, and the likelihood calculations performed. This results in a sequence of similarity scores and a segmentation into similar and non-similar segments. The similarity scores are then displayed in a browser, allowing users to review similar video segments.

Data for similarity calculation is obtained using either a discrete cosine transform or a Hadamard transform in the same manner described above in the description of FIG. 2. This representation is appropriate for measuring similarity, because frames of similar images have similar features.

Similarity measures based on transform methods are superior for many applications than the more conventional color-histogram approaches. In particular, the transform coefficients represent the major shapes and textures in the image, unlike histograms, which are nearly invariant to shape. For example, two images with the same object at the top left and the bottom right have a very small histogram differences but are distinctively different in the transform domain used according to the present invention. Though the current similarity measure is based on the luminance only, it should be straightforward to extend this technique to use color, as discussed below.

It is important to note that the kind of segmentation and modeling possible with this transform approach is relatively crude. For example, it is simple to discriminate between an anchor and a location shot in a news broadcast, though finer distinctions, such as identifying the particular anchor, may require more specialized data reduction or domain-specific models. However, these techniques alternatively serve as an important front-end or pre-classifier for more sophisticated methods, for example, selecting appropriate close-up scenes for further analysis by a computationally expensive face-identification algorithm, while rejecting crowd or nature scenes.

Figure 28:
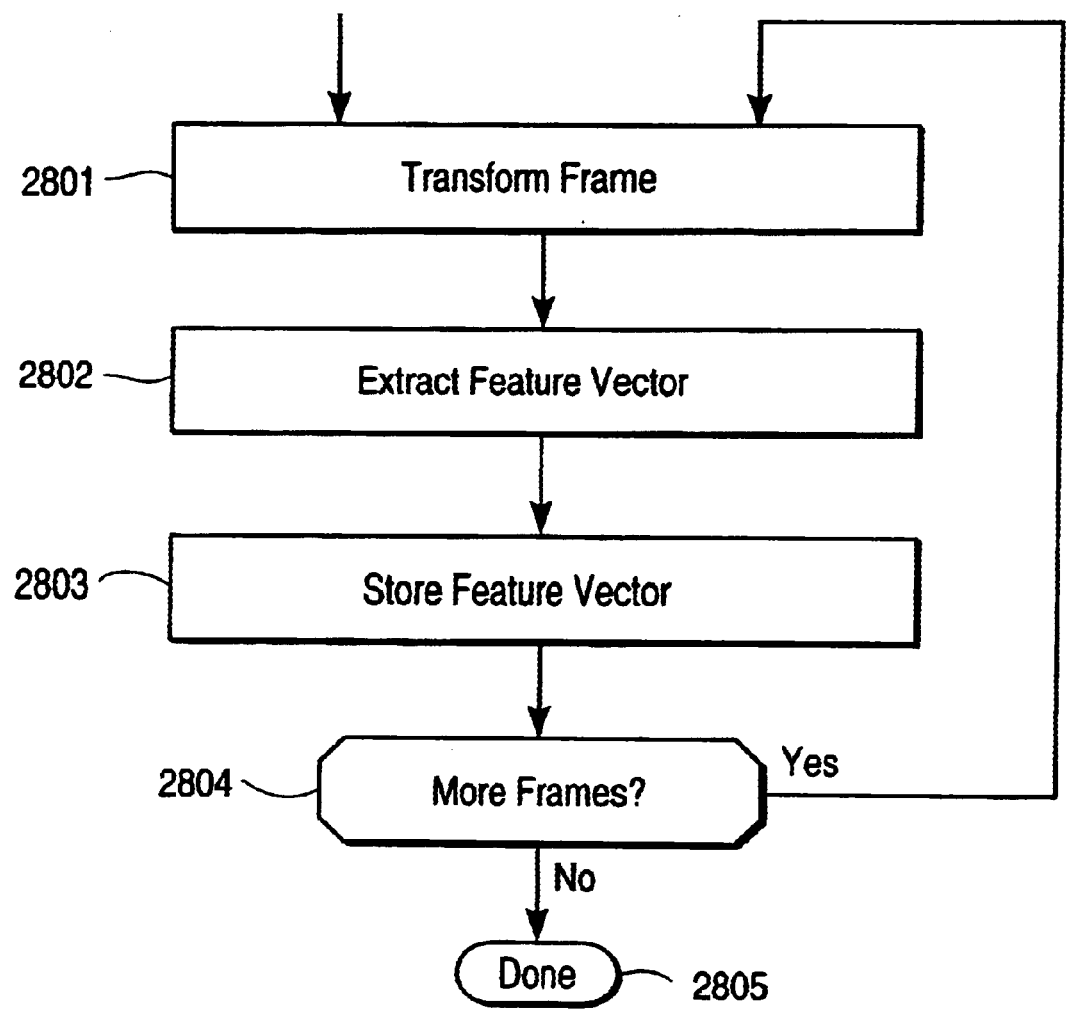
FIG. 28 illustrates a method for computing a feature vector database corresponding to the video according to the present invention.

FIG. 28 illustrates a method for computing a feature vector database corresponding to the video according to the present invention. In order to facilitate rapid likelihood calculations and rapid training of image class statistical models, it is desirable to precompute feature vectors corresponding to frames of video and store it in a feature database. At step 2801, a frame is transformed using a discrete cosine transform or Hadamard transform. At step 2802, the feature vector is extracted from the transform coefficient matrix. In step 2803, the feature vector is stored in a feature vector database. At test 2804, if there are more frames, then the next frame is delivered to step 2801, and if there are no more frames, then the method is done at step 2805.

To estimate the similarity between video regions, the similarity of the video frames is disclosed. Each frame is transformed, using an orthonormal projection such as the discrete cosine transform or the Hadamard transform. If the transform is taken over the entire image, rather than sub-blocks, the coefficients represent the image exactly. The transformed data is then reduced using any number of techniques, for example truncation, principal component, or linear discriminant analysis, as described above. For the applications presented here, discarding all but the highest-variance coefficients works well. The reduced representation is highly compact and preserves the salient information of the original frames. Note that this is different from data compression, where the intent is to restore the original image. There is no need to invert the transformation process as it is assumed the original data is available for display and use. Thus, the transform method is optimized for analysis rather than compactness or image fidelity.

The result is a compact feature vector or reduced coefficients (10–30 parameters) for each frame. This representation is appropriate for quantifying video similarity, because similar frames have similar transform coefficients. To model ensembles of similar images, such as contiguous frames from a particular shot, a Gaussian model is trained on the example frames. The mean of the Gaussian captures the average of the example frames, while the covariance models variation due to motion or lighting differences. A single-mixture Gaussian is optionally computed extremely rapidly in one pass over the example data, and models both the rough composition and variability of the example frames.

For many applications, full video frame rate is not necessary, and frames are decimated in the time such that only a few frames per second need be transformed. These factors mean that storage costs are practically negligible and computation times are extremely rapid once the coefficients are computed. Thus the strategy used for real-time applications is to pre-compute the reduced coefficients and store them with the video to enable interactive and on-the-fly similarity measurement. Though future formats such as MPEG-7 allow including such metadata with the video data, for applications according to the currently preferred embodiment, coefficients are stored in separate files.

Figure 29:
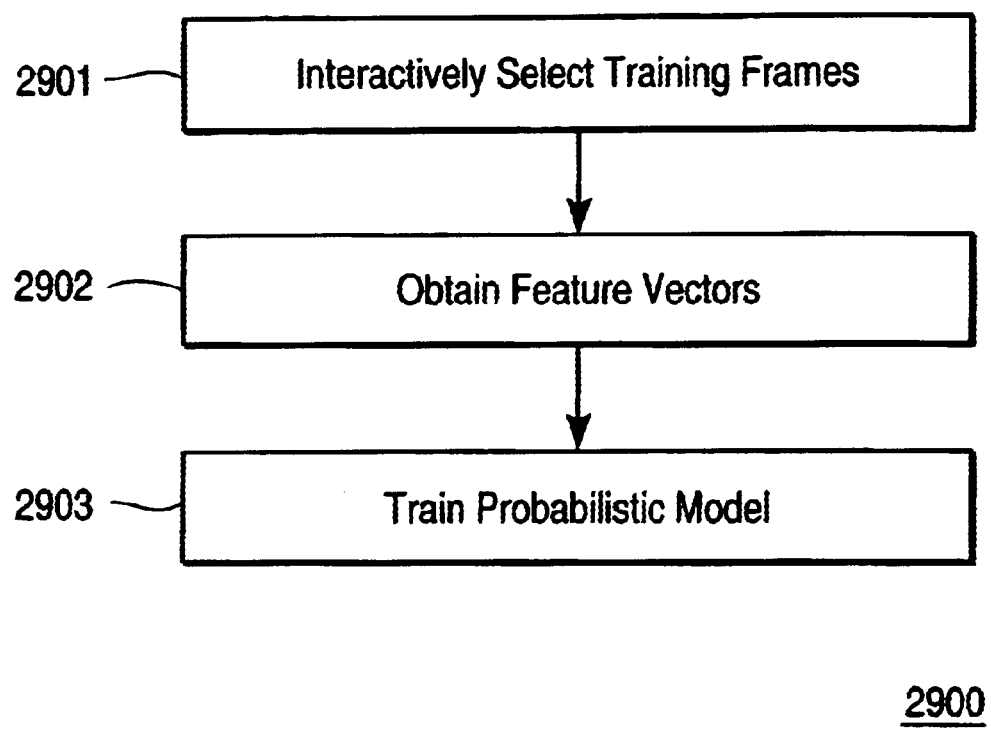
FIG. 29 illustrates a method for interactively training a statistical model according to the present invention.

FIG. 29 illustrates a method for interactively training a statistical model according to the present invention. At step 2901, the training frames or training segments are interactively selected by the user. At step 2902, the feature vectors corresponding to the training frames or segments selected in step 2901 are obtained either by direct computation or by lookup in a feature vector database. At step 2903, the image class statistical model is constructed by computing the mean feature vector and diagonal covariance matrix from the feature vectors corresponding to the training frames.

One advantage of the transform domain is that the size of a feature vector representing a frame is extremely modest (as few as 10 per frame for PCA features). The query video training segment is modeled with a multidimensional Gaussian distribution parameterized by the mean vector and covariance matrix. In practice, it is common to assume a diagonal covariance matrix, so that zero correlation between features is assumed, and each feature is assumed to be an independent random variable having a Gaussian distribution. A diagonal covariance matrix, i.e., the off-diagonal elements are zero is assumed so that the model is robust in high dimensions. To model a class using Gaussian model, the mean and covariance across a set of training images is computed. The query training segment is used to compute the mean vector and covariance matrix. A similarity score is calculated for each frame in the video by computing the likelihood of the frame from the query image class statistical model. In an alternative, more sophisticated models use Gaussian mixtures and employ the expectation-maximization algorithm to estimate the multiple parameters and mixture weights, thus the multiple means, variances, and weighting coefficient associated with each multiple Gaussian model, though this requires iteration. For this reason, a single-mixture Gaussian model which is computed rapidly on the fly is assumed.

Note that a single frame query is optionally used to generate a Gaussian model, by setting the mean to the coefficients of the frame and setting the variance to some values such as a constant or using the variance derived from some training set. Other frames or still images can then be scored for similarity: the constant variance yields a euclidean distance metric and the training variance yields a mahalonobis distance. Thus similar still frames or images are retrieved from a collection by ranking them by the distance measure. Another variation of this system according to the present invention is when the query model is trained on a group or class of images rather than conventional image retrieval systems which use only one image as a query.

Once computed, the similarity of an arbitrary video frame is determined by the likelihood that the model produced the frame. Similar frames yield a high likelihood. This approach has yielded classification rates on the order of 90% for pre-defined video classes such as speakers and slides on a large corpus of meeting videos. Gaussian models can capture the characteristic composition and shape of an image class, while modeling the variation due to motion or lighting differences. Once the feature vectors have been computed, a number of applications are available. One of the simplest is a straightforward distance measure. Similar frames yield similar feature vectors, thus measuring the difference between feature vectors gives an indication of image difference.

Figure 30:
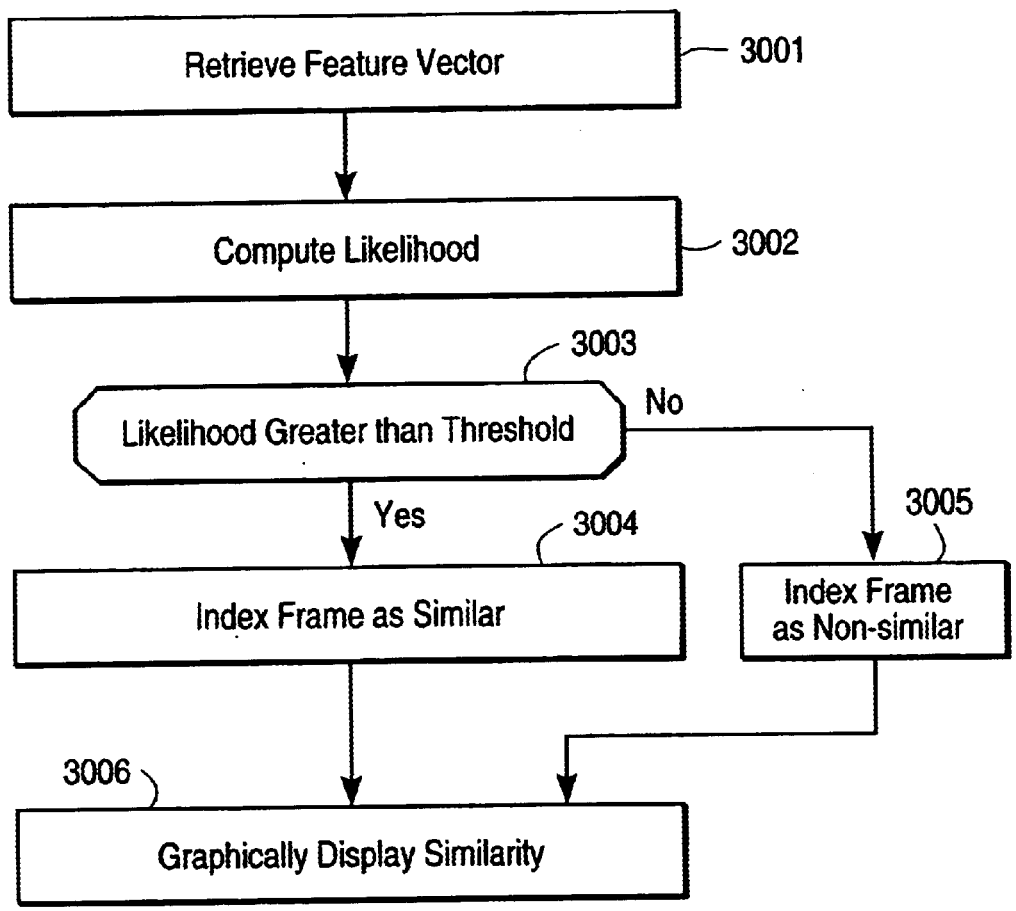
FIG. 30 illustrates a method of presenting a video frame and displaying a similarity measure within a browser according to the present invention.

FIG. 30 illustrates a method for presenting a video frame and displaying a similarity measure within a browser according to the present invention. At step 3001, feature vector of a frame is retrieved. At step 3002, the probability of the feature vector being produced by the image class statistical model is computed. At step 3003, it is determined whether or not the probability is greater than a threshold. The threshold is interactively defined by the user as well. If the likelihood computed in step 2003 is greater than the threshold, then step 3004 indexes the frame as similar. If the likelihood is less than the threshold, the frame is indexed as nonsimilar at step 3005. At step 3006, the similarity attribute of similar or nonsimilar is graphically displayed in a browser for the frame.

The similarity between any particular frame or video segment and the query segment is calculated. For a Gaussian model, the similarity of a given frame is the likelihood, alternatively in the log domain. A Gaussian model can also be used to segment video by finding those frames when the similarity crosses a given threshold, which serve as segment boundaries. In the absence of a duration model, ad-hoc rules like requiring a minimum segment length can improve segmentation.

Figure 31:
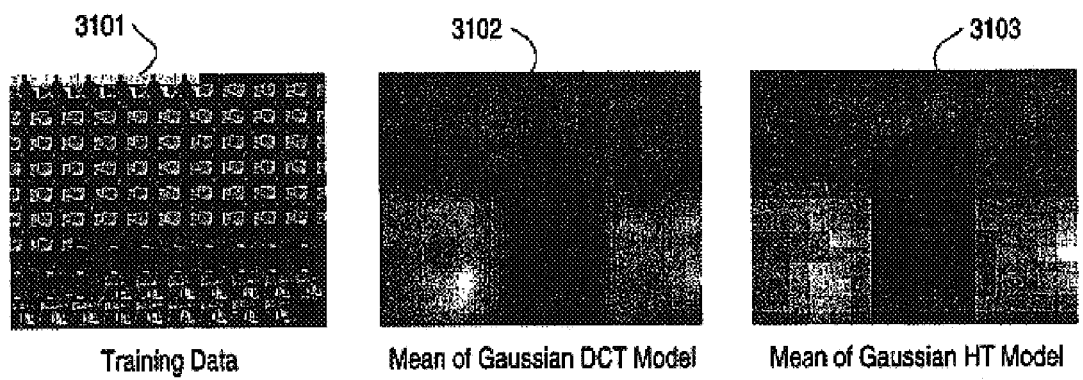
FIG. 31 illustrates an interactively defined training video segment, the inverse discrete cosine transform of the mean feature vector derived from the training frames of the training video segment, and the inverse Hadamard transform of the mean feature vector derived from the training frames of the training video segment according to the present invention.

FIG. 31 illustrates an interactively defined training video segment, the inverse discrete cosine of the mean feature vector derived from the training frames of the training video segment, and the inverse Hadamard transform of the mean feature vector derived from the training frames of the training video segment according to the present invention. Frame 3101 represents the training images interactively defined by the user. Frame 3102 shows the inverse discrete cosine transform of the mean feature vector derived from the training images shown in frame 3101. Frame 3103 represents the inverse Hadamard transform corresponding to the mean feature vector derived from the training images shown frame 3101.

Figure 32:
FIG. 32 illustrates a browser including a time bar for interactively defining a training video segment and for displaying similarity measure and including a threshold slider bar for receiving user threshold mouse input according to the present invention.

It has been previously described herein an approach according to the present invention to locating regions of video similarity. An immediate application is described below, which presents a video browser using the similarity measure. FIG. 32 shows the user interface of one browser prototype. To the top left are the usual video playback window and controls. On the middle right are menu controls that select which similarity scores to display on the bottom time-bar. Similarity scores are displayed time-synchronously with the video slider bar. Dark regions are intervals of high similarity; where darker is more similar. The FIG. shows similarity to a medium-close shot of the speaker centered against a darker background, as in the displayed frame. The location and extent of similar shots are immediately apparent a black bars in the time line.

The threshold slider at middle right controls how index points are derived from the similarity scores. Index points are shown as brighter bars in the upper region of dark (similar) regions in the time bar. (This primarily for the B/W reproduction herein: index points are determined when the similarity exceeds the threshold. The buttons labeled "|<<" and ">>|" beneath the time bar automatically advance the playback point to the next or previous index point. In an area of large similarity variation (many index points), the user can select the most significant indication by increasing the threshold. In regions of lesser similarity, the user can still find index points by reducing the threshold, though they are less reliable.

FIG. 32 illustrates a browser including a time bar for interactively defining a training video segment and for displaying similarity measure and including a threshold slider bar for receiving user threshold mouse input according to the present invention. Time bar 3201 shows segments of the video found to be similar as vertical black bars. Threshold slider bar 3202 receives user mouse input for designating a probability threshold required for the detection of similarity. Time bar 3201 is operable to receive user training mouse input by click and drag operations for example for designating training segments.

Figure 33:
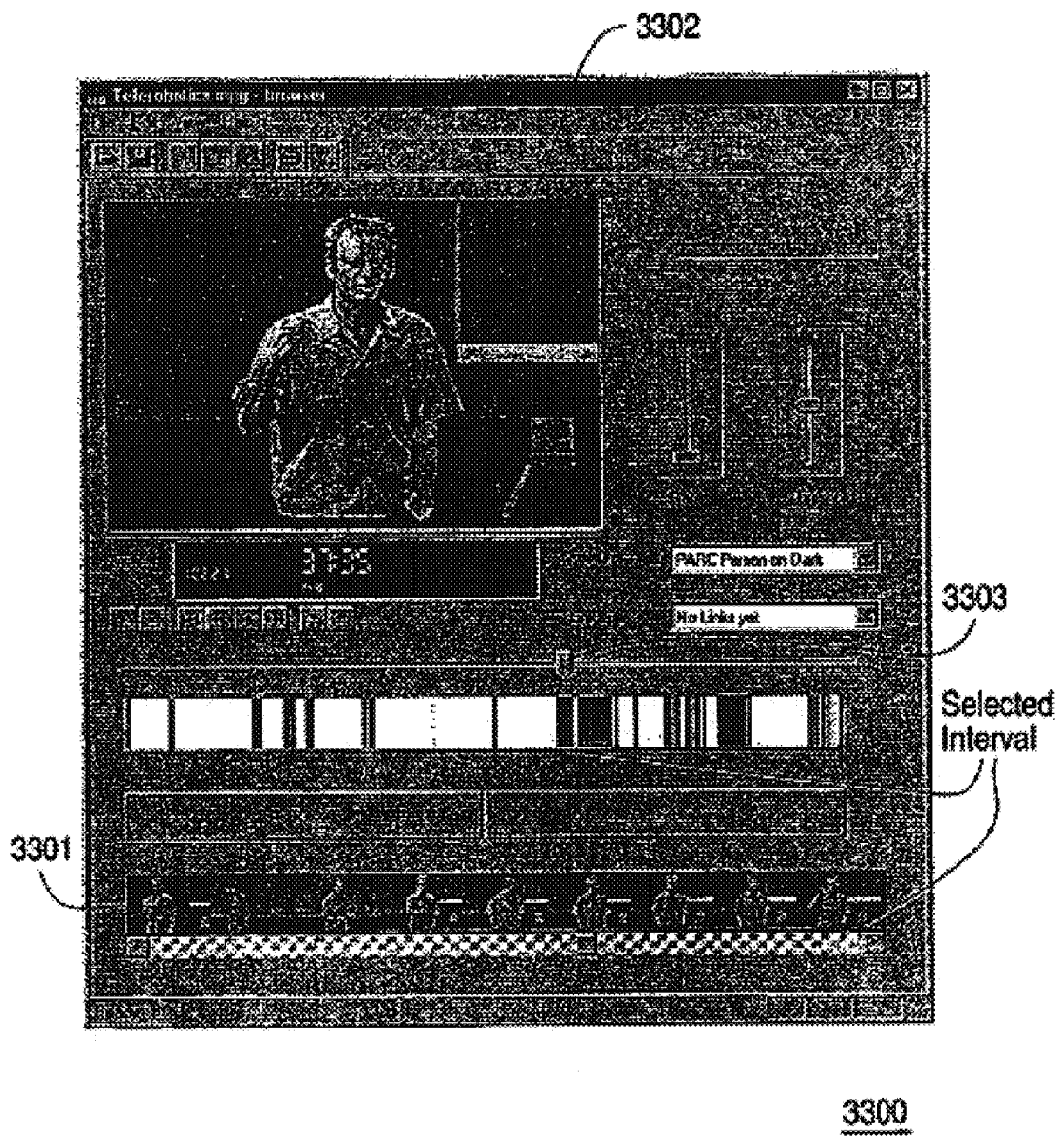
FIG. 33 illustrates the browser of FIG. 32 further augmented with a scrollable window for displaying frames within a region of the video.

FIG. 33 illustrates the browser of FIG. 32 further augmented with a scrollable window 3301 for displaying frames within a region of the video. Specifically, frames at and around the frame 3302 being displayed in the main browser window and indicated by a position of the time bar slider 3303 are displayed in the scrollable window 3301.

While the Web-based interface provides a very good overview and is a good choice for labeling different classes in a whole video, it is particularly tailored for quick similarity searches while playing a video. Therefore, an augmented display that shows similar periodically sampled still images in a horizontally scrollable window (see bottom of FIG. 33) is optionally included according to the present invention. During playback, the window scrolls automatically to stay synchronized with the playback window. Temporal context is shown by placing the still image closest to the frame shown in the playback window in the center of the scrollable window. When the video is stopped, the still images are used for navigation. Scrolling to an interesting area and double-clicking on a still image positions the video at the corresponding time.

Intervals for a similarity search are selected by dragging the mouse over the still images. Selected areas are indicated by a light green bar both in the scrollable window and at the bottom of the time bar. Because only a small portion of the video is shown at a time in the scrollable window, the selected area shown is much larger. In FIG. 33, the selected area displayed in the scrollable window corresponds to the very small area directly below the thumb of the slider. Furthermore, a problem with video, as with any time-dependent media, is that it is not always obvious just what has been selected without playing it back.

To create a similarity index, the example video must first be selected. One interface is to simply click-and-drag over the time bar of FIGS. 32 and 33 to select a region of video. A problem with video, as with any time-dependent media, is that it is not always obvious just what has been selected without playing it back. For the similarity measure described in the previous section, best results are obtained when the source video is reasonably similar, for example comes from the same shot. Click-and-drag selection, while effective for text, has the consequence that undesired video is sometimes selected with little user awareness. Also non-contiguous selection is alternatively useful.

Figure 34:
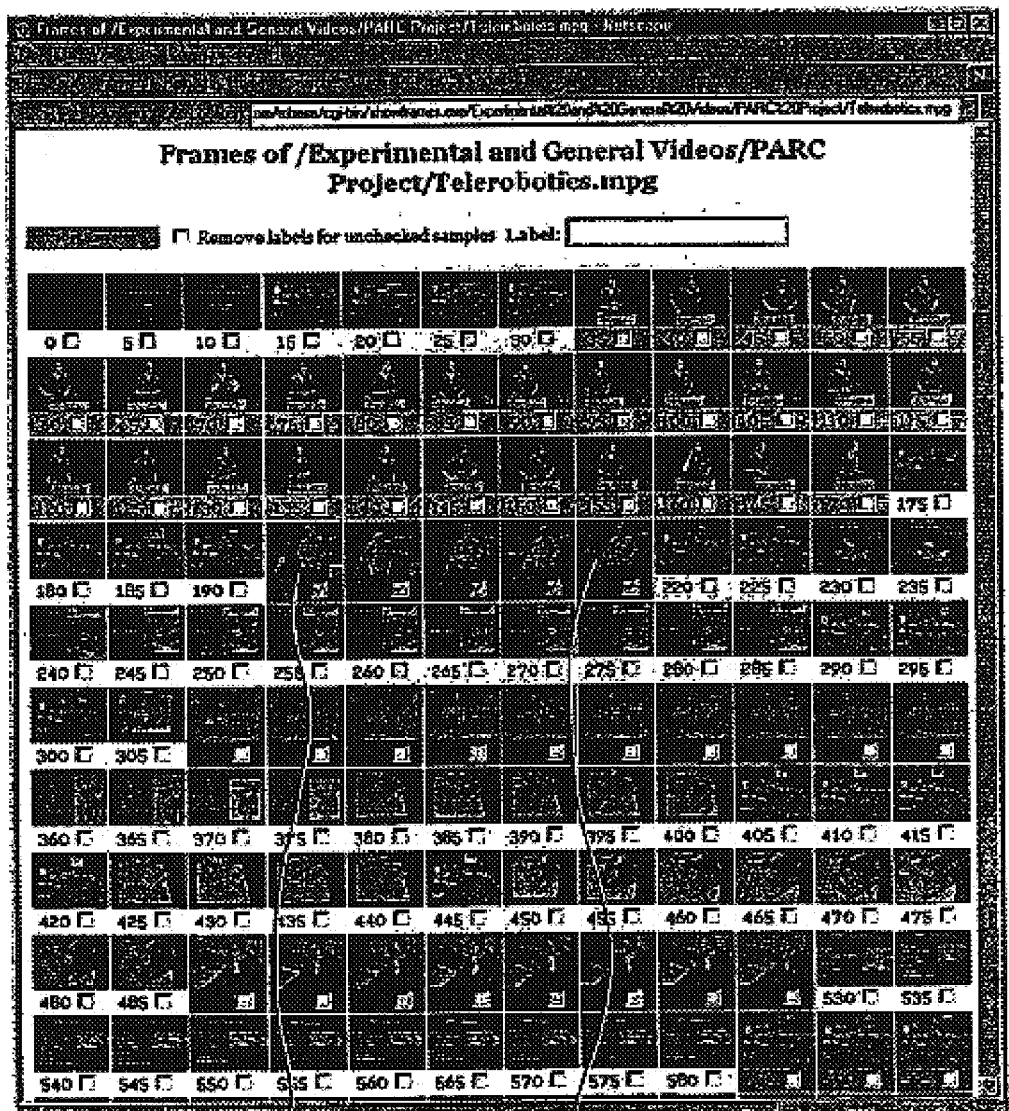
FIG. 34 illustrates a web-based interface that displays periodic frames of the video for interactively selecting endpoints of one or more training video segments and for displaying similarity measure for the periodic frames.

FIG. 34 illustrates a web based interface that displays periodic frames of the video for interactively selecting endpoints of one or more training video segments and for displaying similarity measure for the periodic frames. The entire video is first divided into periodic frames which are displayed as shown in FIG. 34. Each periodic frame includes a checkbox allowing the user to select the periodic frame, thus marking it for inclusion in the frame segment. If adjacent periodic frames are checked, then all undisplayed frames of the video following between the two checked periodic frames become part of the training segment. For example, all the frames of the video between periodic frame 3401 and periodic frame 3402 are included in the training segment. Once the similarity search for the video has been done, the similarity information corresponding to periodic frames are optionally displayed as shade of a rectangular box surrounding the periodic frame.

FIG. 34 shows a web-based application for selecting video regions that allows visualizing the selected regions as well as supporting noncontiguous selection. In this application, the video is represented as a sequence of key frames taken at a regular interval. FIG. 34 shows a Web-based application for selecting video regions that allows visualizing the selected regions as well as supporting non-contiguous selection. In this application, the video is represented as a sequence of keyframes taken as a regular interval and shown together with their time (in seconds) in the video. A 5 second interval is appropriate for a video-recorded presentation, though a faster or slower rate is optionally preferred for other applications. The user selects multiple key frames by clicking on the check box under each. The model is trained on all frames of the video between adjacently-selected key frames. This interface is superior in some respects than a click-and-drag because it allows endpoints to be precisely located and explicitly shows the selected video content. FIG. 34 also shows that non-contiguous selections are possible by selecting several intervals one after another. This interface allows the user to find regions of interest at a glance because of the compact display. In a normal-sized Web browser, 120 images corresponding to 10 minutes of video are shown in the window while the rest of the video is easily accessible via scrolling. The interface supports the assignment of different labels to different classes of images. Previously assigned labels are color-coded in the display. The similarity to the selected video is calculated nearly instantaneously and displayed in the browser of FIGS. 32 and 33 or thresholded and displayed in the web interface as different color around each frame as in FIG. 34.

Figure 35:
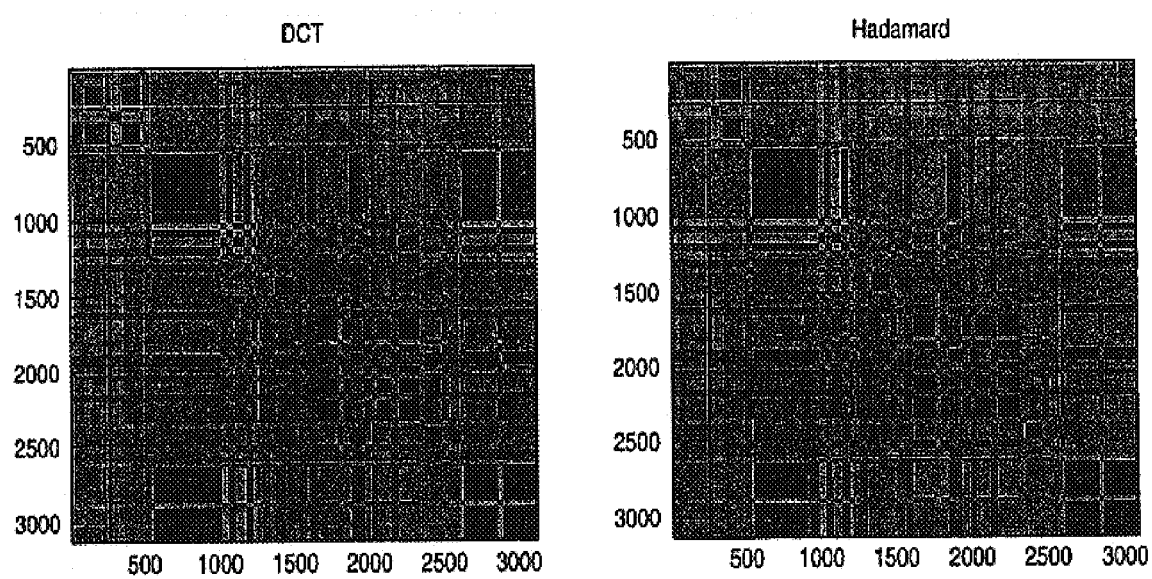
FIG. 35 illustrates similarity matrices of a video computed using discrete cosine transform coefficients and Hadamard transform coefficients according to the present invention.

FIG. 35 illustrates similarity matrices of a video computed using discrete cosine transform coefficients and Hadamard transform coefficients according to the present invention. To illustrate the utility of a distance metric, it is possible to visualize the self-similarity of a video by computing the similarity between all frames and displaying the resulting matrix as an image. FIG. 35 shows the distance matrices of a staff meeting video. Each pixel at position (i,j) has been colored proportionally to the distance between frame i and frame j, such that more similar frames are darker. The units on each axis are time in seconds, and each point has been colored proportionally to euclidean distance between the 100 discrete cosine transform and Hadamard transform coefficients with the highest variance. A frequent conventional criticism of the Hadamard transform domain is that it does not correlate well with perceptual differences. It is interesting to note that the distances are quite similar for both the Hadamard and discrete cosine transform representations; the Hadamard transform works similarly well for clustering and modeling in general. The black diagonal line at i=j indicates that frames are identical to themselves. Some features stand out; it is easy to see there is an introductory period at the beginning of the video that is not similar to the following material; it lasts about 500 seconds.

Four dark squares at the lower right corner are from two long shots of a slide presentation. Individual slide changes are visible within, but these are of smaller magnitude than cuts to the audience or the speaker. These slides are also very similar to another slide presentation starting at about 550 seconds, and intercut with audience shots that are also self-similar, leading to the "checkerboard" appearance. The slides are also somewhat similar to shots of the computer desktop at 1600 and 1900 seconds, causing those regions to appear dark, but not as dark as other slide regions. Though these matrices are not totally intuitive, a "slice" taken at any particular time indicates the similarity of the particular frame at that time to the rest of the video. If presented as the time bar of FIG. 32 or 33, this shows how a single frame is used to find similar video regions, though Gaussian models tend to be more robust because of their ability to model variance.

The present invention also includes enhancements to perform color retrieval, by calculating one or more additional signatures based on the color information. This is accomplished by computing an additional feature signature for the chromatic components of the image (the UV components in the YUV color space) to add to the existing luminance (Y) signature represented by the feature vector. Because the chromatic components need less spatial resolution, they are represented with smaller signatures. Essentially, transform coefficient positions from a transform of the chromatic components of the frame are selected and appended to the feature vector, so that the feature vector includes coefficients from transforms of both luminance frames and chromatic frames derived from the same color frame.

According to another alternative, each YUV or RGB color component are treated as a separate image frames. Thus three transforms are applied to each frame, and signatures (feature vectors) are calculated and compared for each separate image. This allows weighting by overall color in the similarity metric. Yet another alternative according to the present invention for inclusion of color information is the combination of this retrieval technique with another based on, for example, color histograms. In an initial similarity step, images are found by luminance feature vector similarity. By breaking the image into regions and computing color histograms on each region, some of the spatial information in the image is preserved. In a final similarity step, the top-ranking images resulting from the initial similarity step are scored again for similarity using a color-histogram similarity method or another similarity approach.

Color is a useful clue for many kinds of video images, for example in staff meetings videos computer presentations can often be distinguished by the slide background color alone. Also modeling motion or time sequence are quite useful in many applications; more powerful statistical models allow us to do this.

Though a Gaussian model is ideal for many applications, it has the drawback that all change within an interval is averaged. If it is important to capture temporal sequence or duration, a hidden Markov model is alternatively used. The hidden Markov model output distributions are modeled as single or multiple Gaussians on the feature vectors, exactly as described above. An advantage of hidden Markov models is that each state has an implicit or explicit duration model. This adds a factor to the likelihood calculation which penalizes shots of unlikely duration (either too long or too short). This is more useful than a simple maximum-likelihood frame classification because the duration model constrains most adjacent frames to the same state, thus reducing spurious shot boundaries.

The hidden Markov formulation is optionally powerfully extended to capture video trends or sequences by using multiple states and a transition graph (analogous to a language model in speech recognition). Thus a hidden Markov model is optionally used to model, for example, the station-logo to anchor-shot transition that characterizes the start of a news broadcast. Because of the sequence constraint implicit in the hidden Markov model, this does not match the anchor-shot to station-logo transition that frequently occurs at the end of the broadcast, whereas a simple Gaussian model yields a high score for both.

Also useful is a differenced representation, computed as the frame-to-frame difference of the original feature vectors. By Parseval's relation, the norm of each vector is (nearly) proportional to the norm of the pixel differences. Thus, large frame-to-frame differences caused by cuts or camera motion are easily detected by computing the norm of the differenced vectors. Alternatively, these are concatenated with the original feature vectors to form augmented features that capture motion.

The methods of similarity searching according to the present invention describe a rapid and powerful means of finding similar video regions. Allowing the user to specify a query using example video is an advance beyond text- or sketch-based interfaces. The techniques extend easily to large video collections, and to measures of color or temporal similarity.

Weekly staff meetings are sometimes held in a conference room outfitted with multiple video cameras and microphones. Meetings start with general announcements from management and staff, then proceed to presentations by individual lab members. Presentations are usually given by one person and include graphics such as overhead or computer slides, and there is usually more than one presentation in a meeting. A camera person switches between the cameras in the room, providing shots of the video recording. The video is MPEG-encoded, and made available to staff via the company intranet.

Figure 36:
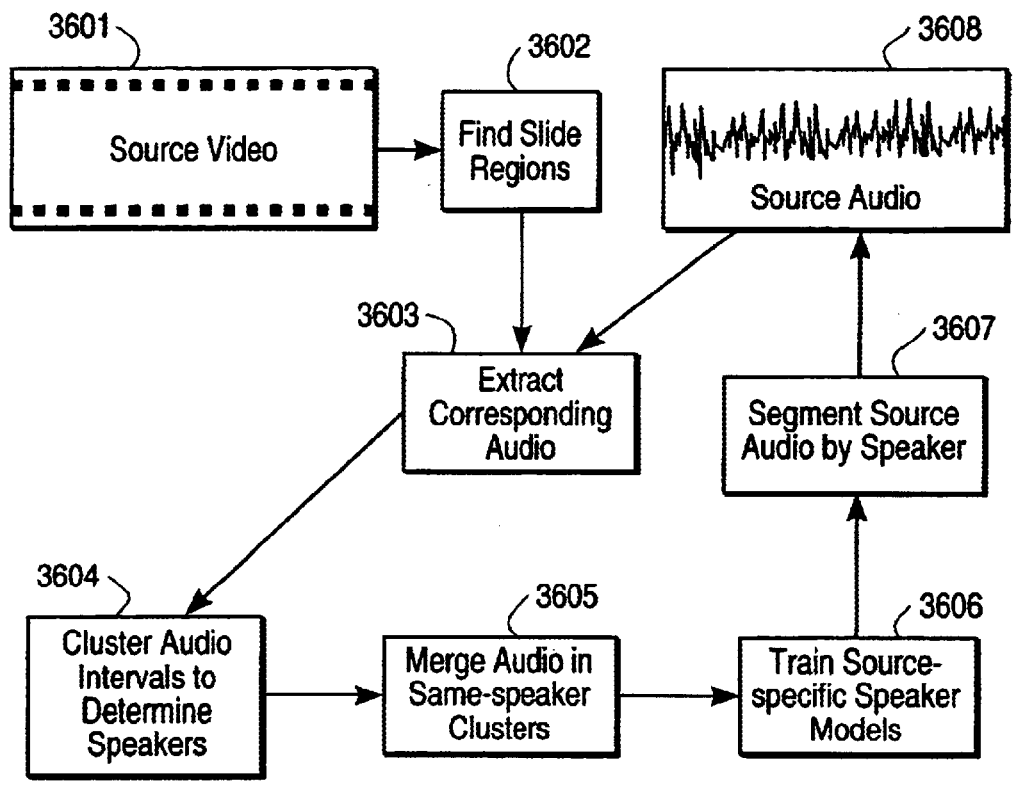
FIG. 36 illustrates the data flow corresponding to a method of segmenting an audio-visual recording according to the present invention.

FIG. 36 illustrates the data flow corresponding to a method of segmenting and audio visual recording according to the present invention. Source video 3601 is analyzed to find slide regions at step 3602. The audio channel of the source video 3601 is extracted at step 3603 for regions of the source video 3601 corresponding to slide intervals. The audio intervals extracted at step 3603 are clustered at step 3604 according to speaker. In other words, audio intervals are compared to each other and grouped according to their source. The resulting clusters of audio intervals are deemed to each have originated from a single orator. The audio intervals in the same speaker clusters are merged at step 3605. At step 3606 a source specific speaker model is trained for each merged audio interval. At step 3607, the audio channel of the source video 3601 is segmented by speaker using speaker recognition. The results of the segmentation by the audio channel are indexed in the source video 3601 and the source audio 3608 for future browsing and source specific retrieval operations.

Figure 37:
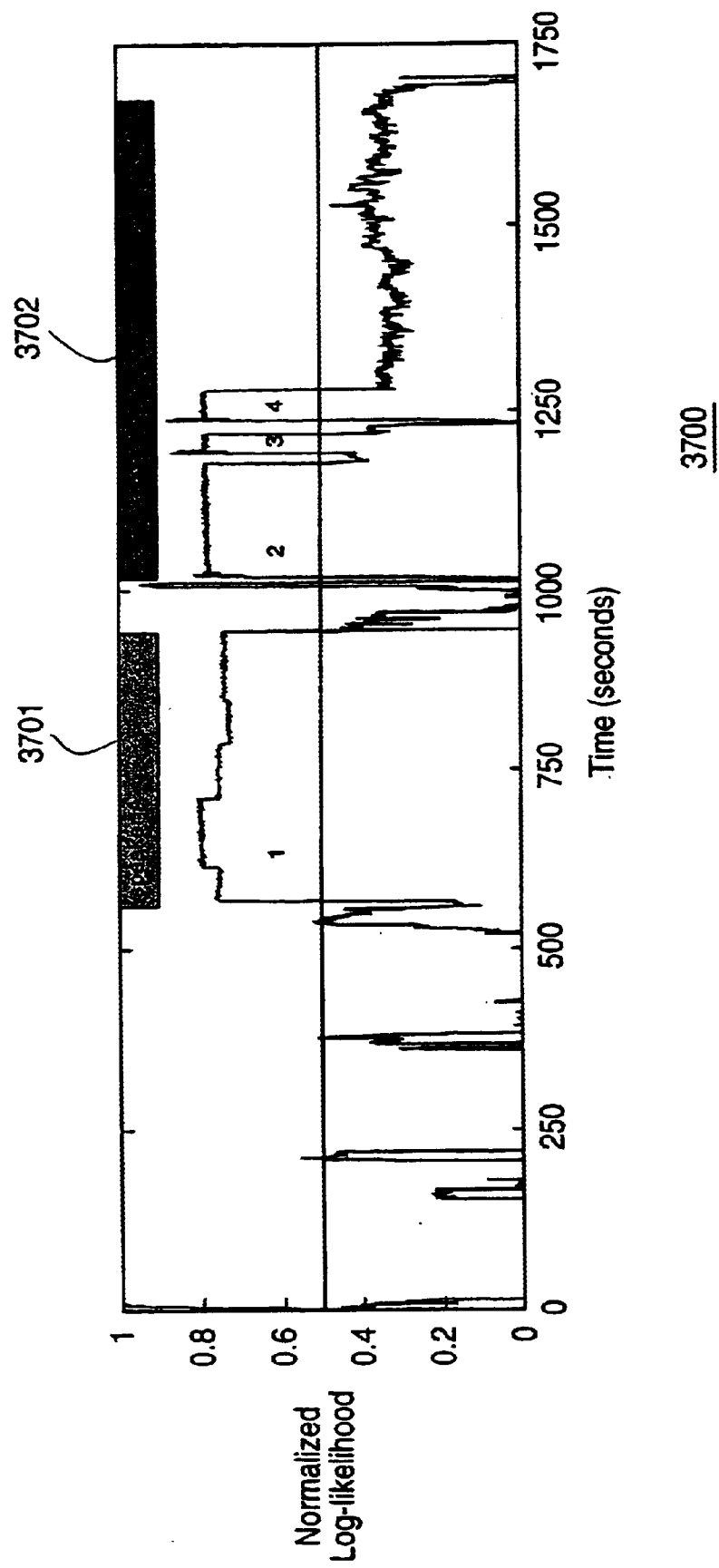
FIG. 37 illustrates the logarithm of the probability of frames of an audio-visual recording being slides for a recorded meeting having two presentations by two speakers.

FIG. 37 illustrates the logarithm of the probability of frames of an audio visual recording being slides for a recorded meeting having two presentations by two speakers. The label 3701 indicating the extent of speaker A's presentation is the actual observed duration of speaker A's presentation derived from a human user watching the video. Similarly, the speaker B indicator 3702 indicates the full extent of speaker B's presentation.

The compact feature vector (the reduced coefficients) for each frame is computed as described above. A diagonal covariance Gaussian model has trained on slide images from several unrelated meeting videos. This model is used to generate a likelihood for each video frame, which measures the log-likelihood that the given frame is a slide. When thresholded at one standard deviation, this yields a robust estimate of when slides are shown in the video. As shown in Table 3 below, the slides were associated with presentations with 94% accuracy. Slide intervals of longer than 20 seconds are used as candidate speech intervals for the system. FIG. 37 shows a plot of the slide log-likelihood for a staff meeting. There are four intervals that meet the criteria of being above the threshold (dotted line) for longer than 20 seconds: these are labeled 1, 2, 3 and 4. There were two presentations during this particular meeting, respectively given by two speakers labeled A and B. The extent of each presentation is indicated at the top of FIG. 37; this serves as the ground truth for the segmentation experiment. Note that speaker B's presentation lasted more than twice as long as slides were displayed.

TABLE 3

| presentation classification errors by frame | | |
|---|---|---|
| Features used | Missed | False Positive |
| Slides | 0.745 | 0.058 |
| Slides + Speaker segmentation | 0.042 | 0.013 |

Figure 38:
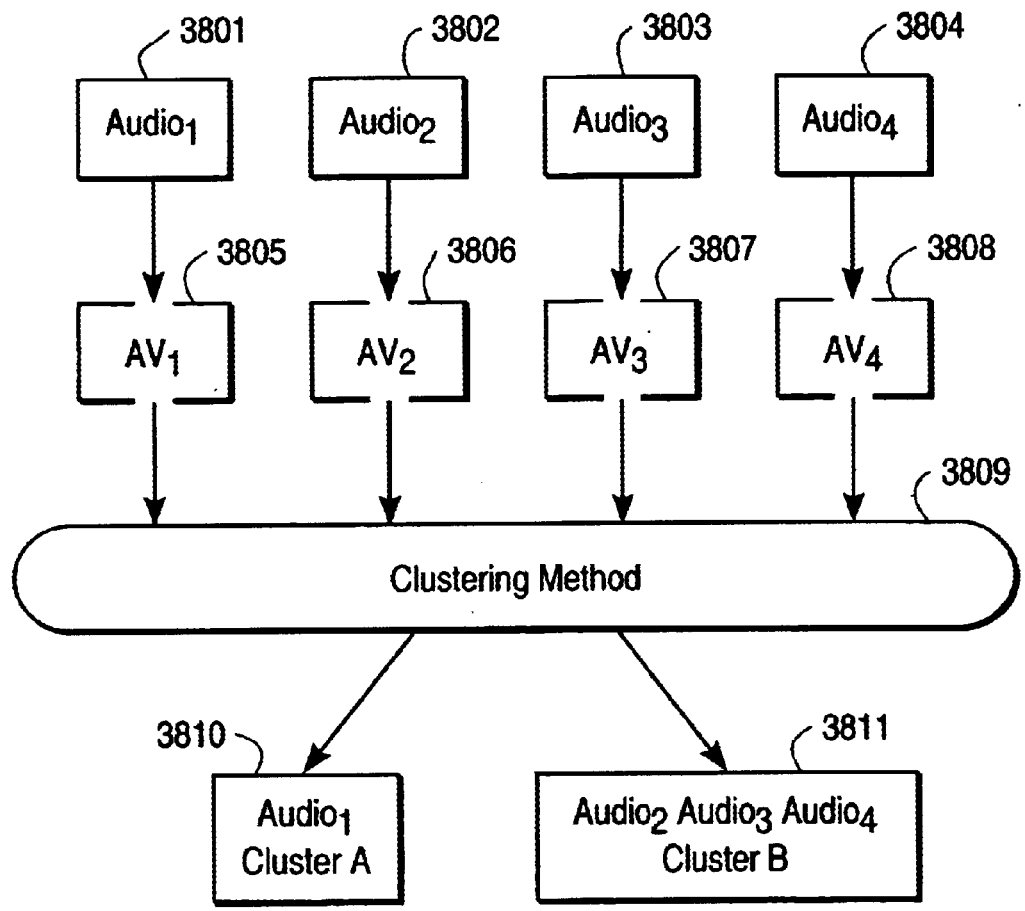
FIG. 38 illustrates the data flow in a clustering method applied to audio intervals according to the present invention.

FIG. 38 illustrates the data flow in a clustering method applied to audio intervals according to the present invention such as shown in steps 3604 and 3605 or FIG. 36. Audio intervals 3801 through 3804 represent the four audio intervals labeled 1, 2, 3 and 4 on FIG. 37, which were extracted from the source audio 3608 shown in FIG. 36. The audio intervals 3801 through 3804 are parametized into audio vectors 3805 through 3808. A clustering method 3809 is applied to the audio vectors 3805 through 3808 so as to agglomerate audio vectors having small euclidean distances from each other. The result of the clustering method 3809 is merged audio interval 3810 and merged audio interval 3811 corresponding to speakers A and B, respectively.

It is particularly difficult to do speaker identification using far-field microphones, that is, microphones more than a few centimeters from a given speaker's mouth. Because the audio at recorded meetings comes from multiple ceiling microphones rather than lapel or other close-talking microphones, speaker identification becomes particularly difficult. Practically all speaker identification techniques use some sort of audio spectral measure, such as mel-frequency cepstral coefficients, to characterize a particular speaker. Far-field microphones in all real-world environments pick up speech both directly and reflected from environmental features such as walls, floors, and tables. These multipath reflections introduce comb-filtering effects that substantially alter the frequency spectrum of the speech. This problem is worsened by mixing signals from multiple microphones (as is common practice in teleconferencing systems). Additional effects due to room resonances also colors each microphone's frequency response. Both resonance and comb-filter effects change drastically and unpredictably with a speaker's position in the room. This makes current speaker-identification methods, where a sample of training speech is used to train a speaker model, particularly ill-suited to a far-field microphone environment. The spectral changes due to the acoustic environment are often nearly the same order of magnitude as the spectral differences between speakers.

To avoid the inevitable mismatch between training and test data due to unpredictable room acoustics, this system essentially obtains training data from the test data by extracting segments that were likely uttered by a single speaker. In the present embodiment, this is done by assuming a single speaker's speech is correlated with the display of presentation visuals such as slides. (In the assumed staff meeting domain, this assumption is usually, but not completely, accurate as there are frequently questions, laughter, or other interjections during a given slide interval.)

Other video analyses, such as single-face or news-anchor detection, are used in a similar manner. As an alternative according to the present invention, face recognition augments or replaces the audio clustering used to associate video intervals with particular speakers.

The next step is to cluster the candidate intervals to determine how many speakers have given slide presentations. This is done using one of any number of clustering techniques, but for the current embodiment a very straightforward measure of audio similarity is used. Each audio interval is parameterized into mel-frequency cepstral coefficients, and the coefficient means over each interval are compared. Using the euclidean distance measure and an agglomerative clustering method thresholded at one-half the maximum distance results in separate clusters for each speaker candidate. The clustering threshold rejects intervals that do not sufficiently resemble any existing clusters. For example, if questions are asked about a particular slide, the resulting interval quite frequently contains speech from many different speakers. More sophisticated distance and clustering methods are optionally used, for example, non-parametric similarity measures, likelihood-ratio distance, and/or variable-threshold clustering. Additional constraints, such as biasing the distance metric to encourage clustering of adjacent segments, or using prior knowledge about the number of speakers, optionally improves the clustering. As previously mentioned, automatic face recognition alternatively enhances or replaces the acoustic clustering.

Figure 39:
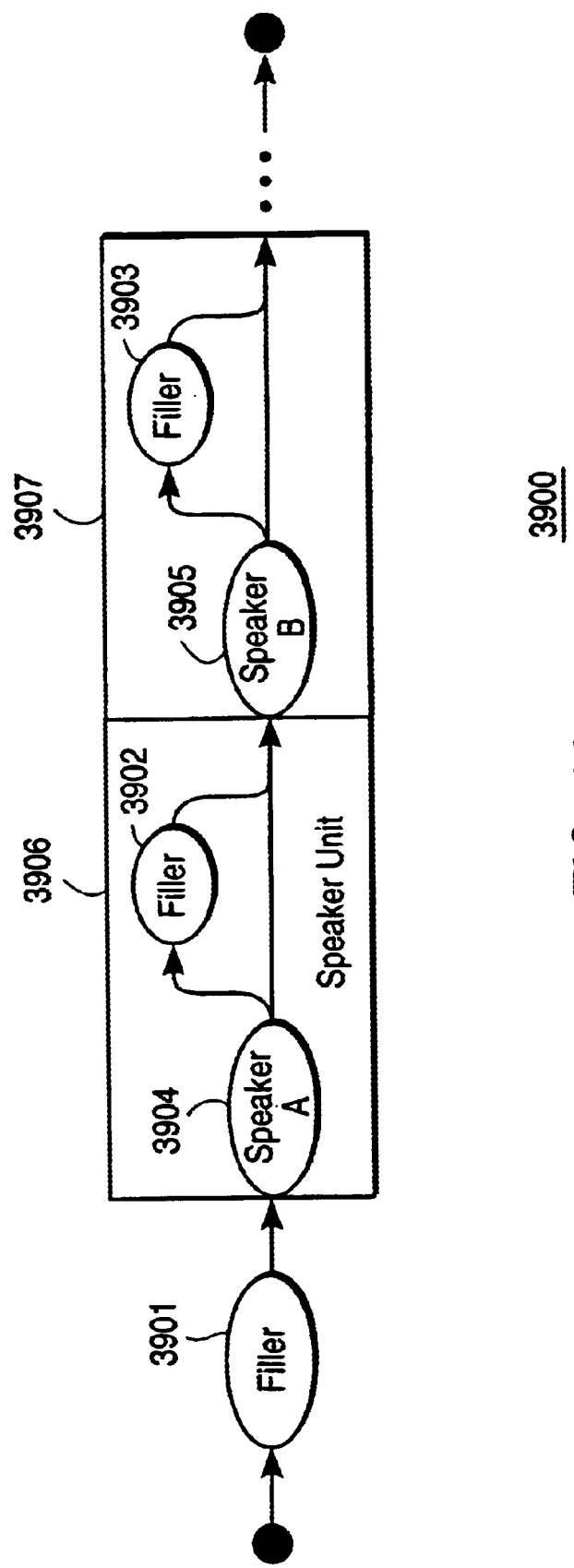
FIG. 39 illustrates the speaker transition model consisting of a series of speaker units according to the present invention.

FIG. 39 illustrates the speaker transition model consisting of a series of speaker units according to the present invention. Filler models 3901, 3902, and 3903 represent audio models trained on, for example, non-single speaker segments of the video. Speaker model 3904 represents a speaker model trained on the merged audio interval 3810 shown in FIG. 38. Speaker model 3905 represents a model trained on the merged audio interval 3811 shown in FIG. 38. Speaker units 3906 and 3907 are concatenated to form a hidden Markov model to be used in step 3607 shown in FIG. 36 to segment the source audio 3608 using speaker order knowledge in the segmentation.

From the clustering results, both the number of speakers giving presentations and the order in which they speak are determined. This allows the video to be segmented using hidden Markov models. Furthermore, the clustered audio segments are used to train each speaker model. From the clustering results, a hidden Markov model is automatically constructed to model the time extent of the video. FIG. 39 shows the structure of the model. The "filler" model represents audio assumed to be other than a presenter's speech. In the present embodiment, the filler model is trained on silence, laughter, applause, and audience noise segmented from other meeting videos, as well as audio from first two minutes of the source video, which is assumed to not contain speech from the presentation speakers. The filler model, though multiply-instantiated, is preferably the same in each instance. The speaker-specific models represent speech from the presentation speakers. Each speaker-specific model is trained on the audio from the cluster from the combined slide intervals associated with it. Concatenating a speaker model and an optional filler model results in a "speaker unit." These are concatenated, one per speaker, to result in the final model. This enforces the proper speaker order. Segmentation is performed using the Viterbi algorithm to find the maximum-likelihood alignment of the source audio with the full model. This allows the time extent of each presenter's speech to be determined, as it may differ substantially from the intervals in which slides are shown. In particular, it is common for the video to alternate between shots of the speaker, audience, and the presentation slides while the speaker is talking. In the current embodiment, both filler and speaker models have a single state, and have single-mixture full covariance Gaussian output distributions. Because models are single-state and single-mixture, they are rapidly trained in one pass. Multiple-state or -mixture models may improve performance at the cost of more expensive training. Self-transitions are allowed with no penalty, resulting in an ergodic model that has no explicit time duration. This allows a model to represent any given length of time with no probability penalty.

Figure 40:
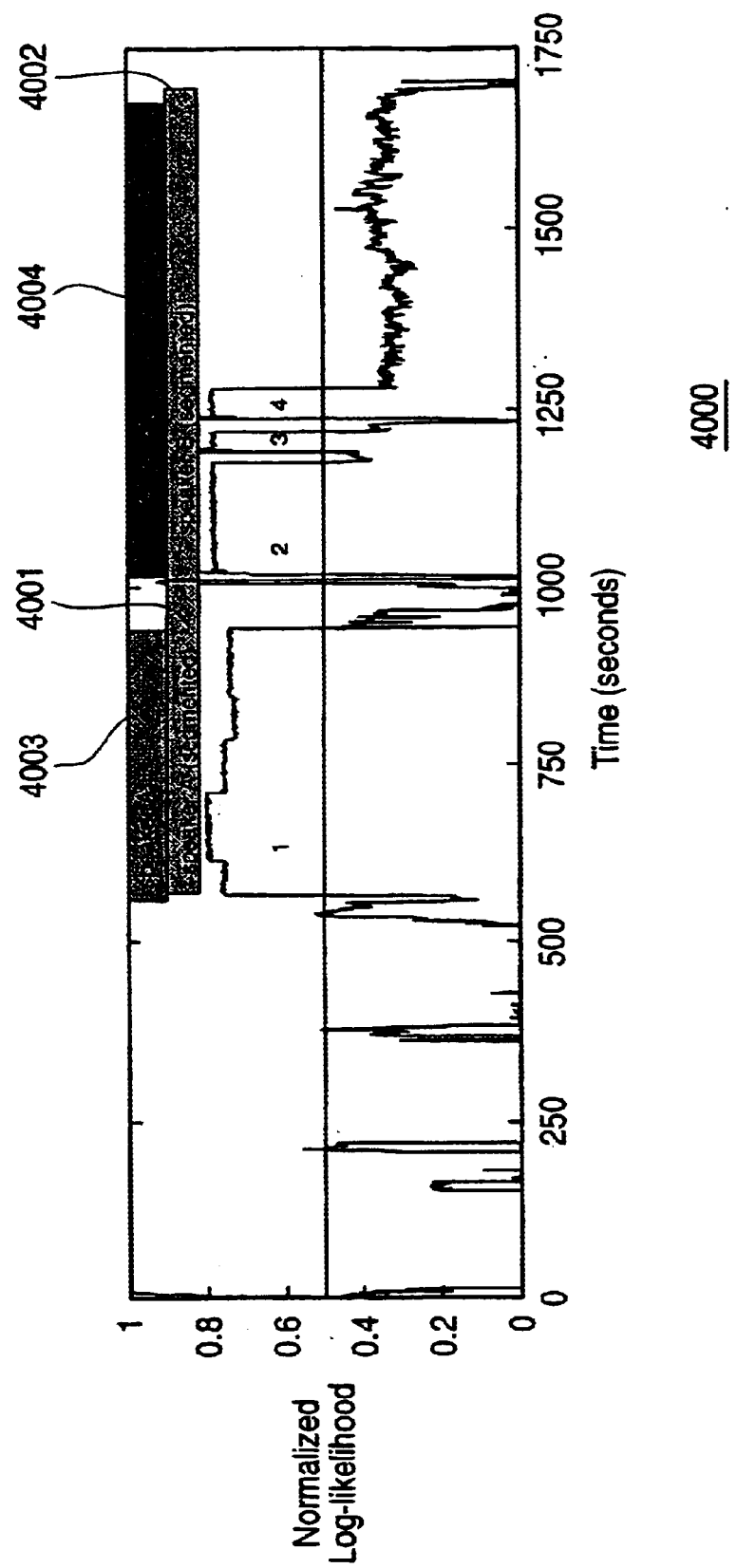
FIG. 40 illustrates the segmentation results of the method of segmenting an audio-visual recording according to the present invention.

FIG. 40 illustrates the segmentation results of the method of segmenting an audio visual recording according to the present invention. Thus, speaker A indication 4001 shows the segmentation of speaker A as substantially overlapping the actual duration 4003 of speaker A's presentation. Speaker B segmentation indication 4002 indicates that the segmentation results substantially overlapped with the actual speaker B duration 4004. Thus speaker A indiction 4001 and speaker B indication 4002 are derived from the indexes created by segmentation according to the present invention.

FIG. 40 shows the automatic segmentation results for the source meeting video. Despite the adverse acoustic environment (6 far-field microphones with gain control), two speakers were identified and the extent of their presentations was reasonably well-segmented, to within a few tens of seconds. This is certainly adequate to segment and browse the video. The largest discrepancy was at the end of speaker A's presentation, which was segmented to actually last up to the start of speaker B's presentation. This is perhaps because both speakers spoke during the interval, as they discussed details of the projection system.

The same techniques used to segment a single meeting are optionally applied across multiple meetings containing the same set of speakers. Presentations from individual meetings are optionally clustered across a corpus of meetings. This allows a catalog of presenters to be created. If this contains enough examples of the same speaker's speech across potentially different acoustic environments (room positions), a more robust position-independent speaker model is optionally trained. In addition, if speakers are identified in meeting agendas, speaker models are associated with names for subsequent identification and retrieval.

Six videotaped meetings containing slide presentations were used as test corpus. Training data for audio filler models and slide images cam from another set of videos. The six videos total length was 280 minutes, 21 seconds for an average length of about 45 minutes. Each video contained from one of five presentations, for a total of 16, though three presentation contained video as well as slides and most had audience questions or comments. Because presentations were typically longer than the duration of slide intervals, the presence of slides was a good indicator of a presentation, thus finding presentations from slides alone resulted in missing more than 75% of the presentation. The second row of Table 3 shows how speaker segmentation improves this: only about 5% of presentations were mis-identified as being other than presentations.

From the 16 presentations, there were a total of 32 endpoints to detect (as well as additional endpoints from the video and anomalous audio). An endpoint was considered correct if it occurred within 15 seconds of the actual speaker's speech starting or ending. Table 4 shows the accuracy of endpoint location. Before clustering, there were 114 endpoints from the 57 slide intervals. Given the ground truth of 32 relevant endpoints to detect, and 26 endpoints were correctly located, this resulted in a recall of 0.81 with a precision of 0.23, thus most endpoints were found but less than one in four detected endpoints was likely to be correct. Clustering the 57 aligned segments yielded 23 clusters, which dramatically improved the precisions by reducing the number of incorrect endpoints. Note that at least 2 of the detected endpoints were due to videos internal to a presentation, so the precision is unduly pessimistic. The non-ideal audio environment also caused clustering problems. Microphones are mounted in acoustic ceiling tiles near HVAC vents. Several presentations were mis-clustered due to the presence or absence of ventilation noise. This affected the acoustic signal enough that the same talker was clustered differently depending on the state of the ventilation system; several cluster boundaries occur exactly as the ventilation switches on or off.

TABLE 4 presentation classification errors by frame

| Endpoint Detection | Recall | Precision |
| --- | --- | --- |
| Before clustering | 0.81 | 0.23 |
| After clustering | 0.81 | 0.57 |

Besides meeting videos, these methods according to the present invention are applicable to any domain where individual speakers are associated with identifiable video characteristics. One example is alternatively news broadcasts, where shots of news anchors can often be identified by image composition and background. Using speaker identification allows segmentation of news stories by anchor, even in the presence of location or other intervening video.

Figure 41:
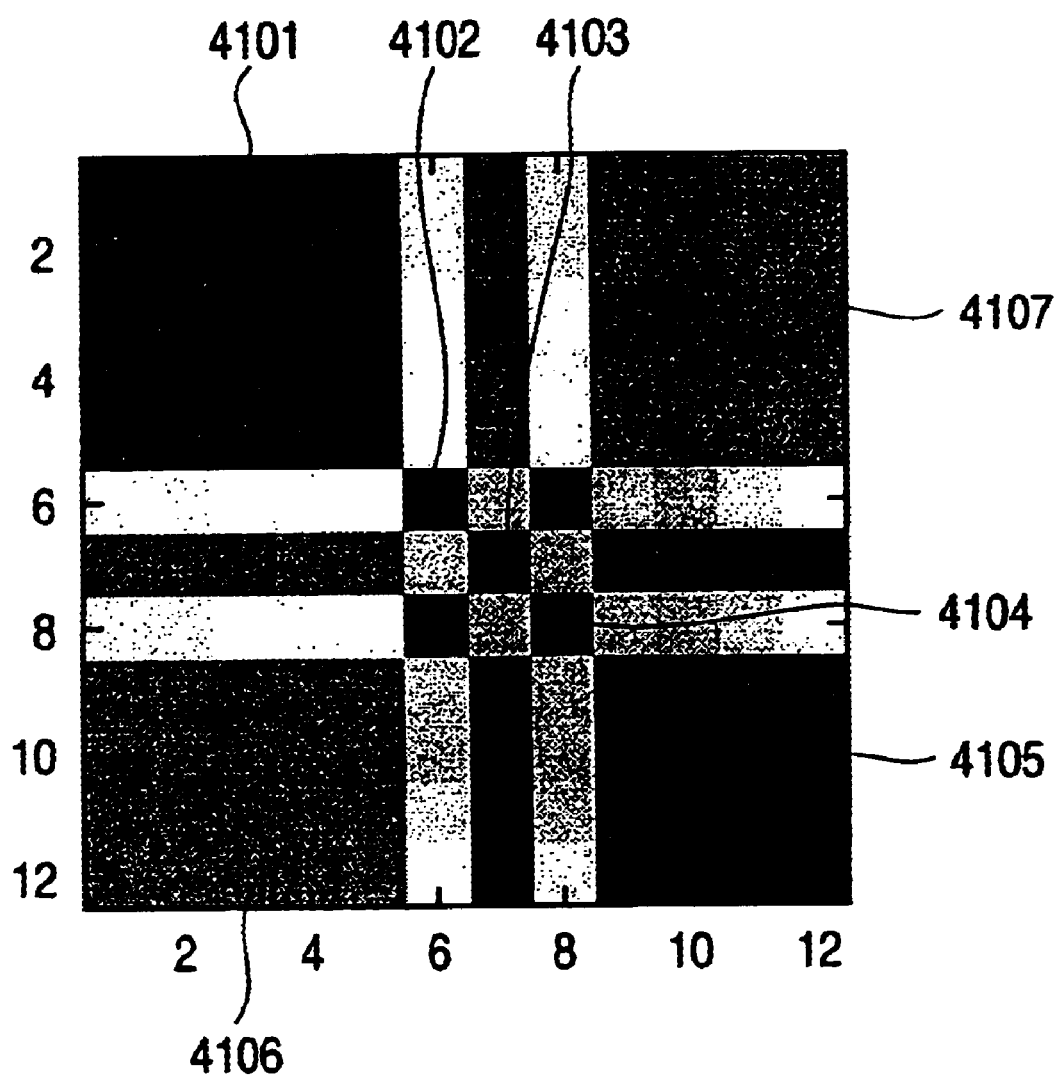
FIG. 41 illustrates an inter-segment acoustic distance matrix according to the present invention.

FIG. 41 illustrate an inter-segment acoustic distance matrix according to the present invention. Diagonal entries 4101 through 4105 are black indicating that each segment is similar to itself. Grey regions 4106 and 4107 represent the partial similarity of the audio intervals at the beginning and end of the source audio. The white regions represent non-similarity of audio segments.

In many cases, there are multiple adjacent intervals that correspond to the same speaker, for example the ones labeled 2, 3 and 4 in FIG. 40. Clustering is alternatively performed using many techniques, for example the likelihood-ratio distance. The clustering method used here is based on the non-parametric distance measure. Mel-frequency cepstral component parameterized audio segments are used to train a supervised vector quantizer, using a maximum mutual information criterion to find class boundaries. Once trained, segments are vector quantized, and a histogram is constructed of the bin distributions. This histogram serves as a signature of the audio file; if treated as a vector, the cosine between two histograms serves as a good measure of audio similarity. FIG. 41 shows a distance matrix computed using this measure. This shows the audio similarity between 12 slide regions from a single meeting video. Each element i, j has been colored to show the difference between segment i and j, such that closer, hence more similar, distances are darker. From FIG. 41, it is clear that there are several acoustically similar groups, each of which correspond to speech from a particular speaker. The exception is from segment 7, which corresponds to the titles from a video shown during the middle speaker's presentation. Such a distance matrix is clustered to find similar intervals that correspond to a single speaker. Though any sort of hierarchical clustering is optionally used, the simple approach taken here was to enforce the time-adjacency of cluster members, by considering all adjacent segments to be part of the same cluster as long as none of their respective distances exceeded a threshold. For the segments of FIG. 41, this resulted in 5 clusters as follows:

$$(1,2,3,4,5) --- (6) --- (7) --- (8) --- (9,10,11,12)$$

The ground truth was that there were three presentations, so this clustering method has incorrectly segmented the second presentation into three, based on the audio distance. Because an important objective is finding indexes for video browsing, this is not a disastrous error: it is also desirable to find when the video was shown as well as when the presentation started. More sophisticated clustering methods are used to ignore audio outliers, such as segment 7 of FIG. 41, or other anomalous audio such as questions or applause.

The first step in the segmentation process is to locate slides in the video. This is done using the techniques according to the present invention described above, which yield accurate estimates of when presentation graphics are displayed in the video. The original MPEG-1 video is decimated, both in time, to two frames per second, and in space, to a 64×64 pixel representation of sub-images. Each reduced frame is then transformed, using a the discrete cosine transform or Hadamard transform. The transform is applied to the frame image as a whole, rather than to small sub-blocks as is common for image compression. The transformed data is then reduced by projection onto its 100 principal components.

Figure 42:
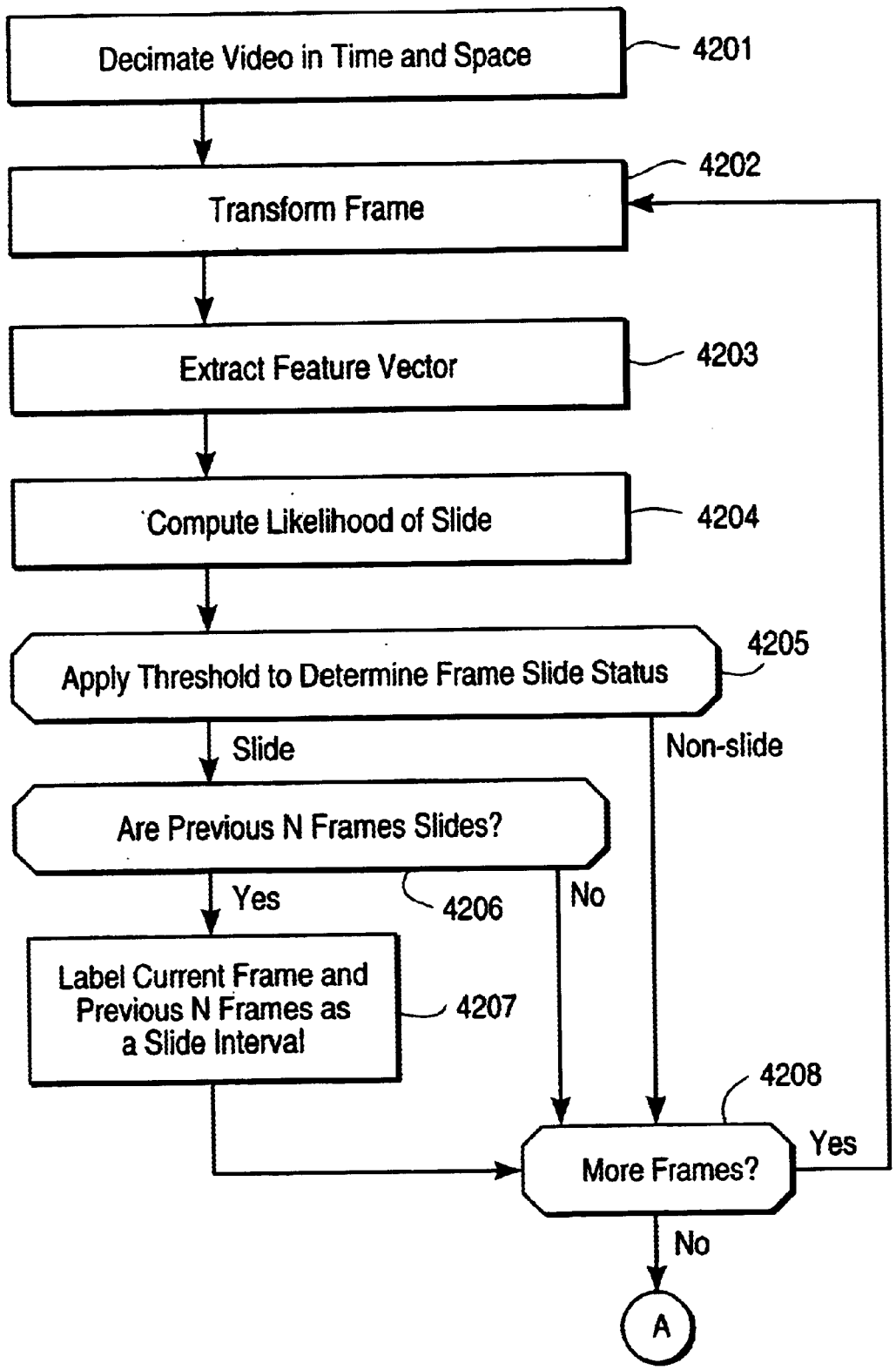
FIG. 42 illustrates a method of identifying one or more video frame intervals longer than a predetermined time interval having similarity to a slide video image class according to the present invention.

FIG. 42 illustrates a method of identifying one or more video frame intervals longer than a predetermined time interval having similarity to a slide video image class according to the present invention. At step 4201, the video is decimated in time and space. At step 4202, the frame is transformed using a discrete cosine transform or Hadamard transform. At step 4203, the feature vector is extracted from the transform matrix computed in step 4202. At step 4204, the probability of a slide is computed using a Gaussian model of a slide image class. At step 4205, the likelihood computed in step 4204 is compared to a threshold to determine whether or not the frame is similar to the slide image class. If it is determined to be a slide, then step 4206 checks to see if the previous N frames were also slides. N is chosen so that a predetermined time duration of a slide being detected must be exceeded before a slide interval is found at step 4207. For example, for a 20-second slide threshold and decimation to two frames per second, N is chosen to be 40. Thus, if a single frame is determined to be a slide while the frame prior to the slide frame and the frame subsequent to the slide frame were not slides, then a slide interval is not labeled. If step 4205 determines that the frame is a nonslide or if its determined that the current frame is a slide but that the previous N frames are not also slides, then step 4208 checks to see if the end of the video has been reached. If there are more frames then the method begins again at step 4202 with the next subsequent frame. If the end of the video has been reached, then the method proceeds to FIG. 43.

Figure 43:
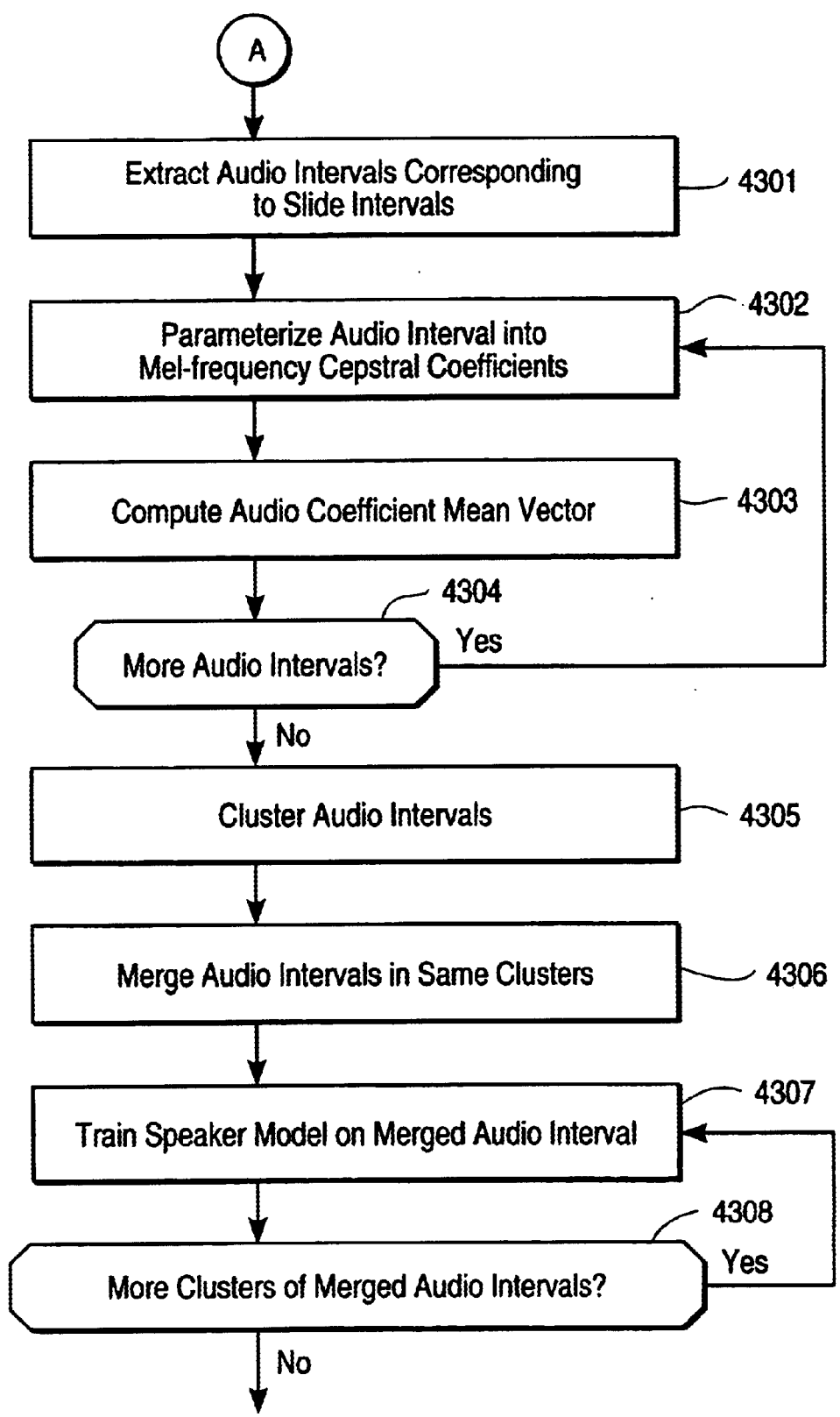
FIG. 43 illustrates a method of training source-specific speaker models from audio intervals extracted from slide intervals according to the present invention.

FIG. 43 illustrates a method of training source specific speaker models from audio intervals extracted from slide intervals according to the present invention. At step 4301, the audio intervals corresponding to the slide intervals are extracted. This extraction is done from the source audio 3608 shown in FIG. 36 corresponding to the source video 3601 from which the slide intervals were extracted. At step 4302, the first audio interval is parametized into mel-frequency cepstral coefficients. The various mel frequency cepstral coefficient vectors corresponding to an audio interval are averaged at step 4303 to generate an audio coefficient mean vector corresponding to the audio interval. If there are more audio intervals, then step 4304 returns the method to step 4302 for processing of the next audio interval. Once all of the audio intervals have been parametized and the audio coefficient mean vectors have been computed for each audio interval, the audio intervals are clustered at step 4305. Step 4305 clusters the audio intervals by same speaker criteria. In other words, audio intervals having audio coefficient mean vectors which are sufficiently close to one another in terms of euclidean distance are determined to be from the same speaker. At step 4306, the audio intervals in the same clusters are merged. At step 4307, the first speaker model is trained on the first merged audio interval. Tests 4308 determines if there are more clusters of merged audio intervals. If so, then step 4307 processes the next and then the next until all merged audio intervals have been used to train a unique speaker model.

Figure 44:
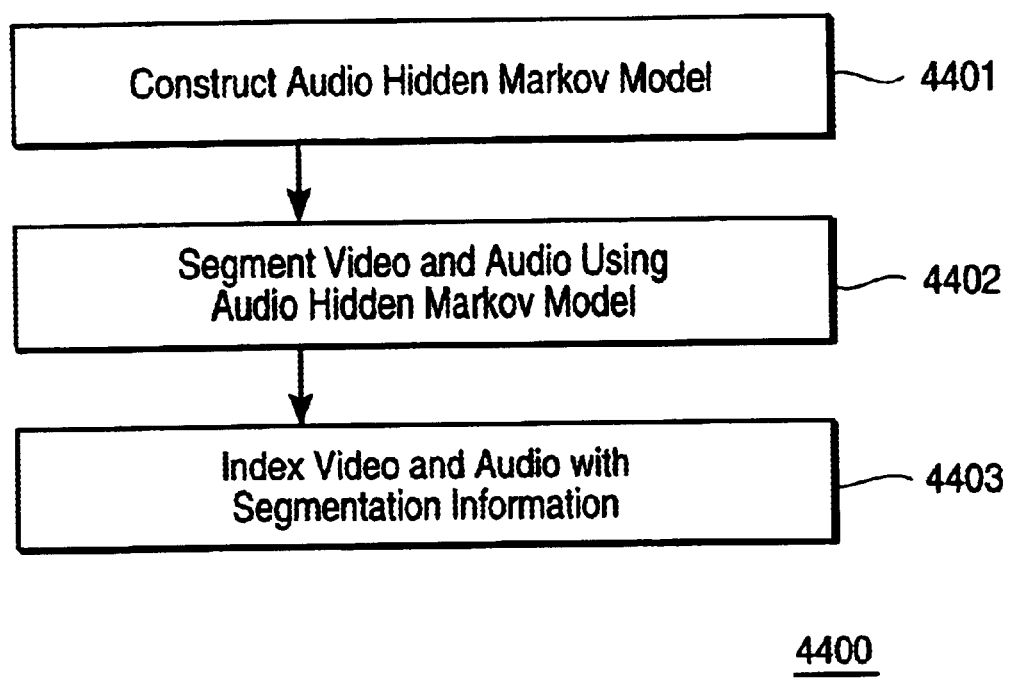
FIG. 44 illustrates a method of segmenting an audio-visual recording using a speaker transition model according to the present invention.

Speaker 44 illustrates a method of segmenting an audio visual recording using a speaker transition model according to the present invention. At step 4401, the audio hidden Markov model is constructed. FIG. 39 shows an audio hidden Markov model such as is constructed by step 4401. The video and audio are segmented using the audio hidden Markov model at step 4402. At step 4403, the video and audio are indexed with the segmentation information determined in step 4402. Thus, the method shown in FIG. 44 is suitable for implementing the step 3607 shown in FIG. 36.

If an agenda is provided for the meeting, presentations are optionally automatically labeled or indexed using the information from the agenda. This allows presentations to be easily found by presenter and topic. Thus meeting videos are automatically indexed, browsed, and retrieved by content.

Although the present invention has been described with respect to several aspects and embodiments, those aspects and embodiments are offered by way of example, not by way of limitation. It is to be understood that various additions and modifications can be made without departing from the spirit and scope of the present invention. For example, sophisticated acoustic models, such as multiple improvements is alternatively obtained by enforcing a duration model on each speaker. As another example, clustering segments based on video as well as audio features, under the assumption that a presenter's slides should have a similar composition and color scheme, as well as images of the presenters themselves is included according to the present invention, thus allowing the identification of anomalous regions of both audio and video due to videos being shown during presentations. As yet another example, other web-based interfaces for receiving user input designating an interactively defined search segment can be employed. As yet another example, classification using probability distributions other than the Gaussian distribution can be used in appropriate circumstances. Accordingly, all such additions and modifications are deemed to lie with the spirit and scope of the present invention as set out in the appended claims.

What is claimed is:

1. A method of performing a similarity search of a video, the method comprising the steps of:
   interactively defining a training video segment from the video;
   obtaining reduced feature vectors corresponding to frames of the training video segment;
   training a statistical model using the reduced feature vectors; and
   displaying a similarity measure of each frame in the video to the training video segment; where interactively defining the training segment comprises:
   providing a display window for viewing the video;
   displaying a time bar within a video browser, wherein position within the time bar linearly corresponds to elapsed time from a beginning of the video; and
   receiving user training input indicating one or more training video segments from the video.

2. A method as in claim 1, further comprising the steps of:
   for each frame of the video,
   obtaining a reduced feature vector; and
   computing a similarity score using the reduced feature vector and the statistical model.

3. A method as in claim 2, further comprising the step of:
   segmenting the video into similar and non-similar segments based upon the similarity scores.

4. A method as in claim 3,
   wherein the step of segmenting the video into similar and non-similar segments based upon the similarity scores is performed by comparing the similarity scores to an interactively defined similarity threshold.

5. A method as in claim 2,
   wherein the steps of obtaining reduced feature vectors corresponding to frames of the training video segment and, for each frame of the video, obtaining a reduced feature vector are performed by retrieval of the reduced feature vectors from a precomputed feature vector database corresponding to the video.

6. A method as in claim 2,
   wherein the steps of obtaining reduced feature vectors corresponding to frames of the training video segment and, for each frame of the video, obtaining a reduced feature vector are performed transforming frames of the video.

7. A method as in claim 1,
wherein each reduced feature vector corresponding to a frame of the training video segment includes features representing chromatic components of the frame and features representing luminance components of the frame.

8. A method as in claim 7,
wherein each reduced feature vector includes fewer features representing chromatic components than features representing luminance components.

9. A method as in claim 1,
wherein each reduced feature vector corresponding to a frame of the training video segment includes features representing red components of the frame, features representing green components of the frame, and features representing blue components of the frame.

10. A method of presenting a video within a video browser, comprising the steps of: providing a display window for viewing the video;
displaying a time bar within the video browser, wherein position within the time bar linearly corresponds to elapsed time from a beginning of the video;
receiving user training input indicating one or more training video segments from the video; and
displaying a similarity measure of each frame in the video to the training video segment using shades of the time bar at positions corresponding to each frame to indicate the similarity measure.

11. A method as in claim 10,
wherein the step of receiving user training input comprises:
receiving user training mouse input along the time bar.

12. A method as in claim 10, further comprising the step of:
receiving user threshold input indicating a threshold level for comparison with the similarity measure of each frame for labeling each frame as similar or non-similar to the one or more training video segments;
wherein a first contrasting color or pattern in the time bar indicates one of similar or non-similar and a second contrasting color or pattern indicates another of similar or non-similar.

13. A method as in claim 12, further comprising the step of:
indexing each similar frame which follows a non-similar frame as a beginning of a similar segment.

14. A method as in claim 12,
wherein the step of receiving user threshold input comprises:
receiving user threshold mouse input along a threshold slider bar.

15. A method as in claim 12, wherein the first contrasting color or pattern is a black shade, and the second contrasting color or pattern is a white shade.

16. A method of presenting a video within a web-based interface, comprising the steps of:
displaying periodic frames of the video separated by a predetermined time interval;
receiving user training input indicating one or more training video segments from the video; and
displaying a similarity measure of each displayed periodic frame in the video to the training video segment using shades surrounding each displayed periodic frame to indicate the similarity measure.

17. A method as in claim 16,
wherein the step of receiving user training input comprises:
receiving user training mouse input by detecting mouse clicks on adjacently displayed periodic frames.

18. A computer readable storage medium, comprising:
computer readable program code embodied on said computer readable storage medium, said computer readable program code for programming a computer to perform a method of performing a similarity search of a video, the method comprising the steps of:
interactively defining a training video segment from the video;
obtaining reduced feature vectors corresponding to frames of the training video segment;
training a statistical model using the reduced feature vectors; and
displaying a similarity measure of each frame in the video to the training video segment; wherein interactively defining the training segment comprises:
providing a display window for viewing the video;
displaying a time bar within a video browser, wherein position within the time bar linearly corresponds to elapsed time from a beginning of the video; and
receiving user training input indicating one or more training video segments from the video.

19. A computer readable storage medium, comprising:
computer readable program code embodied on said computer readable storage medium, said computer readable program code for programming a computer to perform a method of presenting a video within a video browser, comprising the steps of:
providing a display window for viewing the video;
displaying a time bar within the video browser, wherein position within the time bar linearly corresponds to elapsed time from a beginning of the video;
receiving user training input indicating one or more training video segments from the video; and
displaying a similarity measure of each frame in the video to the training video segment using shades of the time bar at positions corresponding to each frame to indicate the similarity measure.

20. A computer readable storage medium, comprising:
computer readable program code embodied on said computer readable storage medium, said computer readable program code for programming a computer to perform a method of presenting a video within a web-based interface, comprising the steps of:
displaying periodic frames of the video separated by a predetermined time interval;
receiving user training input indicating one or more training video segments from the video; and
displaying a similarity measure of each displayed periodic frame in the video to the training video segment using shades surrounding each displayed periodic frame to indicate the similarity measure.

21. A computer system, comprising:
a processor;
a user interface; and
a processor readable storage medium having processor readable program code embodied on said processor readable storage medium, said processor readable program code for programming the computer system to perform a method of performing a similarity search of a video, the method comprising the steps of:

interactively defining a training video segment from the video;

obtaining reduced feature vectors corresponding to frames of the training video segment; and training a statistical model using the reduced feature vectors.

22. A computer system, comprising:

a display;

a user interface;

a processor; and a processor readable storage medium having processor readable program code embodied on said processor readable storage medium, said processor readable program code for programming the computer system to perform a method of presenting a video within a video browser, comprising the steps of:

providing a display window for viewing the video;

displaying a time bar within the video browser, wherein position within the time bar linearly corresponds to elapsed time from a beginning of the video;

receiving user training input indicating one or more training video segments from the video; and displaying a similarity measure of each frame in the video to the training video segment using shades of the time bar at positions corresponding to each frame to indicate the similarity measure.

23. A computer system, comprising:

a display;

a user interface;

a processor; and a processor readable storage medium having processor readable program code embodied on said processor readable storage medium, said processor readable program code for programing the computer system to perform a method of presenting a video within a web-based interface, comprising the steps of:

displaying periodic frames of the video separated by a predetermined time interval;

receiving user training input indicating one or more training video segments from the video; and displaying a similarity measure of each displayed periodic frame in the video to the training video segment using shades surrounding each displayed periodic frame to indicate the similarity measure.

* * * * *